(12) United States Patent
Zhodzishsky et al.

(10) Patent No.: US 6,337,657 B1
(45) Date of Patent: Jan. 8, 2002

(54) METHODS AND APPARATUSES FOR REDUCING ERRORS IN THE MEASUREMENT OF THE COORDINATES AND TIME OFFSET IN SATELLITE POSITIONING SYSTEM RECEIVERS

(75) Inventors: Mark I. Zhodzishsky; Peter P. Zagnetov, both of Moscow (RU); Javad Ashjaee, Saratoga, CA (US)

(73) Assignee: Topcon Positioning Systems, Inc., Pleasanton, CA (US)

( * ) Notice: Subject to any disclaimer, the term of this patent is extended or adjusted under 35 U.S.C. 154(b) by 0 days.

(21) Appl. No.: 09/522,323

(22) Filed: Mar. 9, 2000

Related U.S. Application Data
(60) Provisional application No. 60/124,020, filed on Mar. 12, 1999.

(51) Int. Cl.[7] .............................................. G06F 165/00
(52) U.S. Cl. ........................ 342/357.02; 342/357.03; 342/357.06; 701/213; 701/214
(58) Field of Search .................. 340/357.01, 357.02, 340/357.03, 357.06, 357.17; 701/213, 214

(56) References Cited

U.S. PATENT DOCUMENTS

| | | | | |
|---|---|---|---|---|
| 5,296,861 A | * | 3/1994 | Knight | 342/357.01 |
| 5,323,163 A | * | 6/1994 | Motii | 342/357.01 |
| 5,590,043 A | | 12/1996 | McBurney | 701/207 |

OTHER PUBLICATIONS

Bradford W. Parkinson, James J. Spilker, Jr., Global Positioning System: Theory and Applications; vol. 1; vol. 163, *Progress in Astronautics and Aeronautics*, Published by American Institute of Aeronautics and Astronautics, Inc., Copyright 1996, pp. 409–433, 420, 474, 478, 614–615.

Bradford W. Parkinson, James J. Spilker, Jr., Global Positioning System: Theory and Applications; vol. 11; vol. 163, *Progress in Astronautics and Aeronautics*, Published by American Institute of Aeronautics and Astronautics, Inc., Copyright 1996, pp. 3–50 and 275–301.

Brown, et al., *Introduction to random signals and applied Kalman Filtering: with MATLAB exercises and solutions*, third edition, John Wiley & Sons, pp. 419–460.

* cited by examiner

*Primary Examiner*—Richard M. Camby
(74) *Attorney, Agent, or Firm*—Coudert Brothers

(57) ABSTRACT

Disclosed are methods and apparatuses for generating the estimates of receiver's coordinates and/or time offset for a moment of time $t_n$ without large errors caused by short-term shading of a part of the observable global positioning satellites and also without large dynamic errors caused by the receiver movement. The receiver may be stationary or mobile (i.e., rovering). A set of snapshot-solution values for the position coordinates and time offset of the receiver at the time moment $t_n$, and a set of predicted values for the position coordinates and time offset of the receiver at the time moment $t_n$ are generated. The accuracy of each of these sets are determined, and a set of refined estimates for the position and time offset of the receiver is generated based the snapshot solution values, the predicted position values, and the accuracies.

42 Claims, 24 Drawing Sheets

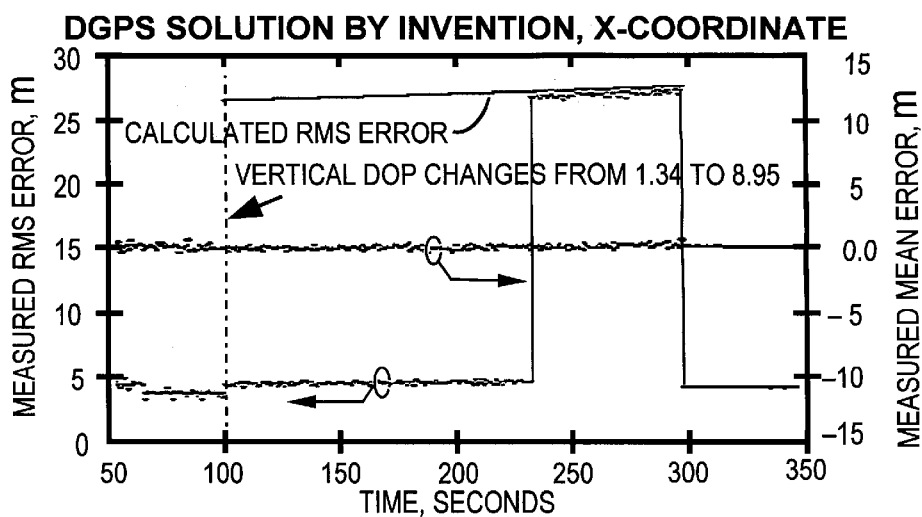
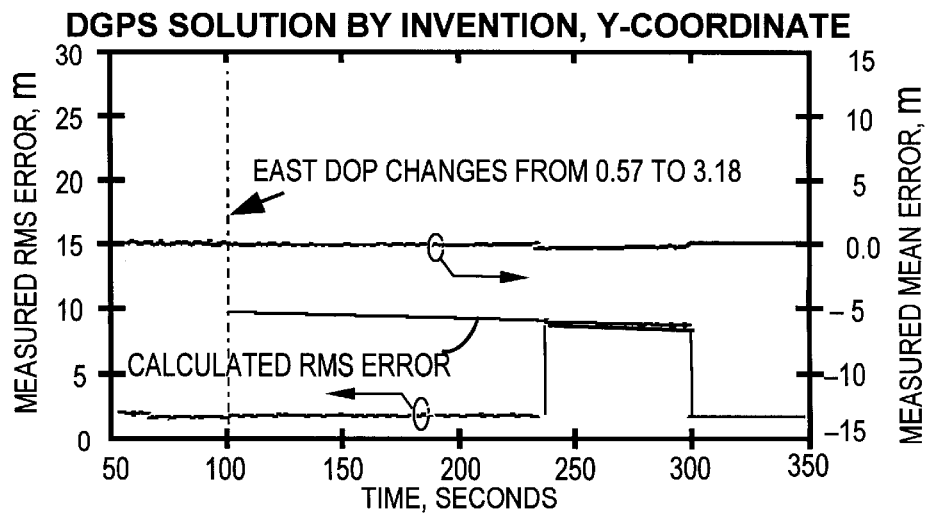
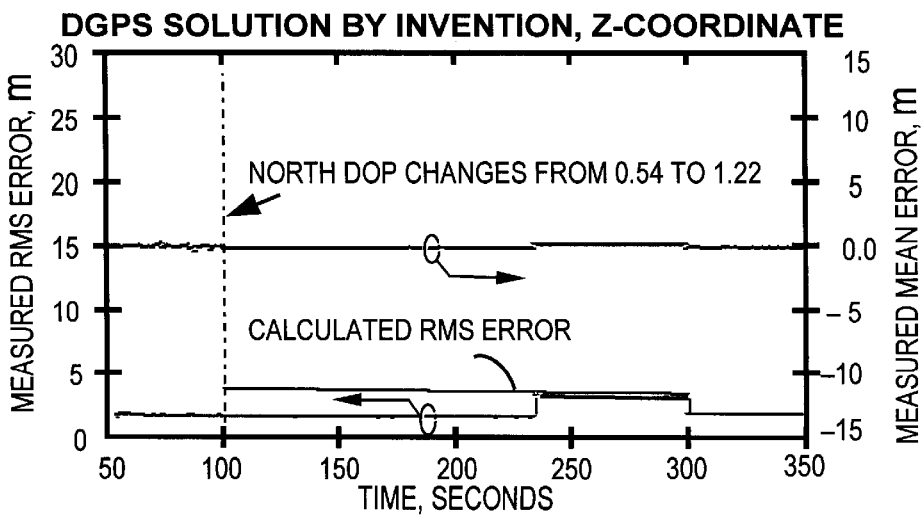

METHODS AND APPARATUSES FOR REDUCING ERRORS IN THE MEASUREMENT OF THE COORDINATES AND TIME OFFSET IN SATELLITE POSITIONING SYSTEM RECEIVERS

CROSS-REFERENCE TO RELATED APPLICATIONS

This application claims the benefit of priority to U.S. patent application Ser. No. 60/124,020, filed Mar. 12, 1999, the contents of which is incorporated herein.

FIELD OF THE INVENTION

The present invention relates generally to methods and apparatuses for improving the accuracy of, and reducing errors in, the position measurements of stand alone navigation and differential navigation receiver system. The present invention is oriented to the improvement of characteristics of a navigational receiver working with navigational Satellite Positioning System signals (SATPS, in particular GPS and/or GLONASS), and using the code measurements and the integrated carrier phase measurements.

BACKGROUND OF THE INVENTION

For the positioning of a navigational roving receiver, one uses radio signals received from a plurality of Satellite Positioning System (SATPS) satellites, and in particular GPS and/or GLONASS satellites. The receiver's position is known if its coordinates in a particular coordinate system (for example, Earth-Centered-Earth-Fixed coordinate system) are known.

The time scale of any receiver (including a roving receiver) usually has some casual offset with respect to the SATPS system time. The value of this time offset is determined simultaneously with the determination of the position coordinates. In this case, for the determination of three coordinates of a roving receiver, it is usually necessary to receive navigation signals from not less than four navigational satellites. However if one of the receiver coordinates is considered to be known (e.g., a two-dimensional solution is used and the height is known or assumed), it is usually necessary to receive navigational signals from not less than three navigational satellites.

FIG. 1 shows a simplified form of the Satellite Positioning System (SATPS) operation in the Stand Alone Navigation (SAN) mode. (Stand Alone Navigation corresponds to an absolute positioning system, i.e. a system that determines a receiver's position coordinates without reference to a nearby reference receiver). The roving receiver 1 and its corresponding antenna 3 are located on the ground surface, or in the near Earth space, and can receive signals from navigational satellites 7, 9, 11, and 13. The receiver position is defined by its coordinates in a particular coordinate system, for example the Earth-Centered-Earth-Fixed (ECEF) system. It is supposed that the exact position of the receiver is unknown, and that the receiver has the task of generating an estimate of the receiver's position within a given accuracy. That accuracy depends upon the number of available satellites, the configuration of the satellites, the quality of the receiver, and a number of other factors.

FIG. 2 shows a simplified form of the SATPS operation in the Differential Navigation (DGPS) mode. In the differential mode, the reference receiver 15 evaluates/estimates the slowly varying components of-measurement errors and generates scalar or vector corrections for each visible navigational satellite. These corrections are sent to the roving SATPS receivers which are configured to use the corrections and which are near enough to the reference receiver for the corrections to be useful. (This explained in greater detail at page 4 of Parkinson, et al, *Global Positioning System: Theory and Applications, Volume II*, American Institute of Aeronautics and Astronautics, Inc., 1996, herein referred to as "Parkinson Vol. II")

In one implementation, the roving receiver 1 receives, by means of the modem 5, differential correction signals generated and sent by the reference receiver 15, by means of the modem 19. By means of the antenna 3, the roving receiver 1 receives signals from navigational satellites 7, 9, 11, and 13, and processes them together with the differential corrections. In other implementations, other communications means besides modems 5 and 19 may be used, and more than four satellite signals may be used.

The navigational signals broadcast by navigational satellites 7, 9, 11, and 13, are received by the antenna 3 of the roving receiver 1 and by the antenna 17 of reference receiver 15. (The number of navigational satellites in the general case must be four or more, but if one of the coordinates of the roving receiver is known, the number of navigational satellites must not be less than three.) Both of receivers 1 and 15:

separate the received signals and identify the navigational satellites (define the satellite number or its corresponding index) for each received signal;

a determine the current position (coordinates) of each of the observed navigational satellites 7, 9, 11, and 13, using the transmission delay of the satellite's code signal and the information on satellite's Ephemeris, which is conveyed by a low frequency (50 Hz) signal which is modulated onto the satellite's code signal; and track the code signal delay over time and determine the integrated carrier phase for each navigational signal (the satellite's code signal is modulated onto a higher frequency carrier signal).

The antennas 3, 17 and the receivers 1, 15 of navigational signals are the user portion of the SATPS (in particular GPS and/or GLONASS).

Snapshot Position Solutions

A "snapshot position solution", or simply "snapshot solution", is a determination of the receiver's position coordinates at a particular instant of time using the pseudorange code measurements from the satellites at that particular instant of time. The snapshot position solution does not use information from previous time points (e.g., previous epochs). In addition to the code delay information, a snapshot position solution may also use carrier phase information. A snapshot solution of the receiver coordinates is usually formed by application of the least squares method (LSM) to the pseudorange code measurements, obtained for one epoch (for a certain moment of time). The LSM method is explained in greater detail at pages 412–413 of Parkinson, et al., *Global Positioning System: Theory and Applications, Volume I*, American Institute of Aeronautics and Astronautics, Inc., 1996, herein referred to as "Parkinson Vol. I", as well as by other references.

The magnitude of error in the snapshot solution is related to the errors in the pseudorange code measurements, the number of satellites used in the snapshot solution, and the geometry of navigational satellites. The snapshot error is reduced by reducing the errors in the code measurements, by increasing the number of satellites in the solution, and by having the satellite's configuration near to the optimal constellation configuration (which is well known to the GPS art). Errors in the pseudorange code measurements are caused by the presence of thermal and other noises at the receiver's input, as well as by a number of reasons, amongst which the following ones are the most significant (see Parkinson Vol. I, page 478):

Errors in the transmitted Ephemeris data;
Errors in the satellite (transmitted) clock, including those caused by Selective Availability;
Ionospheric refraction;
Tropospheric refraction;
Multipath reflections.

The error in the receiver coordinate estimates caused by the number of satellites and by their specific geometry is characterized by the value of a geometric factor called the geometric dilution of precision (GDOP) (see Parkinson Vol. I, pages 413, 420, 474.). When the number of observed navigational satellites is reduced, which is often caused, for example, by the short-term shadowing or blocking of one or more of the satellites, the value of the dilution of precision can sharply increase, which in turn results in a substantial increase in the errors of the coordinate estimates.

As is typically done in the global positioning art, the errors in the receiver's position and time scale caused by the above-identified error sources are estimated by statistical methods using a simulation model of the receiver and the satellites. Each error source, such as thermal noise in the receiver or clocking errors in the satellite signals caused by Selective Availability, is modeled as a random noise source having a representative probability distribution. Oftentimes, a Gaussian distribution is used. The width of the distribution may be determined empirically and is usually represented by a root mean square (RMS) value, which is also called a standard deviation value. By convention, these RMS values are oftentimes stated in units of meters. The simulation model is able to place the receiver and satellites in known positions at a selected time moment, and is then able to randomly select values for the error sources which are within the respective probability distributions for the sources. If there is some degree of correlation between any two random variables, the simulation model can be made to account for the correlation. The simulation model can then compute the position of the receiver under the influence of that particular set of randomly-selected values for the error sources. The difference between the computed position and the known position previously set by the simulation model shows the amount of error in the receiver's coordinates and time scale caused by that set of randomly-selected values for the error sources. The computation process can be repeated several hundred times using new random values each time, but with the receiver and satellites held in fixed positions, to create a set of samples of the receiver's computed position and time scale. An error probability distribution for each of the receiver's position coordinates can then be computed from this set of samples. An error distribution for the receiver's time scale can also be computed. Each probability distribution can be characterized by a mean value, which is the average value for the samples in the distribution. Using the receiver's X-position coordinate as an example, the estimation of mean error for this coordinate is computed as follows:

$$\text{Measured mean error of X-coordinate} = \left[ (1/M) \cdot \sum_{k=1}^{M} x_k \right] - x_{true},$$

where M is the number of samples, where k is an integer which indexes the samples in the set, where $X_k$ is the k-th computed sample for the X-coordinate, and where $x_{true}$ is the X-coordinate of the receiver's position, as set by the simulation model. While this computed value of mean error is based on a simulation model, it is a good estimate of the mean error that would be present in a real measurement, provided that the noise sources have been properly characterized and modeled. For this reason, we will refer this computed value as a "measured mean error".

Each probability distribution can also be characterized by a standard deviation from the measured mean value, or what we refer to as the "measured" root-mean-square (RMS) error. The measured RMS error (estimation of standard deviation) is representative of the width of the probability distribution on either side of the measured mean value. Using the receiver's X-coordinate as an example, the measured RMS error for this coordinate is computed as follows:

Measured RMS error of X-coordinate =

$$\left\{ 1/(M-1) \cdot \sum_{k=1}^{M} \left[ x_k - 1/(M) \cdot \sum_{j=1}^{M} x_j \right]^2 \right\}^{1/2}$$

We typically use between 300 and 3,000 samples to compute the measured means and RMS errors. The measured RMS error and measured mean error are preferably computed from the same set of samples.

Our discussion of the prior art and the present invention will look at the effects of dynamic movements of the receiver upon the measured position and time scale. The effects of dynamic movements can best be seen in the measured mean error. In linear receiver systems in which all of the noise sources have zero mean values (but non-zero RMS values), measured mean errors that occur in the receiver's position and time scale are solely due to the dynamic movements in the receiver. In this case, we may call the measured mean error the dynamic error. (In general, this cannot be said for non-linear systems, or for linear systems where there are error sources which have non-zero mean values.)

A simulation of SATPS and roving receiver was performed to estimate the impact of discontinuities in the geometric dilution of precision on the accuracy of SATPS snapshot estimates. The results of simulation are presented on FIGS. 3–8.

FIGS. 3–5 show the measured root-mean-square error (RMS) of the snapshot estimate of the X, Y and Z coordinates versus time when some of the observed navigational satellites are shadowed so that number of observed satellites is reduced from a large number (e.g., 11) down to four. The calculated value of dilution of precision is in correspondence with the definition given by Parkinson, Vol. I, page 474 for the corresponding coordinate (x, y, and z), and increases in this scenario in spurts (stepwise) on the value indicated in FIGS. 3–5.

The scenario used to generate the results presented in FIGS. 3–5 is as follows. During the time interval 0–99 s, the number of observed navigational satellites (GPS) is at a relatively large value of 11. At the moment of time $t_{100}=100$ s, the number of observed navigational satellites is reduced to four, which leads to an increase (discontinuous change) in the dilution of precision. At the moment of time $t_{300}=300$ s, the number of observed navigational satellites increases back to a relatively large number of ten. In the simulation, the noise in each pseudorange code measurement is assumed at a RMS value of 3 m. The Selective Availability is represented by an analytic model (see Parkinson, Vol. 1, pages 614–615) with an RMS value of 26 m. At the initial moment of time $t_0=0$ s, the receiver is situated at the zero meridian (zero longitude), at the equator, at a height of 1000 m, and it is moving along the Y-axis with the constant speed of 10 m/s.

As can be seen from FIGS. 3–5, a change in the number of observed satellites causes a jump (discontinuous increase) in the RMS error of the snapshot coordinate estimates.

In the differential positioning mode, the roving receiver position is determined relative to a reference receiver. In this case, the impact of the correlated errors decreases dramatically. These correlated errors are:

Errors in the transmitted Ephemeris data;
Errors in the transmitted clock, including Selective Availability;
Ionospheric refraction; and
Tropospheric refraction.

Nevertheless, it is true for differential positioning too, that the shadowing of some of the observed navigational satellites causes a large discontinuity (a stepwise increase) in the RMS error for coordinate estimates of the roving receiver. FIGS. 6–8 show the root-mean-square (RMS) error of the snapshot differential estimate of coordinates versus time when shadowing of the observed navigational satellites occurs according to the scenario used for FIGS. 3–5. The calculated value of the dilution of precision for the corresponding coordinate in this case is also stepwise increased by an amount that is similar to that indicated in FIGS. 3–5.

The snapshot approach is insensitive to system dynamics, because the solution is based solely upon current measurements, and the solution has no lag during dynamic movements if current measurements are used for each satellite in the solution.

Kalman Filtering

To reduce the impact of large discontinuities in the geometric dilution of precision upon the coordinate estimate errors of the roving receiver, the Kalman method of generating filtered estimates may be used. This method is described in Parkinson, Vol. I pages 409–433, and in Brown, et al., *Introduction to random signals and applied Kalman Filtering: with MATLAB exercises and solutions*, third edition, John Wiley & Sons, pages 443–445.

The filter has a state vector, which usually comprises the following eight components: the position coordinates (three components), the velocities (three components), as well as the time offset of the receiver and the increment of its time offset with respect to the system time (see Parkinson, Vol. I, page 421.).

On the basis of a priori information about the receiver's movement (such as provided by kinematic models of the receiver's movement), the predicted value of the filter's state vector is formed. The filtered estimate of the state vector is then formed as the linear combination of the predicted value of the state vector and of the current (input) measurement information (the pseudo-range measurements and the Doppler frequency shift). The weight factors are defined on the bases of a priori information on the covariance matrix of the predicted state vector and the measurements error covariance matrix. After correction of the state vector estimate on the bases of the receiver movement models (via the assumed process dynamics) and of the models of measurement errors, the new covariance matrix of the predicted state vector is computed.

Using the Kalman filter method of generating the filtered estimates leads to the significant complication in the processing of the incoming measurement information in comparison with the snapshot-solution method and, as a rule, leads to an increase in the computing expenses in the receiver. For example, for the formation of the snapshot solution coordinate estimates with the LSM it is necessary to execute the operation of inversion of the matrixes of size 4-by-4, but for the formation of the filtered estimates by the Kalman filter method using the eight-dimensional state vector it is necessary to execute inversion of the matrixes of size 8-by-8.

As another drawback, the efficient use of the Kalman filter method requires that the estimated parameters could be presented as random processes generated by a linear system of white Gaussian noise sources, and that the measurement noises are non-correlated. Actually these conditions are never met exactly in the task of determining position coordinates from global-positioning satellite signals. For example, the receiver coordinates are, in reality, bound to the receiver's acceleration by a set of nonlinear differential equations, and the pseudorange measurement errors listed above are correlated, except for the thermal noises, which are usually not correlated. So real variations of the acceleration, which are poorly described by the movement model used in the filter, bring about the appearance of greater dynamic errors in the receiver coordinate estimates.

For example, when the Kalman filter with an eight-dimensional state vector is used, the acceleration is (in theory) simulated by a white Gaussian noise source. But when in actuality the acceleration has a constant and sufficiently large value over some time interval, greater dynamic errors in the receiver coordinate estimates appear.

FIGS. 9–11 show the RMS errors in the three filtered coordinate estimates versus time when some of the observed navigational satellites are shadowed. During the simulated shadowing event, the number of observed satellites decreases to four. In these simulated results, the receiver is assumed to have no acceleration. The calculated value of dilution of precision for the corresponding coordinate increases stepwise by the value specified in the corresponding FIGS. 9–11. The dilution of precision is in correspondence with designations and symbols used in Parkinson, Vol. I, page 474. For the differential mode measurements, FIGS. 12–14 show the RMS errors of the three filtered coordinate estimates versus time under the same shadowing scenario. In FIGS. 9–14, the RMS errors of the Kalman filter are identified as the "measured rms error".

As can be seen from FIGS. 9–11 and FIGS. 12–14, when Kalman filtering is used to estimate the coordinates, the RMS errors in the estimates varies without steps or sharp jumps, even at the presence of jumps in the dilution of precision. We note that while the decrease at time $t_{300}$ is relatively fast, it is still smooth and not step-like.

However, acceleration pulses cause larger dynamic errors in the estimates from the Kalman filter than in the estimates from instantaneous snapshot solutions. The dynamic errors in the Kalman estimates are mostly due to the lagging time response of the Kalman filter. The effects of the dynamic errors can be seen in the measured mean error The dynamic errors in the Kalman-filtered coordinates are measured for an exemplary acceleration pulse directed along the Y-axis whose form and parameters are shown in FIG. 15. Using the same simulation scenario described above with respect to FIGS. 3–14, but with the inclusion of the acceleration, the measurement results (RMS and mean errors) are presented in FIGS. 16–18 for the SAN mode and in FIGS. 19–21 for the DGPS mode. In these figures, and in the following FIGS. 22–27, the acceleration pulse specified in FIG. 15 starts at time $t_{195}=195$ s. The RMS errors from the Kalman filter are identified as "Measured RMS errors", and the mean errors (dynamic errors) from the Kalman filter are identified as "Measured mean error."

Similar results are presented in FIGS. 22–24 and FIGS. 25–27, but for the case when the shadowing of the navigational satellites is absent.

As can be seen from the presented figures, the use of the Kalman filtering at the presence of the receiver acceleration pulse leads to large dynamic errors of the coordinate estimates, as can be seen in the measured mean errors.

To reduce the dynamic errors, it is necessary to reduce the response time (lag effect) of the Kalman filter. However, such a reduction increases the RMS errors in the coordinate estimates. To reduce the dynamic errors caused by acceleration, the model of the receiver's motion in the Kalman filter may be made more complex to more exactly account for real conditions. However, this significantly complicates the processing of the measurement data.

Using a Kalman filter under differential mode measurements enables one to reduce the influence of large discontinuities (sharp changes) in the geometric factor (GDOP) upon the estimates of the position coordinates. However, in the Kalman filter, there exist large dynamic errors in the coordinate estimates (both under differential and under absolute/stand-alone mode measurements) that are caused by the presence of acceleration pulses in moving receiver.

The McBurney Method

Other method to reduce effects of jumps (large discontinuities) in the dilution of precision upon the value of errors of the receiver coordinate estimates was proposed in U.S. Pat. No. 5,590,043, issued to McBurney. In this patent, filtration is used to reduce large discontinuities in a sequence of the coordinates samples, caused by a number of reasons, among which one is the "(1) change of the satellites in the SATPS solution constellation". This reduction is achieved by forming the filtered coordinate estimates as a linear combination of the coordinate measurements $\tilde{P}_{x,n}$, $\tilde{P}_{y,n}$, $\tilde{P}_{z,n}$, and of a set of predicted coordinate values $\hat{P}'_{x,n}$, $\hat{P}'_{y,n}$ and $\hat{P}'_{z,n}$ that are computed with the use of the average values of velocities $(V_{x,n}+V_{x,n-1})/2$, $(V_{y,n}+V_{y,n-1})/2$, and $(V_{z,n}+V_{z,n-1})/2$, on the time interval $t_{n-1} \leq t \leq t_n$ between two time epochs.

The predicted values of the coordinates $\hat{P}'_{x,n}$, $\hat{P}'_{y,n}$ and $\hat{P}'_{z,n}$ in the specified McBurney patent are computed in correspondence with the expressions:

$$\hat{P}'_{x,n}=\hat{P}^{\wedge}_{x,n-1}+(V_{x,n}+V_{x,n-1})\cdot \Delta t_n/2, \quad (1)$$

$$\hat{P}'_{y,n}=\hat{P}^{\wedge}_{y,n-1}+(V_{y,n}+V_{y,n-1})\cdot \Delta t_n/2, \quad (2)$$

and $$\hat{P}'_{z,n}=\hat{P}^{\wedge}_{z,n-1}+(V_{z,n}+V_{z,n-1})\cdot \Delta t_n/2, \quad (3)$$

where $\Delta t_n = t_n - t_{n-1}$ is the duration of the time interval between two epochs;
$\hat{P}^{\wedge}_{x,n-1}$, $\hat{P}^{\wedge}_{y,n-1}$ and $\hat{P}^{\wedge}_{z,n-1}$ are the filtering estimates of the coordinates for the moment $t_{n-1}$.

However, if the receiver velocity varies through the time interval $t_{n-1} \leq t \leq t_n$ between two epochs, greater dynamic errors arise when the coordinate increments are generated in the forms:

$$(V_{x,n}+V_{x,n-1})\cdot \Delta t_n/2,$$

$$(V_{y,n}+V_{y,n-1})\cdot \Delta t_n/2,$$

and $$(V_{z,n}+V_{z,n-1})\cdot \Delta t_n/2.$$

The above coordinate increments are used for generating the predicted coordinates $\hat{P}'_{x,n}$, $\hat{P}'_{y,n}$, $\hat{P}'_{z,n}$, and therefore errors in the predicted coordinates will be caused by errors in the coordinate increments.

The errors of coordinate increments were estimated by use of a simulation model.

In FIGS. 28–42, the value of dynamic errors versus time for the above-considered scenario are presented (heavy dots, scale on the right). (The scenario used to generate the results presented in FIGS. 28–42 is similar to the scenario for FIGS. 3–14 with consideration for the fact that the roving receiver is affected by the acceleration pulse.)

The value of the dynamic errors depends upon both the parameters of the acceleration pulse, and the duration of the time interval over which the average velocities $V_{x,n}$, $V_{y,n}$ and $V_{z,n}$ are determined. FIGS. 28–30 correspond to the case where the aforesaid time interval is equal to the duration of the time interval $\Delta t_n$ between two epochs. FIGS. 31–33 correspond to the case, where the aforesaid time interval is equal to a half of the duration of the time interval between two epochs ($\Delta t_n/2$). FIGS. 34–36, FIGS. 37–39 and FIGS. 40–42 show similar dependencies for the time intervals of: $\Delta t_n/4$, $\Delta t_n/16$, and $\Delta t_n/18$, respectively.

As one can see, the dynamic errors in determining the coordinate increments in the considered case can be several tens of meters.

The root mean square errors in the coordinate increments during fixed (non-moving) measurements also vary with the duration of the time interval over which the average velocities are defined. The RMS errors are shown by light dots in the figures, with the corresponding scale on the left side of the figure.

In the McBurney method, large dynamic errors due to acceleration of receiver appear under differential and absolute measurement modes. FIGS. 43–48 show the mean errors in the Y-coordinate (which best show the dynamic errors because the acceleration pulse is in the Y-direction) versus time for the above scenario. The mean error is shown with heavy dots in each figure, with the scale on the right side of the figure. The root mean square error is shown with light dots in each figure, with the scale on the left side of the figure. The figures use different time intervals for the computation of the average velocities $V_{x,n}$, $V_{y,n}$ and $V_{z,n}$. For FIGS. 43–48, these intervals are, respectively, $\Delta t_n$, $\Delta t_n/2$, $\Delta t_n/4$, $\Delta t_n/6$, $\Delta t_n/8$, and $\Delta t_n/12$.

The root mean square errors of the estimate of the receiver's velocity under differential measurements are varied when changing the duration of the time interval on which the average velocities $V_{x,n}$, $V_{y,n}$ and $V_{z,n}$ are defined. In turn, these variations result in changing the RMS error estimates of the receiver's coordinates. The measured values of mean square error are presented in the same FIGS. 43–48 by dots (light dots, with the scale on the left).

The accuracy of estimates of the moving receiver coordinates, both absolute and differential, may be improved by the methods and apparatuses of the present invention.

SUMMARY OF THE INVENTION

The present invention encompasses methods and apparatuses for generating the estimates of a receiver's coordinates ($\hat{P}^f_{x,n}$, $\hat{P}^f_{y,n}$, $\hat{P}^f_{z,n}$) and/or time offset ($\hat{P}^f_{\tau,n}$) for a moment of time $t_n$ without large errors caused by short-term shading of a part of the observable global positioning satellites and also without large dynamic errors caused by the receiver movement The receiver may be stationary or mobile (i.e., rovering). Each satellite signal is transmitted by a corresponding satellite, and enables the receiver to measure a pseudorange between itself and the corresponding satellite.

A preferred general embodiment of the present invention comprises, after an initial set up of parameters at the initial time moment n=0, the reiteration of the following steps for each subsequent time moment n>0:

(a) Obtaining a set of snapshot-solution values ($\tilde{P}_{x,n}$, $\tilde{P}_{y,n}$, $\tilde{P}_{z,n}$, $\tilde{P}_{\tau,n}$) for the position coordinates and time offset of the receiver at the time moment $t_n$. These values may be obtained by generating the snapshot-solution values directly, or by receiving them from another process which generates these values.

(b) Generating a set of predicted position coordinates and time offset ($\hat{P}'_{x,n}$, $\hat{P}'_{y,n}$, $\hat{P}'_{z,n}$, and $\hat{P}'_{\tau,n}$) for the time moment $t_n$ from a measurement of a plurality of satellite carrier phases during a time interval preceding time moment $t_n$ and from a set of values for the position coordinates and time offset of the receiver at a previous time moment $t_{n-1}$. In preferred implementations, the set of values at the previous time moment can be provided by steps (a) or (e) (see below) for time moments n>0, and by an initialization process for the initial time n=0.

(c) Generating a first quality factor $Q_n$ which is representative of the accuracy of the set of snapshot solution values.

(d) Generating a second quality factor $Q_n'$ which is representative of the accuracy of the set of predicted position coordinates and time offset. And (e) Generating a set of refined estimates ($\hat{P}^f_{x,n}$, $\hat{P}^f_{y,n}$, $\hat{P}^f_{z,n}$, $\hat{P}^f_{\tau,n}$) for the position and time offset of the receiver based on the quality factors, the snapshot solution values, and the predicted position values.

It may be appreciated that above is a preferred general embodiment, and that the present invention, as described and claimed herein, fully encompasses the cases where only one, two, or three of the four estimates ($\hat{P}^f_{x,n}$, $\hat{P}^f_{y,n}$, $\hat{P}^f_{z,n}$, $\hat{P}^f_{\tau,n}$) is generated. In such embodiments, correspondingly fewer components of the snap-shot and predicted values need to be obtained or generated. Also, it should be understood that the claims, in their broadest interpretation, apply to the cases where steps (a)–(e) are performed once, to cases where steps (a)–(e) are consecutively reiterated over a plurality of time moments, and to cases where steps (a)–(e) are performed at selected time moments with other processing may be applied during the other time moments.

In one group of preferred embodiments, the set of refined estimates ($\hat{P}^f_{x,n}$, $\hat{P}^f_{y,n}$, $\hat{P}^f_{z,n}$, $\hat{P}^f_{\tau,n}$) is generated as a first multiplier ($\alpha_n$) of the set of snapshot-solution values plus a second multiplier ($1-\alpha_n$) of the set of predicted values, with the sum of the first and second multipliers being equal to 1, and preferably with both multipliers being less than or equal to 1. The first multiplier ($\alpha_n$) is greater than the second multiplier ($1-\alpha_n$) when the first and second quality factors indicate that the set of snapshot-solution values is more accurate than the set of predicted values, and the second multiplier ($1-\alpha_n$) is greater than the first multiplier ($\alpha_n$) when the first and second quality factors indicate that the set of predicted values is more accurate than the set of snapshot-solution values. Further preferred embodiments provide for preferred methods of generating the first and second multipliers.

In another group of preferred embodiments, the set of refined estimates ($\hat{P}^f_{x,n}$, $\hat{P}^f_{y,n}$, $\hat{P}^f_{z,n}$, $\hat{P}^f_{\tau,n}$) is generated as the set of snapshot-solution values when the first and second quality factors indicate that the set of snapshot-solution values are more accurate than the set of predicted values, and as the set of predicted values when the first and second quality factors indicate that the set of predicted values is more accurate than the set of snapshot-solution values.

A number of preferred methods of generating the first and second quality factors are disclosed herein, and may be used with any of the above described methods.

The methods outlined above provide for highly accurate estimates for the receiver's position and time offset (and therefore time scale) without the previously-described detrimental effects caused by the shadowing of satellites or the movements of the receiver. While the present invention provides refined estimates for the receiver's position and time offset, it may be appreciated that practitioners in the art may wish to use the present invention to generate refined estimates for only the receiver's position, or for only the receiver's time offset, rather than for both the receiver's position and time offset. Practitioners may also wish to use the present invention to generate estimate for only two of the three position coordinates (such as when one is already known), or for only one position coordinate (such as when two coordinates are already known).

Accordingly, it is an objective of the present invention to provide for refined estimates of the position and/or time offset (time scale) of a receiver which are more accurate during short-term occurrences of shadowing of satellites and which do not have errors which jump in response to start of an occurrence of shadowing.

It is another objective of the present invention to provide for refined estimates of the position and/or time offset (time scale) of a receiver which maintain their accuracy during movement of the receiver, and particularly during acceleration of the receiver.

These and other objectives of the present invention will be apparent from the detailed description of the present invention.

BRIEF DESCRIPTION OF THE DRAWINGS

FIGS. 54–56 show mean and root mean square errors for the estimates of the receiver's coordinates generated according to the present invention when using a first preferred rule of generating a weight factor ($\alpha_n$) and when operating in DGPS mode.

DESCRIPTION OF THE PREFERRED EMBODIMENTS

As it was noted above, the present invention is directed to improving the characteristics of a navigational receiver which is working with a navigational Satellite Positioning System (SATPS, in particular GPS and/or GLONASS) signals, and is using code measurements and measurements of the integrated carrier phase.

Figure 1:
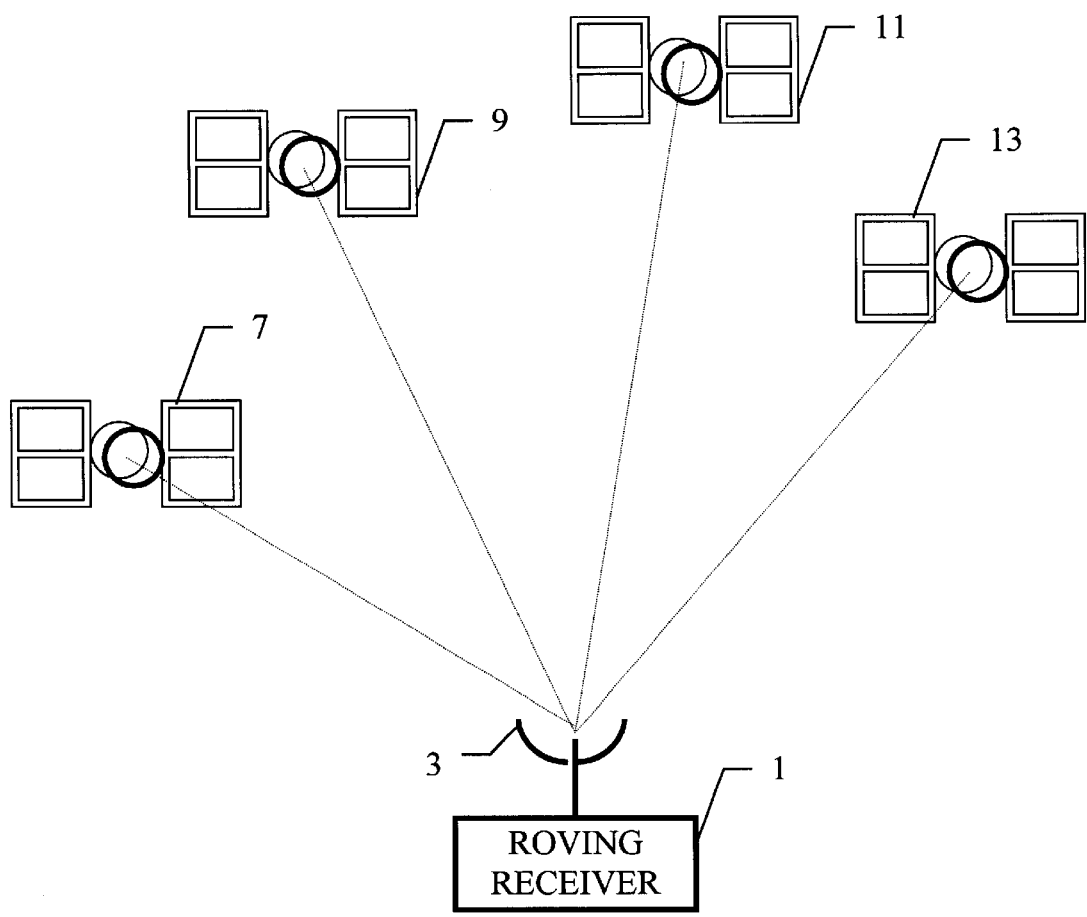
FIG. 1 is a schematic view of an SATPS system to which the invention can be applied in Stand Alone Navigation (SAN) mode.

FIG. 1 shows an exemplary embodiment of a Satellite Positioning System (SATPS) operating in the Stand Alone Navigation (SAN) mode, in simplified form.

The roving receiver 1 receives navigational signals from four or more navigational satellites 7, 9, 11, and 13 by means of an antenna 3 and generates from them estimates of the receiver's current position coordinates and velocities of the roving receiver, and determines an estimate of the receiver's time offset with respect to the SATPS system time. If one of the receiver's position coordinates is known, then the number of the navigational signals received can be three or more, rather than four or more.

Figure 2:
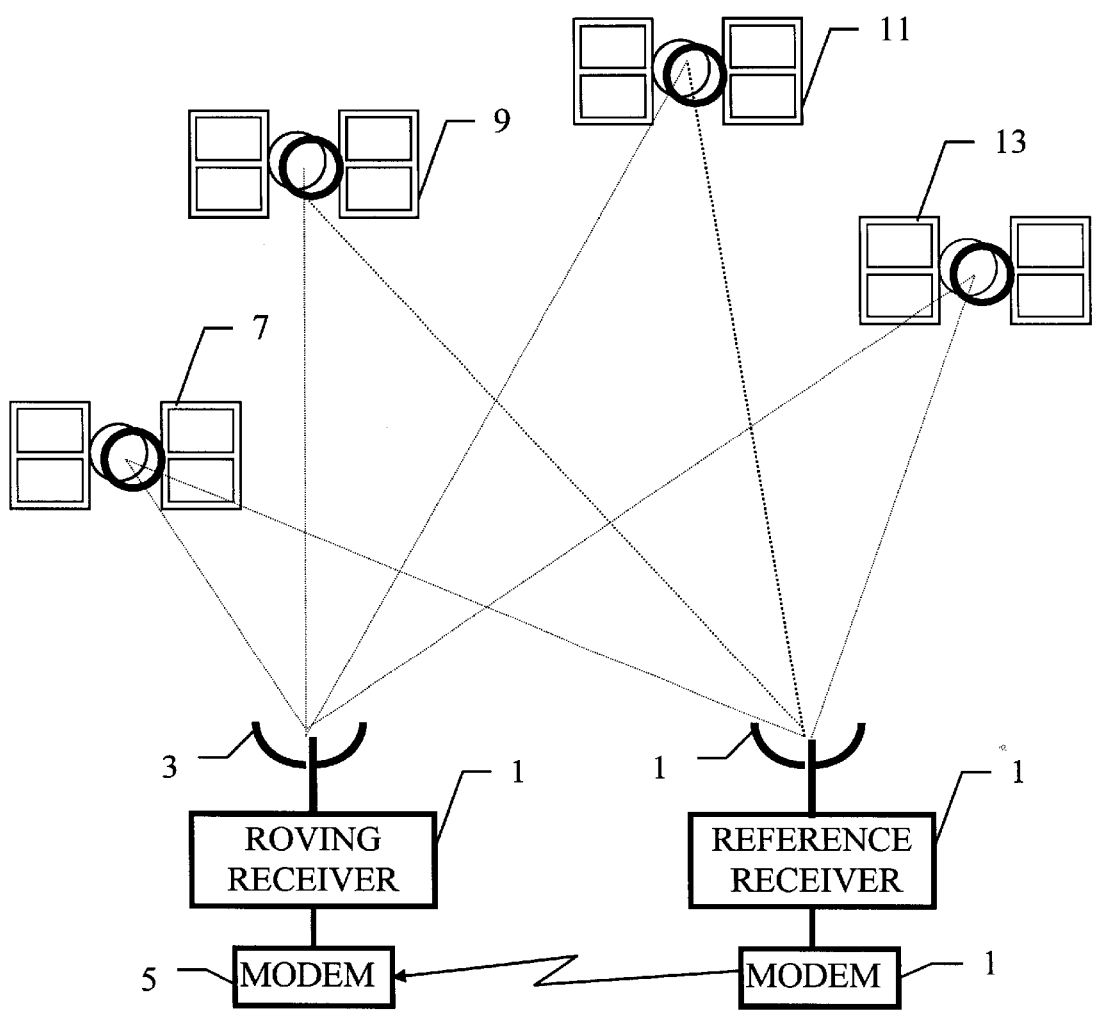
FIG. 2 is a schematic view of an SATPS system to which the invention can be applied in Differential Navigation (DGPS) mode.
Figure 3:
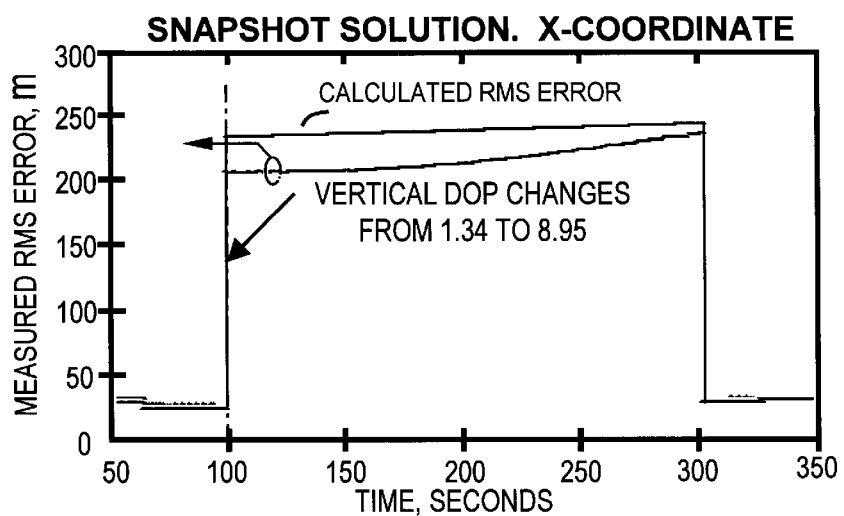
FIGS. 3–5 present the calculated and measured root mean square errors of the snapshot estimates for the receiver's coordinates during the occurrence of a jump (i.e., discontinuity, or stepwise increase) in the geometric dilution of precision caused by, for example, a short-term shading of some of the observable navigational satellites, while operating the receiver in Stand Alone Navigation (SAN) mode.
Figure 4:
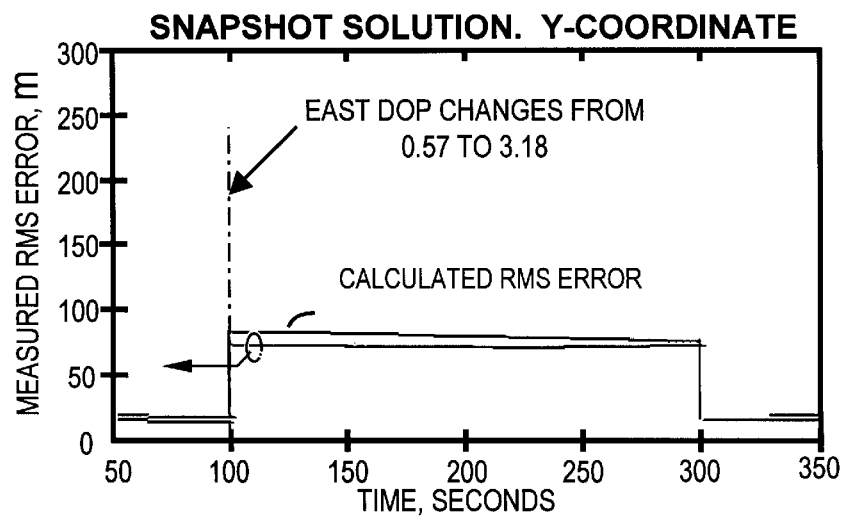
Figure 5:
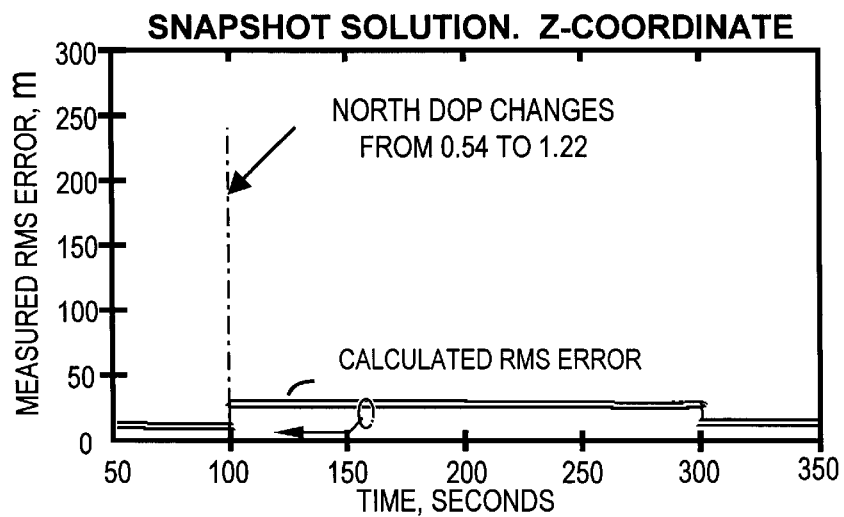
Figure 6:
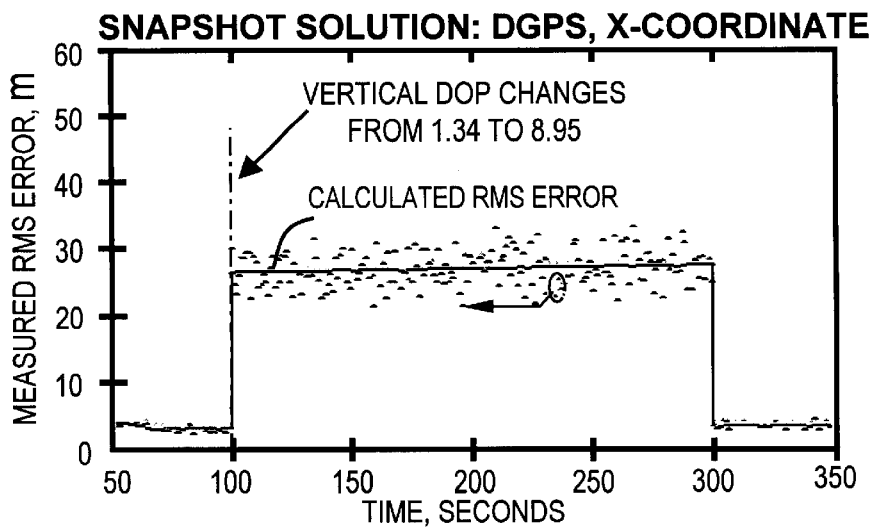
FIGS. 6–8 present the calculated and measured root mean square errors of the snapshot estimates of the receiver's coordinates during the occurrence of a jump in the geometric dilution of precision caused by, for example, a short-term shading of some of the observable navigational satellites, while operating the receiver in Differential Navigation (DGPS) mode.
Figure 7:
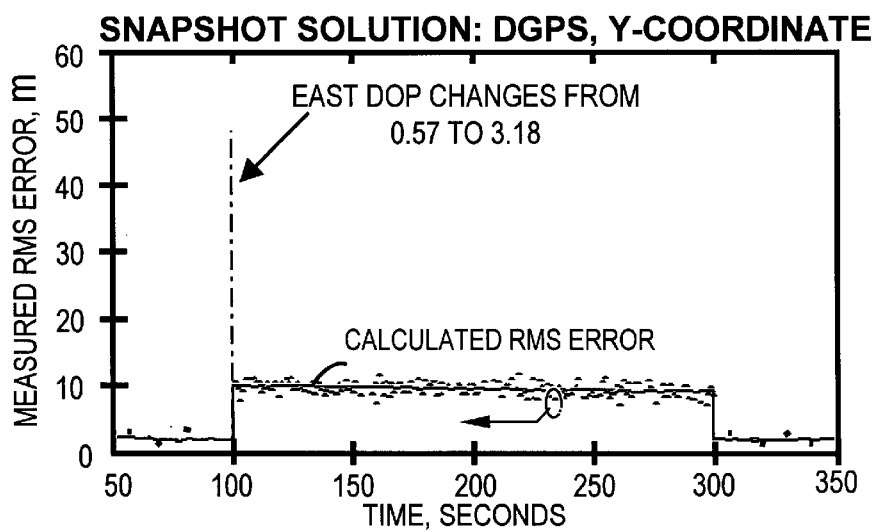
Figure 8:
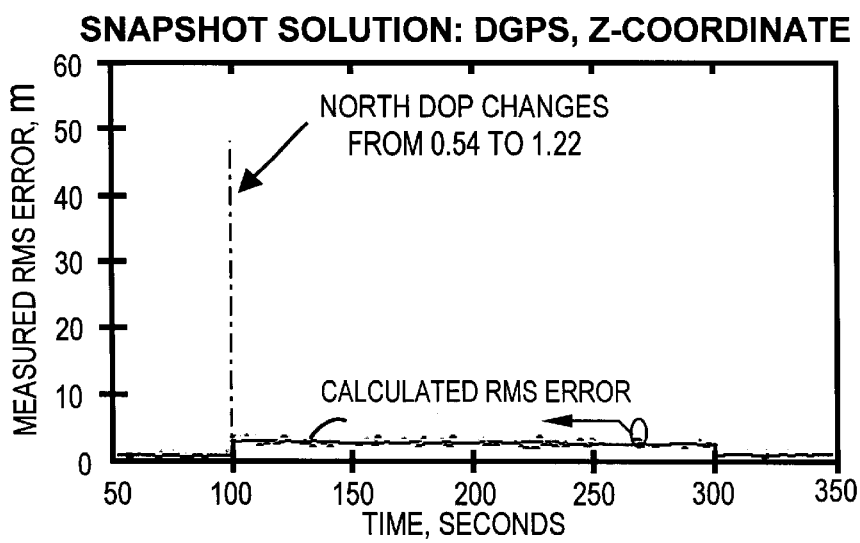
Figure 9:
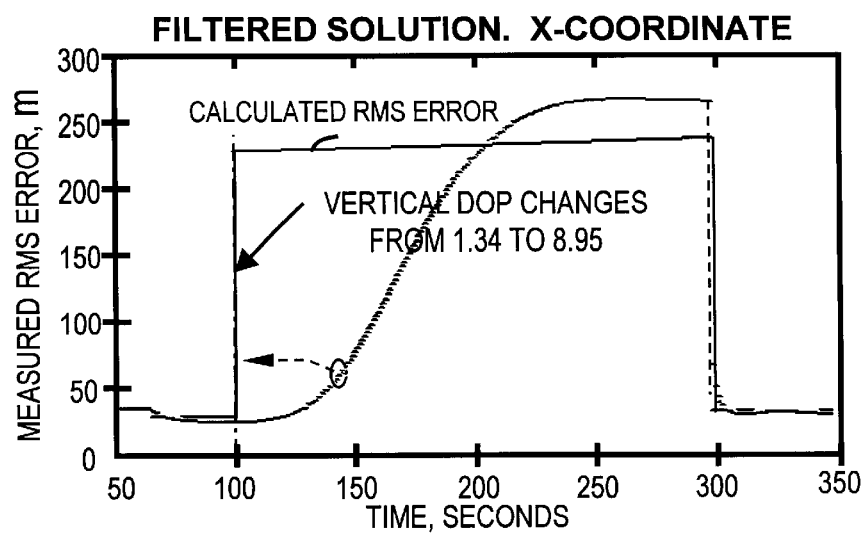
FIGS. 9–11 present the calculated and measured root mean square errors of estimates of the receiver's coordinates as computed by Kalman filtering, during the occurrence of a jump in the geometric of precision referred to above for FIGS. 3–5 in SAN mode.
Figure 10:
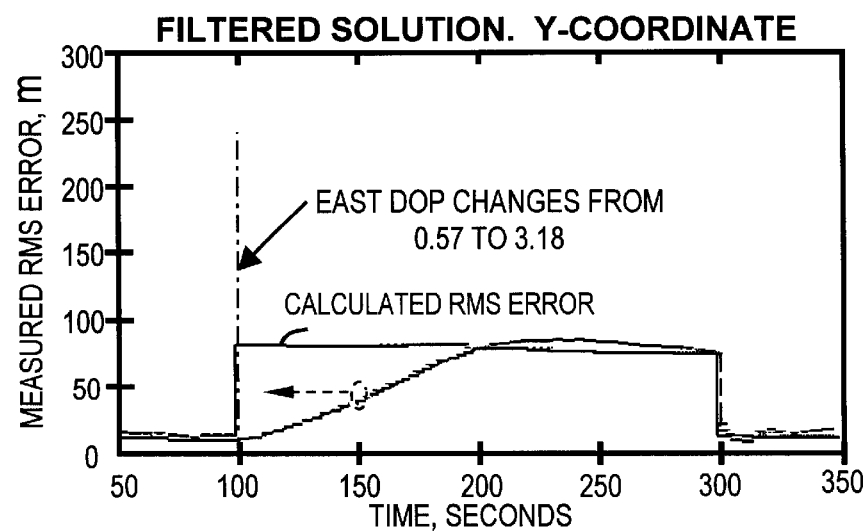
Figure 11:
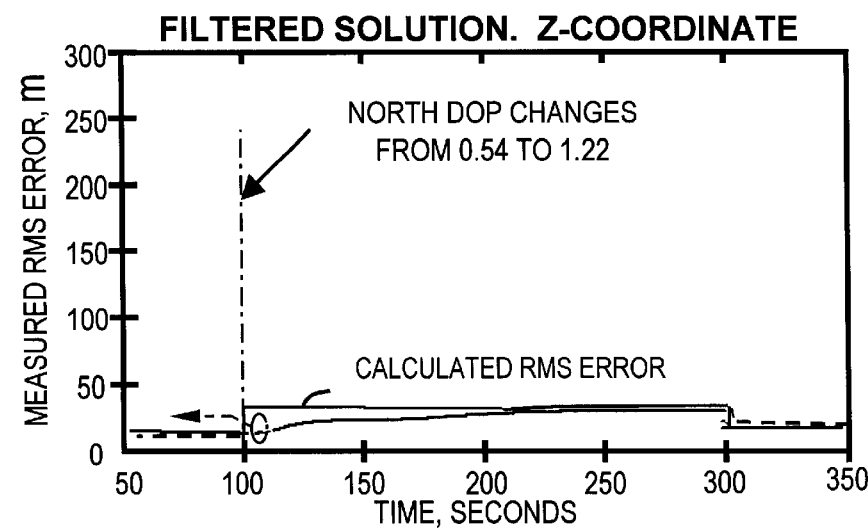
Figure 12:
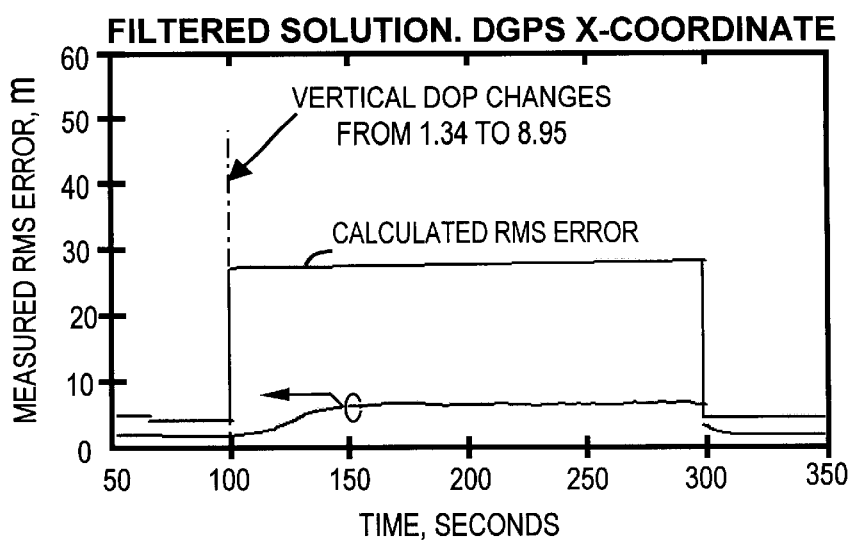
FIGS. 12–14 present the calculated and measured root mean square errors of estimates of the receiver's coordinates as computed by Kalman filtering, during the occurrence of a jump in the geometric dilution of precision referred to above for FIGS. 6–8 in DGPS mode.
Figure 13:
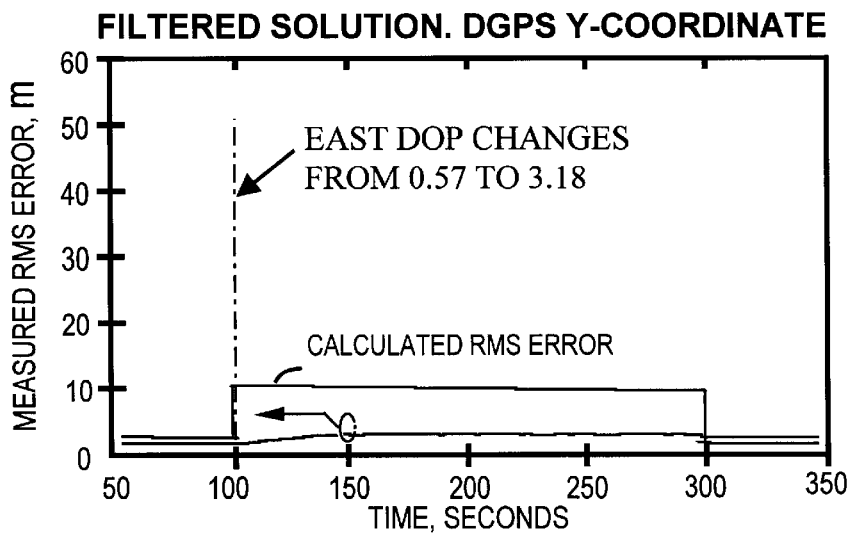
Figure 14:
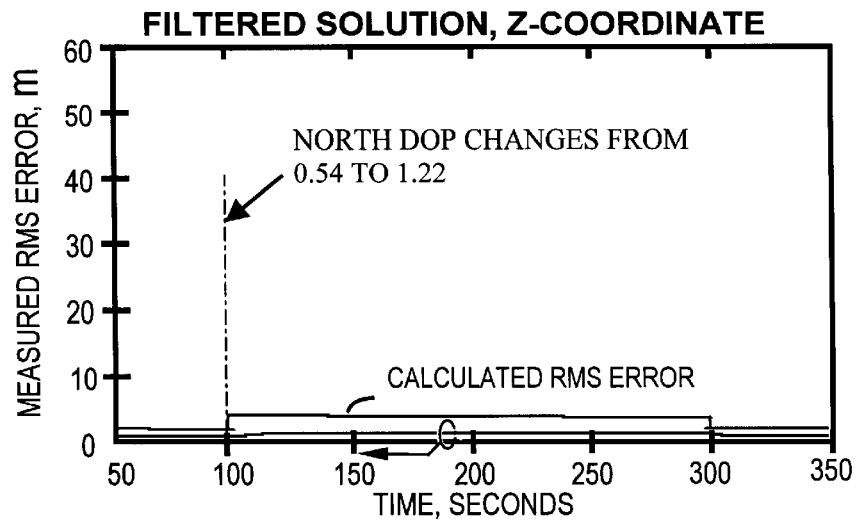

FIG. 2 shows an exemplary embodiment of a Satellite Positioning System (SATPS) operating in the differential navigation mode (also called the "differential measurement mode"). In this mode, the roving navigational receiver 1 receives differential correction signals from a reference receiver (also called a "base station") in addition to the signals from navigational satellites 7, 9, 11, and 13. The differential correction signal may be sent by any communication method known to the art, such as by radio signal or by cables. For simplicity and without any loss of generality, FIG. 2 shows the differential signals being sent by radio/ radiomodem 19 (transmitter) at the reference station to the corresponding radio/radiomodem 5 (receiver) at the rover station.

Figure 49:
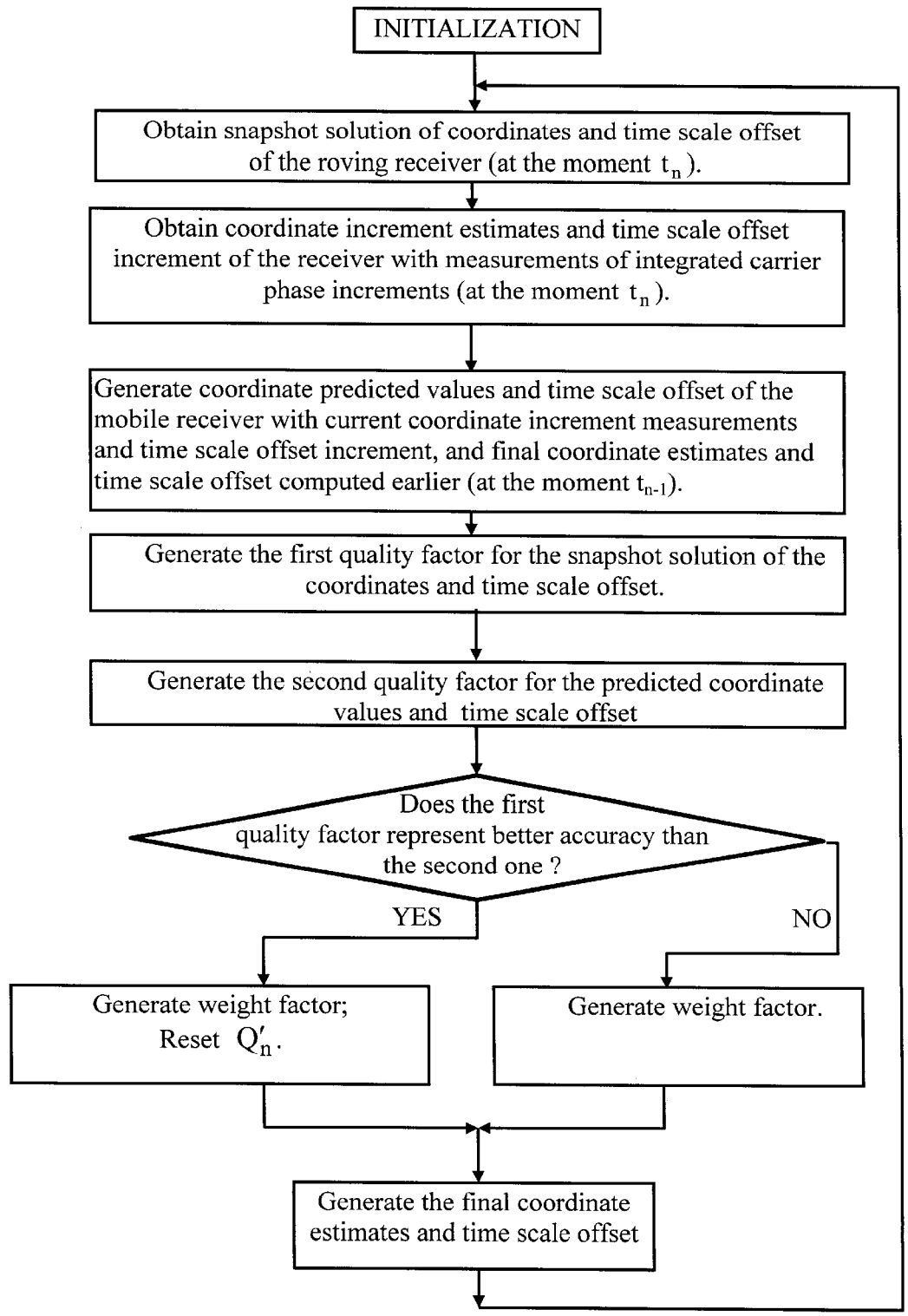
FIG. 49 illustrates, by a flow chart, an exemplary method embodiment of the present invention.

FIG. 49 shows a flow chart of the steps of an exemplary method according to the present invention for generating highly accurate estimates of the receiver's position coordinates $P_x$, $P_y$, and $P_z$, and time offset $P_\tau$. The present invention can be applied in both the stand alone measurement (SAN) mode and the differential measurement (DGPS) mode. The highly accurate estimates are denoted herein as $\hat{P}^f_{x,n}$, $\hat{P}^f_{y,n}$, $\hat{P}^f_{z,n}$ and $\hat{P}^f_{\tau,n}$. The estimates are generated at successive, discrete time points, or epochs, which are denoted by the symbols $t_0, t_1, \ldots, t_n$, where "n" is an index which distinguishes the time from one another. For simplicity and without loss of generality, the index "n" will be assumed to have an integer form, the initial time moment in an operation of the present invention will be taken as "$t_0$" (i.e., n=0), and a time moment having a larger n value will represent a later time moment. Other assumptions may be made, such as using non-integer values of n, but they unnecessarily complicate the explanation of the invention.

The estimates may be generated with the aid of a microprocessor or computer which has a central processing unit and memory registers. The estimates may also be generated by specifically designed hardware which includes memory.

There is a separate set of accurate estimates $\hat{P}^f_{x,n}$, $\hat{P}^f_{y,n}$, $\hat{P}^f_{z,n}$ and $\hat{P}^f_{\tau,n}$, for each time moment $t_n$, and the index "n" appears as a subscript in the highly accurate estimates to indicate the time moment $t_n$ for which the accurate estimates have been generated. The "x", "y", and "z" subscripts in the estimates generally denote three orthogonal positional coordinates, and the subscript "$\tau$" denotes the time offset. For the purposes of illustrating the present invention, and without loss of generality, the Earth-Centered, Earth-Fixed coordinate system will be used. The subscripts "x", "y", "z", "f", and "n" are used herein in a similar manner for snapshot solutions of the coordinates and time offset, and for predicted values of the coordinates and time offset. The highly accurate estimates $\hat{P}^f_{x,n}$, $\hat{P}^f_{y,n}$, $\hat{P}^f_{z,n}$ and $\hat{P}^f_{\tau,n}$ are referred to herein as the "final estimates" because they are derived, in part, from intermediate estimates and snapshot solutions; the superscript "f" in the symbols for the estimates stands for "final".

Initialization of exemplary methods according to the present invention may comprise the following four steps. (In these steps, it is presumed, without loss of generality, that n is initially set to zero).

(1) obtaining, at an initial moment $t_0$ (n=0), a snapshot solution of the receiver's coordinates, which is denoted herein as $\tilde{P}_{x,0}$, $\tilde{P}_{y,0}$, and $\tilde{P}_{z,0}$, and of the time offset, which is denoted herein as $\tilde{P}_{\tau,0}$. The snapshot-solution values $\tilde{P}_{x,n}$, $\tilde{P}_{y,n}$, $\tilde{P}_{z,n}$, and $\tilde{P}_{\tau,n}$ of the mobile receiver for any time moment $t_n$ are generated from the measurements of the pseudoranges $\gamma_n$. The generation of these values is well known to the art, such as taught by Parkinson, Vol. I, pages 412–413, and a further explanation herein is not needed in order for one of ordinary skill in the art to make and use the present invention. In the differential navigation mode, differential correction signals $\Delta\gamma_n$ from the reference receiver (e.g., base station) are transmitted to the mobile receiver and used to generate the snapshot-solution values (see Parkinson, Vol. II, page 5).

(2) The second step comprises setting the final estimates $\hat{P}^f_{x,n}$, $\hat{P}^f_{y,n}$, $\hat{P}^f_{z,n}$ and $\hat{P}^f_{\tau,n}$ for the initial time moment to (n=0) to the values $\tilde{P}_{x,0}$, $\tilde{P}_{y,0}$, $\tilde{P}_{z,0}$, and $\tilde{P}_{\tau,0}$, respectively, of the snapshot solution. (In other words: $\hat{P}^f_{x,0} = \tilde{P}_{x,0}$; $\hat{P}^f_{y,0} = \tilde{P}_{y,0}$; $\hat{P}^f_{z,0} = \tilde{P}_{z,0}$; $\hat{P}^f_{\tau,0} = \tilde{P}_{\tau,0}$.)

(3) The third step comprises generating a first quality factor $Q_n$ at time point n=0 which represents the accuracy of the snapshot-solution values $\tilde{P}_{x,n}$, $\tilde{P}_{y,n}$, $\tilde{P}_{z,n}$, and $\tilde{P}_{\tau,n}$. There are a number of different ways of generating the first quality factor $Q_n$. Some of these ways are relatively complex and require one or more data parameters that are pre-set with starting values and/or updated with each time moment. After the general steps of generating the highly accurate estimates are described, we will describe the various ways in which the first quality factor $Q_n$ may be generated and the corresponding data parameters used. Step (3) may be performed before or after step (2).

(4) In addition to the snapshot solutions, exemplary methods of the present invention generate and use predicted values of the position coordinates and time offset at each time moment $t_n$, usually only for time moments n>0. The predicted values are denoted herein as: $\hat{P}'_{x,n}$, $\hat{P}'_{y,n}$, $\hat{P}'_{z,n}$, and $\hat{P}'_{\tau,n}$. As in the case of the snapshot-solution values, a quality factor reflects the accuracy of the predicted values and is referred to herein as the second quality factor $Q_n'$. For the initial time moment $t_n = t_0$, the value of the second quality factor $Q_0'$ is usually not critical, and it may be set to the value of the first quality factor as follows: $Q_n' = Q_n$ (n=0).

There are a number of different ways of generating the second quality factor $Q_n'$. Some of these ways are relatively complex and require one or more data parameters that are pre-set with starting values and/or updated with each time moment. (For example, parameters which are pre-set are a vector kq[*] of parameter values: kq[0], kq[1], ... kq[m] used in the third, fourth, seventh, and eighth methods for generating $Q_n'$ described below, parameters $\Psi_{1,n}$, $\Psi_{2,n}$, $\Psi_{3,n}$, $\Psi_{4,n}$, $\Phi_1$, $\Phi_2$, $\Phi_3$, and $\Phi_4$ used in the ninth method, and a temporary parameter $MQ_n'$ used in some implementations of some of the other methods for generating $Q_n'$.) After the general steps of generating the highly accurate estimates are described, we will describe the various ways in which the second quality factor $Q_n'$ may be generated and the corresponding data parameters used.

Each of the first and second quality factors $Q_n$ and $Q_n'$ may represent accuracy by increasing in value as the accuracy increases, or by decreasing in value as the accuracy increases. Of course, the same orientation should be used for both the first and second quality factors. In addition, the quality factors $Q_n$ and $Q_n'$ may have either positive or negative values. However, we will use positive values in examples to simplify the presentation of the present invention.

With the initialization steps (1)–(4) accomplished, the methods according to the present invention proceed to subsequent time moments for n>0. Each of the following steps (5)–(12) is performed at each time moment $t_n$ for n>0. At each time moment $t_n$, selected results from the previous time moment are used, and that time moment is denoted as $t_{n-1}$ in steps (5)–(12). At each time moment $t_n$, the methods and apparatuses of the present invention obtain positioning data from the receiver's tracking circuits, and also from the reference receiver in the case of differential navigation (DGPS), for that time moment and generate the final estimates of position and time offset shortly thereafter, preferably before the next time moment occurs.

(5) obtaining at the time moment $t_n$, snapshot-solution coordinates $\tilde{P}_{x,n}$, $\tilde{P}_{y,n}$, $\tilde{P}_{z,n}$, and the time offset $\tilde{P}_{\tau,n}$ of the roving receiver. This step may be performed as described above in step (1).

(6) obtaining, for the moment $t_n$, a set of estimated increments to the coordinates and time offset which are derived from measurements of the satellite carrier phases over the time interval from $t_{n-1}$ to $t_n$. These increments are denoted herein as the coordinate increments $\Delta \tilde{P}_{x,n-1,n}$, $\Delta \tilde{P}_{y,n-1,n}$, $\Delta \tilde{P}_{z,n-1,n}$ and time offset increment $\Delta \tilde{P}_{\tau,n-1,n}$, and methods for generating them will be described in greater detail below. As a brief summary of the method for generating the increments, the number of carrier cycles in each of the tracked satellite signals is counted during the time interval from $t_{n-1}$ to $t_n$ (including fractions of cycles, if so desired), and are translated to corresponding position and time-offset increments through the use of the geometry matrix (also called the Jacobian matrix or directional cosine matrix). The incremental number of carrier cycles for the j-th tracked satellite over the time interval from $t_{n-1}$ to $t_n$ is denoted herein as $\Delta \phi^j_n$, and the collection of these carrier increments is denoted herein as the vector $\Delta \phi_n$. Step (6) may be performed before step (5).

(7) This step comprises generating a set of predicted position coordinates and time offset for the current time moment $t_n$ from the increment values ($\Delta \tilde{P}_{x,n-1,n}$, $\Delta \tilde{P}_{y,n-1,n}$, $\Delta \tilde{P}_{z,n-1,n}$ and $\Delta \tilde{P}_{\tau,n-1,n}$) and an estimate of the coordinates and time offset at the previous time moment $t_{n-1}$. The predicted set is denoted herein as $\hat{P}'_{x,n}$, $\hat{P}'_{y,n}$, $\hat{P}'_{z,n}$ and $\hat{P}'_{\tau,n}$. In preferred embodiments, the estimates from the previous time moment $t_{n-1}$ are the final estimates $\hat{P}^f_{x,n-1}$, $\hat{P}^f_{y,n-1}$, $\hat{P}^f_{z,n-1}$ and $\hat{P}^f_{\tau,n-1}$, and the predicted values are generated in the form:

$$\hat{P}'_{x,n} = \hat{P}^f_{x,n-1} + \Delta \tilde{P}_{x,n-1,n} \quad (1)$$

$$\hat{P}'_{y,n} = \hat{P}^f_{y,n-1} + \Delta \tilde{P}_{y,n-1,n} \quad (2)$$

$$\hat{P}'_{z,n} = \hat{P}^f_{z,n-1} + \Delta \tilde{P}_{z,n-1,n} \quad (3)$$

$$\hat{P}'_{\tau,n} = \hat{P}^f_{\tau,n-1} + \Delta \tilde{P}_{\tau,n-1,n} \quad (4)$$

(With the previously-described initialization steps, the snapshot-solution values $\tilde{P}_{x,0}$, $\tilde{P}_{y,0}$, $\tilde{P}_{z,0}$, $\tilde{P}_{\tau,0}$, which are obtained on the basis of the pseudorange measurements $\gamma_0$ for time moment $t_0$, are used as the final estimates $\hat{P}^f_{x,n-1}$, $\hat{P}^f_{y,n-1}$, $\hat{P}^f_{z,n-1}$ and $\hat{P}^f_{\tau,n-1}$ for the second time moment $t_n = t_1$.) Step (7) may be performed before step (5) if step (6) has been performed before step (5).

(8) This step comprises generating the first quality factor $Q_n$ which is representative of the accuracy of the snapshot solution values which were obtained at step (5) for the current time $t_n$. Several different methods of generating the first quality factor $Q_n$ may be used, and are described herein after we finish describing the general method of generating the final estimates $\hat{P}^f_{x,n-1}$, $\hat{P}^f_{y,n-1}$, $\hat{P}^f_{z,n-1}$ and $\hat{P}^f_{\tau,n-1}$. Step (8) may be performed before either or both of steps (6) and (7), provided that step (5) has been preformed.

(9) This step comprises generating the second quality factor $Q_n'$ which is representative of the accuracy of the predicted values $\hat{P}'_{x,n}$, $\hat{P}'_{y,n}$, $\hat{P}'_{z,n}$, and $\hat{P}'_{\tau,n}$ which were obtained at step (7) for the current time $t_n$. Several different methods of generating the second quality factor may be used, and are described herein after we finish describing the general method of generating the final estimates $\hat{P}^f_{x,n}$, $\hat{P}^f_{y,n}$, $\hat{P}^f_{z,n}$ and $\hat{P}^f_{\tau,n}$. Step (9) may be performed before step (8), and may be performed before step (5) if steps (6) and (7) have been performed before step (5).

(10) This step comprises generating a weighting factor $\alpha_n$ as a function of the first and second quality factors $Q_n$ and $Q_n'$. The weighting factor $\alpha_n$ is generated for time moment $t_n$, and will be used in a subsequent step to generate the final estimates $\hat{P}^f_{x,n}$, $\hat{P}^f_{y,n}$, $\hat{P}^f_{z,n}$ and $\hat{P}^f_{\tau,n}$. The weighting factor $\alpha_n$ may be generated in a number of forms. One preferred form for $\alpha_n$ is as follows:

(A) If the second quality factor $Q_n'$ represents less accuracy than the first quality factor $Q_n$ (eg., $Q_n' > Q_n$ for the first orientation, $Q_n' < Q_n$ for the second orientation) then $\alpha_n$ is set to a value of 1 ($\alpha_n = 1$), otherwise it is set to a value of zero ($\alpha_n = 0$).

Another preferred form for $\alpha_n$ is as follows:

(B) If the second quality factor $Q_n'$ represents the same accuracy or less than the first quality factor $Q_n$ (e.g., $Q_n' \geq Q_n$ for the first orientation, $Q_n' \leq Q_n$ for the second orientation) then $\alpha_n$ is set to a value of 1 ($\alpha_n = 1$), otherwise it is set to a value of zero ($\alpha_n = 0$).

The above two forms for generating $\alpha_n$ are currently preferred because they enable simple implementations and they provide high-quality final estimates Another preferred form is:

(C) if $Q_n' > Q_n$, ($Q_n'$ representing less accuracy by having a higher value), then $\alpha_n$ is set as:

$$\alpha_n = 1 - 0.5 * \exp\{en * \log[2 * Q_n / (Q_n' + Q_n)]\},$$

otherwise $\alpha_n$ is set as:

$$\alpha_n = 0.5 * \exp\{en * \log[2 * Q_n' / (Q_n' + Q_n)]\},$$

where "en" is a number selected by the user, where "exp" is the mathematical exponential function, and where "log" is the mathematical logarithmic function. The parameter "en" may be an integer, rational, or irrational number. Typical values of "en" are 1, 2, 3, and 4, and may generally be between zero and infinity. When $Q_n' = Q_n$, we note that the two above alternate forms generate the same value of 0.5. Therefore one may use the test condition "$Q_n' \geq Q_n$" in place of "$Q_n' > Q_n$". Note that the term:

$$0.5 * \exp\{en * \log[2 * Q_n' / (Q_n' + Q_n)]\}$$

is equivalent to the term:

$$0.5 * [2 * Q_n' / (Q_n' + Q_n)]^{en}.$$

One may also use approximations to the above forms. As the value of "en" increases, the third case provides results that become increasingly similar to the results provided by the above first two cases.

(11) This step comprises generating the final estimates $\hat{P}^f_{x,n}$, $\hat{P}^f_{y,n}$, $\hat{P}^f_{z,n}$ and $\hat{P}^f_{\tau,n}$ for time moment $t_n$ from the snapshot values ($\tilde{P}_{x,n}$, $\tilde{P}_{y,n}$, $\tilde{P}_{z,n}$, $\tilde{P}_{\tau,n}$), the predicted values ($\hat{P}'_{x,n}$, $\hat{P}'_{y,n}$, $\hat{P}'_{z,n}$, $\hat{P}'_{\tau,n}$), and the weighting factor $\alpha_n$. The final estimates are generated as a combination of the predicted and snapshot values, with the amounts used being dependent upon the weighting factor $\alpha_n$. In preferred embodiments, the final estimates may be generated in the form of a linear combination of the snapshot values and predicted values, as parameterized by the weighting factor $\alpha_n$:

$$\hat{P}^f_{x,n} = \alpha_n \cdot \tilde{P}_{x,n} + (1 - \alpha_n) \cdot \hat{P}'_{x,n};$$

$$\hat{P}^f_{y,n} = \alpha_n \cdot \tilde{P}_{y,n} + (1 - \alpha_n) \cdot \hat{P}'_{y,n};$$

$$\hat{P}^f_{z,n} = \alpha_n \cdot \tilde{P}_{z,n} + (1 - \alpha_n) \cdot \hat{P}'_{z,n};$$

and $$\hat{P}^f_{\tau,n} = \alpha_n \cdot \tilde{P}_{\tau,n} + (1 - \alpha_n) \cdot \hat{P}'_{\tau,n}.$$

In this form, the final estimates are equal to the snapshot-solution values when $\alpha_n = 1$, which corresponds to when the quality factors indicate that the snapshot-solution values are more accurate than the predicted values; and the final estimates are equal to the predicted values when $\alpha_n=0$, which corresponds to when the quality factors indicate that the predicted values are more accurate than the snapshot-solution values. In general implementations of the present invention, the final estimates are closer to the snapshot values when the quality factors indicate that the snapshot values are more accurate than the predicted values, and are closer to the predicted values when the quality factors indicate that the predicted value are more accurate. Stated another way, the final estimates comprises a first multiplier $(\alpha_n)$ of the snapshot-solution values plus a second multiplier $(1-\alpha_n)$ of the predicted values, with the two multipliers adding to a value of 1. The first multiplier $(\alpha_n)$ is greater than the second multiplier $(1-\alpha_n)$ when the quality factors indicate that the snapshot-solution values are more accurate than the predicted values; and the second multiplier $(1-\alpha_n)$ is greater that the first multiplier $(\alpha_n)$ when the quality factors indicate that the predicted values are more accurate than the snapshot-solution values. When the quality factors indicate that the predicted values and snapshot-solutions have the same accuracy, one may use equal values of the first and second multipliers, or one may favor one multiplier over the other.

(12) This step prepares the parameters for generating the second quality factor $Q'_{n+1}$ for the next time moment. The details of this step are dependent upon the particular method of generating the second quality factor, and are described in greater detail below.

With steps (5)–(12) completed for the current time moment, they are re-iterated for subsequent time moments.

Methods for Generating the First Quality Factor

There are several possible methods of generating the first quality factor $Q_n$ in the above-described general steps (3) and (8). We provide two of our preferred ones below.

First Method for Generating $Q_n$

The first quality factor $Q_n$ is generated as a function of a covariance matrix $\Re^Y_n$ which is representative of the errors in the receiver's coordinates and time offset caused by measurement errors in the pseudoranges $y_n$. Matrix $\Re^Y_n$ is typically a 4-by-4 matrix, and in preferred embodiments the first quality factor $Q_n$ is generated from the diagonal elements of matrix $\Re^Y_n$ according to the form:

$$Q_n = [\Re^Y_{n,11} + \Re^Y_{n,22} + \Re^Y_{n,33} + \Re^Y_{n,44}]^{1/2}$$

where $\Re^Y_{n,kk}$ are the diagonal elements of the covariance matrix $\Re^Y_n$. The first quality factor $Q_n$ may also be generated in proportional to one or more of the forms of:

$$Q_n \, [\, \Re^Y_{n,11} + \Re^Y_{n,22} + \Re^Y_{n,33} + \Re^Y_{n,44}]^k,$$
$$Q_n \exp[\, \Re^Y_{n,11} + \Re^Y_{n,22} + \Re^Y_{n,33} + \Re^Y_{n,44}],$$

and $$Q_n \log[\, \Re^Y_{n,11} + \Re^Y_{n,22} + \Re^Y_{n,33} + \Re^Y_{n,44}],$$

where k is a positive number greater than 0. Each of these forms generates the first quality factor $Q_n$ thereby being a monotonic increasing function of the diagonal elements of matrix $\Re^Y_n$.

A common form of the covariance matrix $\Re^Y_n$ is:

$$\Re^Y_n = [H^T_{1,n} \cdot (R^Y_n)^{-1} \cdot H_{1,n}]^{-1},$$

where the matrix $H_{1,n}$ is the Jacobian matrix, or directional cosines matrix, for the collection of satellites that are currently being received and tracked by the receiver.

Matrix $R^Y_n$ can be defined by several ways:

(a) In calculating covariance matrix $\Re^Y_n$, matrix $R^Y_n$ is the known matrix of the pseudorange measurement errors.

(b) In calculating covariance matrix $\Re^Y_n$, instead of matrix $(R^Y_n)^{-1}$, we can use a diagonal matrix whose elements are values in direct proportion to the elevation angle of the corresponding satellite. The more elevation angle the more strength of the received signal, so that replacement enables to compute covariance matrix $\Re^Y_n$ both simply and well.

(c) in calculating covariance matrix $\Re^Y_n$, instead of $(R^Y_n)^{-1}$ we can use a scalar matrix whose elements are values in direct proportion to a generalized factor called "satellite health". The more this factor, the more the weight that is given to the corresponding satellite signal. The replacement allows one to compute covariance matrix $\Re^Y_n$ both simply and well. Each GPS satellite transmits a six-bit indicator of its health within the 50 Hz low-frequency transmitted by the satellite. The low frequency signal conveys a 1,500-bit frames on a periodic basis. Each frame is divided into five sub-frames, with each sub-frame containing ten 30-bit words. Twenty-five consecutive frames constitute a "master frame." The information within sub-frames 1–3 is the same for the 25 frames of a master frame. However, for sub-frames 4 and 5, consecutive frames of a master frame contain different "pages" for each frame. There are a total of 25 pages for each of sub-frames 4 and 5. For satellites 1–24 of the GPS system, the six-bit health indication is located in bits 17 through 22 of the third word of the 25-th page of the fifth sub-frame. For satellites 25–32, the six-bit health indication is located in bits 17 through 22 of the third word of the 25-th page of the fourth sub-frame. The most-significant bit of the health indication indicates a summary of the health of the navigational data, where 0 means that the data are good and 1 means that some or all the data is bad. The five least significant bits indicate the health of the signal components in accordance with the codes provided in the *Interface Control Document GPS*-200, *Revision C*, Initial Release. Our matrix elements representative of the "satellite health" for composing covariance matrix $\Re^Y_n$ may be based upon the most-significant bit, the code within the five least-significant bits, or upon a combination of both factors.

(d) In calculating covariance matrix $\Re^Y_n$, instead of $(R^Y_n)^{-1}$ we can use unit matrix. With that, calculation of covariance matrix $\Re^Y_n$ is more simpler.

The forms of matrixes $H_{1,n}$ and $R^Y_n$, as well as methods for generating their matrix elements, are well known to those of ordinary skill in the global positioning art, and a detailed description thereof is not necessary for one of ordinary skill in the art to make and use the present invention.

Second Method for Generating $Q_n$

The first quality factor $Q_n$ may represent accuracy by increasing in value as the accuracy increases, or by decreasing in value as the accuracy increases. In the exemplary generated form for the first quality factor described above, $Q_n$ is proportional to the square root of the trace of the error covariance matrix $\Re^Y_n$, and thus $Q_n$ decreases in value (but remains positive) as the accuracy of the snapshot solution increases. The opposite orientation may be obtained in a number of ways, such as generating the first quality factor $Q_n$ as a function of:

$[\Re^\Upsilon_{n,11}+\Re^\Upsilon_{n,22}+\Re^\Upsilon_{n,33}+\Re^\Upsilon_{n,44}]^{-\frac{1}{2}}$, which will increase in value as the accuracy of the solution increases. Of course, the same orientation should be used for both the first and second quality factors. For the purposes of illustrating the present invention, the preferred exemplary embodiments described herein will use the orientation where the quality factors decrease in value as the accuracies increase. The first quality factor $Q_n$ may also be generated in proportional to one or more of the forms of:

$Q_n [\Re^\Upsilon_{n,11}+\Re^\Upsilon_{n,22}+\Re^\Upsilon_{n,33}+\Re^\Upsilon_{n,44}]^k$, $Q_n \exp[-(\Re^\Upsilon_{n,11}+\Re^\Upsilon_{n,22}+\Re^\Upsilon_{n,33}+\Re^\Upsilon_{n,44})]$, and $Q_n -\log[\Re^\Upsilon_{n,11}+\Re^\Upsilon_{n,22}+\Re^\Upsilon_{n,33}+\Re^\Upsilon_{n,44}]$, where k is a negative number less than 0. Each of these forms generates the first quality factor $Q_n$ thereby being a monotonic decreasing function of the diagonal elements of matrix $\Re^\Upsilon_n$.

As in the first Method for Generating $Q_n$, matrix $R^\Upsilon_n$ can be generated according to the above-described methods (a), (b), (c),and (d).

Initialization Procedures in Step (4)

Below, we describe ten (10) exemplary methods of generating the second quality factor $Q_n'$ in the above-described general step (9). Some of these methods use data parameters which need to be initialized in step (4) for time n=0. For others of our exemplary methods of generating $Q_n'$ we described preferred implementations which use a temporary parameter $MQ_{n+1}'$ to reduce memory storage requirements and to speed computations. Before describing these methods for step (9), we describe the initialization procedures that we undertake at time n=0 in step (4) so that the second quality factor at time n=1 ($Q_1'$) may be readily generated.

Initialization in Step (4) for the First Method of Generating $Q_n'$ in Step (9)

We set the value of the temporary parameter $MQ_{n+1}'$ at the initial time n=0 as $MQ_{n+1}'=Q_n$ (n=0), which will be needed later for generating quality factor $Q_1'$ at the next time moment (n=1).

Initialization for the Second Method of Generating $Q_n'$ in Step (9)

In step (4), we set the value of the temporary parameter $MQ_{n+1}'$ at the initial time n=0 as $MQ_{n+1}'=Q_n$ (n=0), which will be needed later for generating quality factor $Q_1'$ at the next time moment (n=1).

Initialization for the Third Method of Generating $Q_n'$ in Step (9)

In addition to using temporary parameter $MQ_{n+1}'$, we use a vector kq[*] of parameter values: kq[0], kq[1], . . . kq[m]. In step (4), we set the value of the temporary parameter $MQ_{n+1}'$ at the initial time n=0 as $MQ_{n+1}'=Q_n$ (n=0), which will be needed later for generating quality factor $Q_1'$ at the next time moment (n=1).

A preferred set of component values for the vector kq[*] may be calculated and set in step (4) in accordance with expression:

$kq[i]=(1+0.01*\Delta t/(i+1))$, i=0, 1, 2, . . . , m, where $\Delta t=t_n-t_{n-1}$ is the duration of the epoch in seconds.

Initialization for the Fourth Method of Generating $Q_n'$ in Step (9)

In addition to using temporary parameter $MQ_{n+1}'$, we use a vector kq[*] of parameter values: kq[0], kq[1], . . . kq[m]. In step (4), we set the value of the temporary parameter $MQ_{n+1}'$ at the initial time n=0 as $MQ_{n+1}'=Q_n$ (n=0), which will be needed later for generating quality factor $Q_1'$ at the next time moment (n=1).

A preferred set of component values for the vector kq[*] may be calculated and set in step (4) in accordance with expression:

$kq[i]=(1-0.01*\Delta t/(i+1))$, i=0, 1, 2, . . . , m, where $\Delta t=t_n-t_{n-1}$ is the duration of the epoch in seconds.

Initialization for the Fifth Method of Generating $Q_n'$ in Step (9)

We set the value of the temporary parameter $MQ_{n+1}'$ at the initial time n=0 as $MQ_{n+1}'=Q_n$ (n=0), which will be needed later for generating quality factor $Q_1'$ at the next time moment (n=1).

Initialization for the Sixth Method of Generating $Q_n'$ in Step (9)

We set the value of the temporary parameter $MQ_{n+1}'$ at the initial time n=0 as $MQ_{n+1}'=Q_n$ (n=0), which will be needed later for generating quality factor $Q_1'$ at the next time moment (n=1).

Initialization for the Seventh Method of Generating $Q_n'$ in Step (9)

In addition to using temporary parameter $MQ_{n+1}'$, we use a vector kq[*] of parameter values: kq[0], kq[1], . . . kq[m]. In step (4), we set the value of the temporary parameter $MQ_{n+1}'$ at the initial time n=0 as $MQ_{n+1}'=Q_n$ (n=0), which will be needed later for generating quality factor $Q_1'$ at the next time moment (n=1).

A preferred set of component values for the vector kq[*] may be calculated and set in step (4) in accordance with expression:

$kq[i]=(1+0.01*\Delta t/(i+1))$, i=0, 1, 2, . . . , m, where $\Delta t=t_{n-1}$ is the duration of the epoch in seconds.

Initialization for the Eighth Method of Generating $Q_n'$ in Step (9)

In addition to using temporary parameter $MQ_{n+1}'$, we use a vector kq[*] of parameter values: kq[0], kq[1], . . . kq[m]. In step (4), we set the value of the temporary parameter $MQ_{n+1}'$ at the initial time n=0 as $MQ_{n+1}'=Q_n$ (n=0), which will be needed later for generating quality factor $Q_1'$ at the next time moment (n=1).

A preferred set of component values for the vector kq[*] may be calculated and set in step (4) in accordance with expression:

$kq[i]=(1-0.01*\Delta t/(i+1))$, i=0, 1, 2, . . . , m, where $\Delta t=t_n-t_{n-1}$ is the duration of the epoch in seconds.

Initialization for the Ninth and Tenth Methods of Generating $Q_n'$ in Step (9)

The ninth and tenth methods use the following eight parameters $\Psi_{1,n}, \Psi_{2,n}, \Psi_{3,n}, \Psi_{4,n}, \Phi_1, \Phi_2, \Phi_3$, and $\Phi_4$, which are preset in step (4), as described below. The parameters $\Psi_{1,n}, \Psi_{2,n}, \Psi_{3,n}$, and $\Psi_{4,n}$ represent diagonal values of the covariance matrix $\Re^\Upsilon_n$ at time moment $t_n$, and the parameters $\Phi_1, \Phi_2, \Phi_3$, and $\Phi_4$ represent the square roots of the four diagonal values of the covariance matrix $\Re^\Upsilon$ at the last time at which the quality factors indicated that the snapshot solution values had better accuracy than the predicted values. At the initialization step (4), these parameters are set as follows (for time moment n=0):

$\Phi_1=\sqrt{\Re_{0,11}}$, $\Psi_{1,n}=\sqrt{\Re_{0,11}}$, $\Phi_2=\sqrt{\Re_{0,22}}$, $\Psi_{2,n}=\sqrt{\Re_{0,22}}$, $\Phi_3=\sqrt{\Re_{0,33}}$, $\Psi_{3,n}=\sqrt{\Re_{0,33}}$, $\Phi_4=\sqrt{\Re_{0,44}}$, $\Psi_{4,n}=\sqrt{\Re_{0,44}}$.

Methods for Generating the Second Quality Factor

We now describe ten (10) exemplary methods of generating the second quality factor $Q_n'$ in the above-described general step (9).

First Method for Generating $Q_n'$

This method is applicable in the case when the first quality factor decreases in value (e.g., magnitude) as the accuracy of the snapshot-solution values become better, and where the second quality factor decreases in value as the accuracy of the predicted estimates becomes better. In the initialization step (4), the initial value of the parameter $MQ_n'$ for the initial time is set equal to the initial value of the first quality factor: $MQ_n'=Q_n$ (n=0). Then in the re-iterated step (9), the second quality factor $Q_n'$ for the current time $t_n$ is generated as:

$$Q_n'=k\cdot MQ_n',$$

where k>1. A preferred value of k is k=1.01. A suitable range of values for k is (1+0.2*Δt) to (1+0.002*Δt), where $\Delta t=t_n-t_{n-1}$ is the duration of the epoch in seconds.

This method does not directly measure the accuracy of the predicted values, but rather the accuracy of the estimates for the predicted values. As described above, the predicted values for the current time moment are generated as the final estimates at the previous time moment plus the increment estimates. The errors in the increment estimates can be estimated before hand, and the value of k is representative of that estimated error. As long as the second quality factor Q' remains below the first quality factor Q, the value of the second factor is increased in value at each successive time moment, and thus increases monotonically over time. When the second quality factor Q' exceeds the first quality factor Q, its value is set to that of the first quality factor, and the process of monotonically increasing Q' is reset so it can start again.

In this method, step (12) comprises the step of generating the parameter $MQ_{n+1}$ to be used in step (9) for the next time moment $t_{n+1}$ as follows: $MQ_{n+1}=MIN\{Q_n, Q_n'\}$. The parameter $MQ_{n+1}$ may be stored in a temporary memory register or equivalent thereof until step (9) is performed for the next time moment $t_{n+1}$. As one example, a single memory register $M_{Q2}$ (or equivalent) may be used to store the parameter $MQ_{n+1}$. In this embodiment, the MIN function may be implemented in step (12) with the following steps: determining if $Q_n'$ is greater than $Q_n$ (or greater than or equal to $Q_n$), and if so, setting the parameter $MQ_{n+1}$ to the value of $Q_n$; otherwise, setting the parameter $MQ_{n+1}$ to the value of $Q_n'$. In this embodiment, a single memory register $M_{Q1}$ (or equivalent) may be used to store values of the parameter $MQ_{n+1}$.

Second Method for Generating $Q_n'$

This method is similar to the first method but is applicable in the case when the first quality factor increases in value (e.g., magnitude) as the accuracy of the snapshot-solution values becomes better, and when the second quality factor increases in value as the accuracy of the predicted estimates becomes better.

In step (4), the initial value of the parameter $MQ_n'$ for the initial time is set equal to the initial value of the first quality factor: $MQ_n'=Q_n$ (n=0).

Then in the re-iterated step (9), the second quality factor $Q_n'$ for the current time $t_n$ is generated as $$Q_n'=k\cdot MQ_n',$$

where k<1. A preferred value of k is k=0.99. A suitable range of values for k is (1−0.2*Δt) to (1−0.002*Δt), where $\Delta t=t_n-t_{n-1}$ is the duration of the epoch in seconds.

In this method, step (12) comprises the step of generating the parameter $MQ_{n+1}$ to be used in step (9) for the next time moment $t_{n+1}$ as follows: $MQ_{n+1}=MAX\{Q_n, Q_n'\}$. The parameter $MQ_{n+1}$ may be stored in a temporary memory register or equivalent thereof until step (9) is performed for the next time moment $t_{n+1}$. The single register $M_{Q2}$ may be used in this method in the same manner as above in the first method.

If this second method is used, the weighting factor may be generated in step (10) as:

(A) If the second quality factor $Q_n'$ represents less accuracy than the first quality factor $Q_n$ (e.g., $Q_n'<Q_n$ for the second orientation) then $\alpha_n$ is set to a value of 1 ($\alpha_n=1$), otherwise it is set to a value of zero ($\alpha_n=0$);

or as:

(B) If the second quality factor $Q_n'$ represents the same accuracy or less than the first quality factor $Q_n$ (e.g., $Q_n' \leq Q_n$ for the second orientation) then $\alpha_n$ is set to a value of 1 ($\alpha_n=1$), otherwise it is set to a value of zero ($\alpha_n=0$);

or as:

(C) If $Q_n'<Q_n$, ($Q_n'$ representing less accuracy by having a lower value), then $\alpha_n$ is set as:

$$\alpha_n=0.5\cdot\exp\{en^*\log[2\cdot Q_n/(Q_n'+Q_n)]\},$$

otherwise $\alpha_n$ is set as:

$$\alpha_n=1-0.5\cdot\exp\{en^*\log[2\cdot Q_n'/(Q_n'+Q_n)]\},$$

Third Method for Generating $Q_n'$

This method is applicable in the case when the first quality factor decreases in value (e.g., magnitude) as the accuracy of the snapshot-solution values becomes better, and where the second quality factor decreases in value as the accuracy of the predicted estimates becomes better. This method is similar to the first method, except it has a value of "k" which is varied as a function of time and conditions.

In step (4), the initial value of the parameter $MQ_n'$ for the initial time is set equal to the initial value of the first quality factor: $MQ_n'=Q_n$ (n=0).

Then in step (9), the second quality factor $Q_n'$ for the current time $t_n$ is generated as:

$$Q_n'=kq[n-p]\cdot MQ_n',$$

where:

kq[*] is a vector of parameter values: kq[0], kq[1], . . . kq[m], each of which is greater than 1 ;

"n" is the current integer value representing the current time moment $t_n$; n is incremented each time steps (5)–(12) are reiterated;

"p" is an integer which is less or equal to "n";

if the quantity (n−p) is equal or greater than m, then p=n−m;

The vector kq[*] corresponds to the scalar k, except that one of the components of vector kq[*] is selected at each time moment, and the selection of the component can be made to bring about a time-dependent value of k. In one preferred implementation, the value of kq[0] is used for the time moment $t_n=t_p$, and a successive component (e.g., kq[1]) is used at successive time moment $t_{n+1}$.

This is accomplished by setting p=0 in the initialization step (4), and by setting p=n in the step (12) if $Q_n<Q_n'$, otherwise the value of p is left unchanged. Step (12) performs the evaluation of the parameter $MQ_{n+1}=MIN\{Q_n, Q'_n\}$ to be used in step (9) for the next time moment $t_{n+1}$. The parameter $MQ_{n+1}$ may be stored in a temporary memory register or equivalent thereof until step (9) is preformed for the next time moment $t_{n+1}$. The single register $M_{Q2}$ may be used in this method in the same manner as above in the first method.

Step (12) may include an additional test to ensure that the difference quantity (n−p) does not exceed "m", which corresponds to the last component in vector kq[*]. This may be readily done by incrementing p whenever the condition (n−p)>m exits.

A preferred set of component values for the vector kq[*] may be calculated in accordance with expression:

$$kq[i]=(1+0.01*\Delta t/(i+1)), i=0, 1, 2, \ldots, m,$$

where $\Delta t=t_n-t_{n-1}$ is the duration of the epoch in seconds. A preferred value for m is 60.

A suitable range of values for kq[i] is from $(1+0.2*\Delta t/(i+1))$ to $(1+0.002*\Delta t/(i+1))$. A suitable range of values form is from 1 to 400.

It may be appreciated that the above incrementing of kq[*] may be performed by assigning a memory shift register to hold a sequence of kq[i], i=0, 1, 2, ..., m. The memory shift register has parallel and serial inputs. In step (12) if $Q_n<Q_n'$ is satisfied, then the record is performed by the parallel input of a vector kq[i], i=0, 1, 2, ..., m, in the memory shift register, otherwise, the shift of the register's content is performed along with simultaneous recording of the value of kq[m] by serial input.

Fourth Method for Generating $Q_n'$

This method is similar to the third method but is applicable in the case when the first quality factor increases in value (e.g., magnitude) as the accuracy of the snapshot-solution values becomes better, and when the second quality factor increases in value as the accuracy of the predicted estimates becomes better.

In step (4), the initial value of the parameter $MQ_n'$ for the initial time is set equal to the initial value of the first quality factor: $MQ_n'=Q_n$ (n=0).

Then in step (9), the second quality factor $Q_n'$ for the current time $t_n$ is generated as:

$$Q_n'=kq[n-p]\cdot MQ'_n,$$

where:
kq[*] is a vector of parameter values: kq[0], kq[1], ... kq[m], each of which is less than 1;
"n" is the current integer value representing the current time moment $t_n$; n is incremented each time steps (5)–(12) are reiterated;
"p" is an integer which is less or equal "n";
if n−p equal or greater than m, then p=n−m;
In the initialization step (4) set p=0, and in the step (12) set p=n if $Q_n<Q_n'$, otherwise the value of p is left unchanged. Step (12) performs the evaluation of the parameter $MQ_{n+1}=MAX\{Q_n, Q'_n\}$ to be used in step (9) for the next time moment $t_{n+1}$. The parameter $MQ_{n+1}$ may be stored in a temporary memory register or equivalent thereof until step (9) is preformed for the next time moment $t_{n+1}$. The single register $M_{Q2}$ may be used in this method in the same manner as above in the third method.

Step (12) may include an additional test to ensure that the difference quantity (n−p) does not exceed "m", which corresponds to the last component in vector kq[*]. This may be readily done by incrementing p whenever the condition (n−p)>m exits.

The indexing of vector kq[*] may be done as described above in the third method of generating $Q_n'$.

A preferred set of component values for the vector kq[*] may be calculated in accordance with expression:

$$kq[i]=1-0.01*\Delta t/(i+1), i=0, 1, 2, \ldots, m,$$

where $\Delta t=t_n-t_{n-1}$ is the duration of the epoch in seconds. A preferred value for m is 60.

A suitable range of values for kq[i] is from $(1-0.2*\Delta t/(i+1))$ to $(1-0.002*\Delta t/(i+1))$. A suitable range of values for m is 1 to 400.

Fifth Method for Generating $Q_n'$

The fifth method is the same as the first method except that the form:

$$Q_n'=(MQ'_n)^k$$

is used instead of the form:

$$Q_n'=k\cdot MQ'_n.$$

A preferred value of k is 1.01.

Sixth Method for Generating $Q_n'$

The sixth method is the same as the second method except that the form:

$$Q_n'=(MQ'_n)^k$$

is used instead of the form:

$$Q_n'=k\cdot MQ'_n.$$

A preferred value of k is 0.99.

Seventh Method for Generating $Q_n'$

The seventh method is the same as the third method except that the form:

$$Q_n'=(MQ'_{n-1})^{kq[n-p]}$$

is used instead of the form:

$$Q_n'=kq[n-p]\cdot MQ'_{n-1}.$$

The parameters are the same as previously described. An exemplary set of component values of kq[*] may be calculated in accordance with expression:

$$kq[i]=1+0.01*\Delta t/(i+1), i=0, 1, 2, \ldots, m,$$

where $\Delta t=t_n-t_{n-1}$.

Eighth Method for Generating $Q_n'$

The eighth method is the same as the fourth method except that the form:

$$Q_n'=(MQ'_n)^{kq[n-p]}$$

is used instead of the form:

$$Q_n'=kq[n-p]\cdot MQ'_n.$$

The parameters are the same as previously described. An exemplary set of component values of kq[*] may be calculated in accordance with expression:

$$kq[i]=1-0.01*\Delta t/(i+1), i=0, 1, 2, \ldots, m,$$

where $\Delta t=t_n-t_{n-1}$.

Ninth Method for Generating $Q_n'$

This method is applicable in the case when the first quality factor decreases in value (e.g., magnitude) as the accuracy of the snapshot-solution values become better, and where the second quality factor decreases in value as the accuracy of the predicted estimates becomes better.

This method generates the second quality factor $Q_n'$ based on starting with an initial estimate of the second quality factor $Q_0'$, and then updates the second quality factor at subsequent time moments by generating incremental changes based on changes in the diagonal elements $\Re^\gamma_{n,kk}$ of the covariance matrix $\Re^\gamma_n$, where matrix $\Re^\gamma_n$ is generated as described in the above section: Methods for Generating the First Quality Factor.

In the initialization step (4), the initial value of the second quality factor for the initial time is set equal to the initial value of the first quality factor: $Q_0'=Q_0$.

The method uses the following parameters to generate $Q_n'$: $\Psi_{1,n}$, $\Psi_{2,n}$, $\Psi_{3,n}$, $\Psi_{4,n}$, $\Phi_1$, $\Phi_2$, $\Phi_3$, and $\Phi_4$. The parameters $\Psi_{1,n}$, $\Psi_{2,n}$, $\Psi_{3,n}$, and $\Psi_{4,n}$ represent the square roots of the four diagonal values of the covariance matrix $\Re^\gamma_n$ at time moment $t_n$, and the parameters $\Phi_1$, $\Phi_2$, $\Phi_3$, and $\Phi_4$ represent the square roots of the four diagonal values of the covariance matrix $\Re^\gamma$ at the last time at which the quality factors indicated that the snapshot solution values had better accuracy than the predicted values. At initialization step (4), these parameters are set as follows (for time moment n=0):

$$\Phi_1=\sqrt{\Re_{0,11}},\ \Psi_{1,n}=\sqrt{\Re_{0,11}},$$

$$\Phi_2=\sqrt{\Re_{0,22}},\ \Psi_{2,n}=\sqrt{\Re_{0,22}},$$

$$\Phi_3=\sqrt{\Re_{0,33}},\ \Psi_{3,n}=\sqrt{\Re_{0,33}},$$

$$\Phi_4=\sqrt{\Re_{0,44}},\ \Psi_{4,n}=\sqrt{\Re_{0,44}}.$$

In step (9) the second quality factor is generated in the form:

$$Q_n'=[(\Psi_{1,n})^2+(\Psi_{2,n})^2+(\Psi_{3,n})^2+(\Psi_{4,n})^2]^{1/2} \quad (5)$$

where the quantities $\Psi_{1,n}$, $\Psi_{2,n}$, $\Psi_{3,n}$, and $\Psi_{4,n}$ are generated for time moments n>0 as follows:

$$\Psi_{1,n}=\Psi_{1,n-1}+Ki\cdot\Delta t\cdot(\sqrt{\Re_{n,11}}-\Phi_1);$$

$$\Psi_{2,n}=\Psi_{2,n-1}+Ki\cdot\Delta t\cdot(\sqrt{\Re_{n,22}}-\Phi_2);$$

$$\Psi_{3,n}=\Psi_{3,n-1}+Ki\cdot\Delta t\cdot(\sqrt{\Re_{n,33}}-\Phi_3);$$

$$\Psi_{4,n}=\Psi_{4,n-1}+Ki\cdot\Delta t\cdot(\sqrt{\Re_{n,44}}-\Phi_4);$$

where:

$\Delta t=t_n-t_{n-1}$ is the duration of the epoch in seconds;

Ki is a coefficient which is determined by speed of the predicted receiver coordinate values $\hat{P}'_{x,n}$, $\hat{P}'_{y,n}$, $\hat{P}'_{z,n}$ and by the degradation rate of the receiver's time offset $\hat{P}'_{\tau,n}$. For stand alone navigation (SAN) mode, the inventors found a preferred value for Ki to be Ki=0.0075. For differential DGPS) mode, the inventors found a preferred value of Ki to be Ki=0.0001; and where $\Psi_{1,n-1}$, $\Psi_{2,n-1}$, $\Psi_{3,n-1}$, and $\Psi_{4,n-1}$ are the values of $\Psi_{n,1}$, $\Psi_{2,n}$, $\Psi_{3,n}$, and $\Psi_{4,n}$ at the previous time moment $t_{n-1}$.

In step (12), the following step is taken: if the quality factors $Q_n$ and $Q_n'$ indicate that the snapshot values at time moment $t_n$ are more accurate than the predicted values at time moment $t_n$, then the values of $\Psi_n$ and $\Phi$ are reset as follows:

$$\Phi_1=\sqrt{\Re_{n,11}},\ \Psi_{1,n}=\sqrt{\Re_{n,11}},$$

$$\Phi_2=\sqrt{\Re_{n,22}},\ \Psi_{2,n}=\sqrt{\Re_{n,22}},$$

$$\Phi_3=\sqrt{\Re_{n,33}},\ \Psi_{3,n}=\sqrt{\Re_{n,33}},$$

$$\Phi_4=\sqrt{\Re_{n,44}},\ \Psi_{4,n}=\sqrt{\Re_{n,44}}.$$

As one implementation of the ninth method, four memory registers $A_1$, $A_2$, $A_3$, and $A_4$ are allocated for storing the parameters $\Psi_{1,n}$, $\Psi_{2,n}$, $\Psi_{3,n}$, $\Psi_{4,n}$ for the current time moment $t_n$ and four memory registers $B_1$, $B_2$, $B_3$, and $B_4$ are allocated for these parameters ($\Psi_{1,n-1}$, $\Psi_{2,n-1}$, $\Psi_{3,n-1}$, $\Psi_{4,n-1}$) at the previous time moment $t_{n-1}$. In step (12), the following additional step is performed (after the quality factors have been evaluated to see if $\Psi_n$ and $\Phi$ require resetting):

$$B_1=A_1,$$

$$B_2=A_2,$$

$$B_3=A_3,$$

and $$B_4=A_4.$$

As another implementation, four memory registers $A_1$, $A_2$, $A_3$, and $A_4$ are used to alternately store the parameter set $\Psi_{1,n}$, $\Psi_{2,n}$, $\Psi_{3,n}$, $\Psi_{4,n}$ and the parameter set $\Psi_{1,n-1}$, $\Psi_{2,n-1}$, $\Psi_{3,n-1}$, $\Psi_{4,n-1}$. At step (4) the four memory registers are set as follows:

$$A_1=\sqrt{\Re_{0,11}},\ A_2=\sqrt{\Re_{0,22}},\ A_3=\sqrt{\Re_{0,33}},\ A_4=\sqrt{\Re_{0,44}}.$$

Prior to the beginning of step (9), registers $A_1$, $A_2$, $A_3$, and $A_4$ hold the values of parameters $\Psi_{1,n-1}$, $\Psi_{2,n-1}$, $\Psi_{3,n-1}$, and $\Psi_{4,n-1}$, respectively. At step (9), the register values are updated as follows before the second quality factor $Q_n'$ is generated at step (9):

$$A_1=A_1+Ki\cdot\Delta t\cdot(\sqrt{\Re_{n,11}}-\Phi_1);$$

$$A_2=A_2+Ki\cdot\Delta t\cdot(\sqrt{\Re_{n,22}}-\Phi_2);$$

$$A_3=A_3+Ki\cdot\Delta t\cdot(\sqrt{\Re_{n,33}}-\Phi_3);$$

$$A_4=A_4+Ki\cdot\Delta t\cdot(\sqrt{\Re_{n,44}}-\Phi_4).$$

At step (9), the second quality factor is thereafter generated as:

$$Q_n'=[(A_1)^2+(A_2)^2+(A_3)^2+(A_4)^2]^{1/2}$$

At the end of step (9), and before the beginning of step (12), registers $A_1$, $A_2$, $A_3$, and $A_4$ now hold the values of parameters $\Psi_{1,n}$, $\Psi_{2,n}$, $\Psi_{3,n}$, and $\Psi_{4,n}$, respectively. If the quality factors $Q_n$ and $Q_n'$ indicate that the snapshot values at time moment $t_n$ are more accurate than the predicted values at time moment $t_n$ then the values $\Psi_n$ (as stored in registers $A_1$, $A_2$, $A_3$, and $A_4$) and $\Phi$ are reset as follows:

$$\Phi_1=\sqrt{\Re_{n,11}},\ A_1=\sqrt{\Re_{n,11}},$$

$$\Phi_2=\sqrt{\Re_{n,22}},\ A_2=\sqrt{\Re_{n,22}},$$

$$\Phi_3=\sqrt{\Re_{n,33}},\ A_3=\sqrt{\Re_{n,33}},$$

$$\Phi_4=\sqrt{\Re_{n,44}},\ A_4=\sqrt{\Re_{n,44}}.$$

When we repeat back to step (5) from step (12), we will increment the time moment, and therefore registers $A_1$, $A_2$, $A_3$, and $A_4$ will then hold the values of parameters $\Psi_{1,n-1}$, $\Psi_{2,n-1}$, $\Psi_{3,n-1}$, and $\Psi_{4,n-1}$, respectively, for the reiteration of step (9) at the next time moment.

In addition to generating the second quality factor $Q_n'$ according to equation (5) above, it may be generated in proportion to one or more of the following forms:

$$Q_n' [(\Psi_{1,n})^2 + (\Psi_{2,n})^2 + (\Psi_{3,n})^2 + (\Psi_{4,n})^2]^k, \quad \text{A.}$$

$$Q_n' \exp[(\Psi_{1,n})^2 + (\Psi_{2,n})^2 + (\Psi_{3,n})^2 + (\Psi_{4,n})^2], \quad \text{B.}$$

and $$Q_n' \log[(\Psi_{1,n})^2 + (\Psi_{2,n})^2 + (\Psi_{3,n})^2 + (\Psi_{4,n})^2], \quad \text{C.}$$

when the first quality factor $Q_n$ is generated in proportion to one or more of the corresponding following forms:

$$Q_n [\mathfrak{R}^{\gamma}_{n,11} + \mathfrak{R}^{\gamma}_{n,22} + \mathfrak{R}^{\gamma}_{n,33} + \mathfrak{R}^{\gamma}_{n,44}]^k, \quad \text{A.}$$

$$Q_n \exp[\mathfrak{R}^{\gamma}_{n,11} + \mathfrak{R}^{\gamma}_{n,22} + \mathfrak{R}^{\gamma}_{n,33} + \mathfrak{R}^{\gamma}_{n,44})], \quad \text{B.}$$

and $$Q_n \log[\mathfrak{R}^{\gamma}_{n,11} + \mathfrak{R}^{\gamma}_{n,22} + \mathfrak{R}^{\gamma}_{n,33} + \mathfrak{R}^{\gamma}_{n,44}], \quad \text{C.}$$

where k is a positive number greater than 0.

Tenth Method for Generating $Q_n'$

This method is applicable in the case when the first quality factor increase in value (e.g., magnitude) as the accuracy of the snapshot-solution values become better, and where the second quality factor increases in value as the accuracy of the predicted estimates becomes better. This method is identical to the ninth method of generating the second quality factor $Q_n'$ except that the second quality factor is generated in proportion to one or more of the following forms:

$$Q_n' = [(\Psi_{1,n})^2 + (\Psi_{2,n})^2 + (\Psi_{3,n})^2 + (\Psi_{4,n})^2]^{-1/2} \quad \text{D.}$$

$$Q_n' [(\Psi_{1,n})^2 + (\Psi_{2,n})^2 + (\Psi_{3,n})^2 + (\Psi_{4,n})^2]^k, \quad \text{E.}$$

$$Q_n' \exp[-(\Psi_{1,n})^2 + (\Psi_{2,n})^2 + (\Psi_{3,n})^2 + (\Psi_{4,n})^2], \quad \text{F.}$$

and $$Q_n' -\log[(\Psi_{1,n})^2 + (\Psi_{2,n})^2 + (\Psi_{3,n})^2 + (\Psi_{4,n})^2], \quad \text{G.}$$

when the first quality factor $Q_n$ is generated in proportion to one or more of the corresponding following forms:

$$Q_n [\mathfrak{R}^{\gamma}_{n,11} + \mathfrak{R}^{\gamma}_{n,22} + \mathfrak{R}^{\gamma}_{n,33} + \mathfrak{R}^{\gamma}_{n,44}]^{-1/2}, \quad \text{D.}$$

$$Q_n [\mathfrak{R}^{\gamma}_{n,11} + \mathfrak{R}^{\gamma}_{n,22} + \mathfrak{R}^{\gamma}_{n,33} + \mathfrak{R}^{\gamma}_{n,44}]^k, \quad \text{E.}$$

$$Q_n \exp[-(\mathfrak{R}^{\gamma}_{n,11} + \mathfrak{R}^{\gamma}_{n,22} + \mathfrak{R}^{\gamma}_{n,33} + \mathfrak{R}^{\gamma}_{n,44})], \quad \text{F.}$$

$$Q_n -\log[\mathfrak{R}^{\gamma}_{n,11} + \mathfrak{R}^{\gamma}_{n,22} + \mathfrak{R}^{\gamma}_{n,33} + \mathfrak{R}^{\gamma}_{n,44}], \quad \text{G.}$$

where k is a negative number less than 0.

The parameters $\Psi_{1,n}$, $\Psi_{2,n}$, $\Psi_{3,n}$, $\Psi_{4,n}$, $\Phi_1$, $\Phi_2$, $\Phi_3$, and $\Phi_4$ are initialized and generated in the same way as in the ninth method described above using $\mathfrak{R}^{\gamma}_n$, Ki, and $\Delta t$, and are reset in step (12) when the first and second quality factors $Q_n$ and $Q_n'$ indicate that the snapshot values at time moment $t_n$ are more accurate than the predicted values at time moment $t_n$. The above implementations using memory registers $A_1$, $A_2$, $A_3$, $A_4$, $B_1$, $B_2$, $B_3$, and $B_4$ used in the ninth method may also be used in the tenth method. Finally, in the initialization step (4), the initial value of the second quality factor for the initial time is set equal to the initial value of the first quality factor: $Q_0' = Q_0$.

Exemplary Method for Generating the Coordinate and Time-Offset Increments

As indicated above, the increments to the coordinates and time-offset ($\Delta \tilde{P}_{x,n-1,n}$, $\Delta \tilde{P}_{y,n-1,n}$, $\Delta \tilde{P}_{z,n-1,n}$, and $\Delta \tilde{P}_{\tau,n-1,n}$) are generated from the increments in the phases of the satellite signals that occur between time moments $t_{n-1}$ and $t_n$. Conventional global positioning receivers can continuously record the number of carrier cycles that have been received for each satellite signal being tracked by the receiver.

For the purposes of generating the increment values, we will assume that the receiver can provide, for each of the satellite signals being tracked, the number of carrier cycles that occur in the satellite signal between any two successive time moments $t_{n-1}$ and $t_n$. Assuming that there are a number "m" of satellites that are being tracked by the receiver, we can denote the number of carrier cycles between time moments $t_{n-1}$ and $t_n$ as a vector $\Delta \phi_n = [\Delta \phi_n^1, \Delta \Phi_n^2, \ldots, \Delta \phi_n^m]$. We will use the symbol $\Delta \phi_n^j$ generically refer to a component of vector $\Delta \phi_n$.

The increment $\Delta \phi_n^j$ in carrier phase of the j-th satellite over the time interval $t_{n-1}$ to $t_n$ can be related to changes in the distance between the j-th satellite and the receiver over that time interval, as well as changes in the receiver's clock offset over that same time interval. The change in distance is related to the following five (5) components:

1. The position coordinates of the j-th satellite at time moment $t_{n-1}$, which are represented herein by the column vector $\underline{P}_{n-1}^{SVj} = [P_{x,n-1}^{SVj}, P_{y,n-1}^{SVj}, P_{z,n-1}^{SVj}]^T$. The position of the j-satellite can be readily determined from the information transmitted in the low-frequency (50 Hz) information signal which is modulated onto the satellite's carrier signal, and it can be made more accurate by using that information in combination with a snapshot solution of the receiver's position and time offset (or by using the highly accurate position estimates $\hat{P}^f_{x,n-1}$, $\hat{P}^f_{y,n-1}$, $\hat{P}^f_{z,n-1}$, and $\hat{P}^f_{\tau,n-1}$). Methods of determining the satellite's position based on this information are well known to those of ordinary skill in this art, and a description thereof is not necessary for one of ordinary skill in the art to make and practice the present invention. In addition, the novelty of the present invention does not lie in the particular way of obtaining the satellite's position.

2. The receiver's true position coordinates at time moment $t_{n-1}$, which are represented herein by the column vector $\underline{P}_{n-1} = [P_{x,n-1}, P_{y,n-1}, P_{z,n-1}]^T$.

3. The position coordinates of the j-th satellite at time moment $t_n$, which are represented herein by the column vector $\underline{P}_n^{SVj} = [P_{x,n}^{SVj}, P_{y,n}^{SVj}, P_{z,n}^{SVj}]^T$. The motion of each satellite is smooth and highly predictable. Given the satellite's position at time moment $t_{n-1}$, the satellite's position at time moment $t_{n-1}$, and orbit-related information in the low-frequency signal, the satellite's position at the next time moment $t_n$ can be readily predicted (e.g., extrapolated) with a high degree of accuracy by methods which are well known to this art. Such an approach may be done in the method at hand. A description of methods for predicting satellite motion is not necessary for one of ordinary skill in the art to make and practice the present invention. In addition, the novelty of the present invention does not lie in the particular way of predicting the satellite's position.

4. The change in the receiver's position coordinates over the time from $t_{n-1}$ to $t_n$. This is one of the unknown quantities that we would like to find from the phase increment vector $\Delta \phi_n$. The change in the receiver's position coordinates is denoted by the column vector $\Delta \underline{P}_n = [\Delta P_{x,n-1,n}, \Delta P_{y,n-1,n}, \Delta P_{z,n-1,n}]^T$.

5. The change in the receiver's clock offset in its time scale over the time from $t_{n-1}$ to $t_n$. This is other of the unknown quantities that we would like to find from the phase increment vector $\Delta\phi_n$. The change in the receiver's time offset is denoted by $\Delta P_{\tau,n-1,n}$.

Each phase increment $\Delta\phi^j_n$ over the time interval from $t_{n-1}$ to $t_n$ can be related to the above five components as follows:

$$\Delta\phi^j_n = (1/\lambda^j) \cdot \{\rho[(\underline{P}_{n-1} + \Delta\underline{P}_n),$$
$$\underline{P}_n^{SVj}] - \rho[\underline{P}_{n-1}, \underline{P}_{n-1}^{SVj}] + c \cdot \Delta P_{\tau,n-1,n}$$
$$\} + \beta^j_{n,\phi} - \beta^j_{n-1,\phi} + \zeta^j_{n,\phi} - \zeta^j_{n-1,\phi} \quad (10)$$

Where:
- $\lambda^j$ is the carrier wavelength (this value is known before hand); dividing a distance by $\lambda^j$ converts that distance into the corresponding number of carrier cycles;
- $\rho[*,*]$ is the distance operator for the given coordinate that one is using. For example, in a rectangular coordinate system the distance function is:

$$\rho[\underline{A}, \underline{B}] = [(A_x - B_x)^2 + (A_y - B_y)^2 + (A_z - B_z)^2]^{1/2}$$

"c" is the speed of light, and it converts the time offset of the receiver into an equivalent distance;

$\beta^j_{n,\phi}$ and $\beta^j_{n-1,\phi}$ represent the correlated interference caused by "Selective Availability" (SA) at time moments $t_n$ and $t_{n-1}$, respectively; and $\zeta^j_{n,\phi}$ and $\zeta^j_{n-1,\phi}$ represent the noise present in the measurement of $\Delta\phi^j_n$ at time moments $t_n$ and $t_{n-1}$, respectively, and can be estimated by a covariance matrix $\underline{R}^\Phi$ for this measurement process, which is evaluated for the respective time moments $t_n$ and $t_{n-1}$.

By methods to be described shortly, equation (10) is formed for each satellite signal, then assembled in to a system of equations and solved for the unknowns $\Delta\underline{P}_n$ and $\Delta P_{\tau,n-1,n}$. In stand-alone navigation (SAN) operation, the values of the noise parameters and $\beta^j_{n,\phi}$, $\beta^j_{n-1,\phi}$, $\zeta^j_{n,\phi}$, and $\zeta^j_{n-1,\phi}$ cannot be precisely determined, but their root-mean-square (RMS) values can be estimated. In the differential navigation mode, portions of these noise parameters can be determined by a reference station (and then transmitted to the roving receiver), and the remaining uncertain portions may be estimated. Various methods for estimating these noise-related parameters are well known to the art, and a description thereof is not necessary in order for those of ordinary skill in the art to make and use the present invention. The use of the noise-related parameters $\beta^j_{n,\phi}$, $\beta^j_{n-1,\phi}$, $\zeta^j_{n,\phi}$, and $\zeta^j_{n-1,\phi}$, n equations (10) is optional, but their use improves the accuracy in the solution of the unknowns $\Delta\underline{P}_n$ and $\Delta P_{\tau,n-1,n}$.

In the above equations, we have assumed that the receiver's true position vector $\underline{P}_{n-1}$ at the previous time moment $t_{n-1}$ is precisely known for the purposes of defining the incremental position change vector $\Delta\underline{P}_n$. However, such precise knowledge is not possible under real measurement conditions. However, the highly accurate position estimates $\hat{P}^f_{x,n-1}$, $\hat{P}^f_{y,n-1}$, and $\hat{P}^f_{z,n-1}$ generated at the previous time moment may be used as a very good estimate. We refer to vector form of these estimates as $\underline{\hat{P}}^f_{n-1}$. The amount of error caused by this assumption may be estimated by substituting the vector quantity:

$$\underline{\hat{P}}^f_{n-1} + (\underline{P}_{n-1} - \underline{\hat{P}}^f_{n-1})$$

for the vector $\underline{P}_{n-1}$ in equation (10) and then carrying out the solution to find the corresponding error caused by the error vector $(\underline{P}_{n-1} - \underline{\hat{P}}^f_{n-1})$. We will use this approach below.

Equation (10) above is a non-linear equation because the unknown $\Delta\underline{P}_n$ is in the non-linear term: $\rho[(\underline{P}_{n-1} + \Delta\underline{P}_n), \underline{P}_n^{SVj}]$. General methods for performing least square solutions for non-linear equations are known to the art and may be used here to find best fit values for the unknowns. Such methods, however, can require large processor capacity. As another approach, the inventors have linearized the above non-linear pseudorange $\rho[(\underline{P}_{n-1} + \Delta\underline{P}_n), \underline{P}_n^{SVj}]$ in equation (10) around the position vector $\underline{\hat{P}}^f_{n-1}$ by use of a Taylor's series expansion as follows:

$$\rho[(\underline{P}_{n-1} + \Delta\underline{P}_n), \underline{P}_n^{SVj}] = \rho[(\underline{\hat{P}}^f_{n-1} + \Delta\underline{P}_n + (\underline{P}_{n-1} - \underline{\hat{P}}^f_{n-1})),$$
$$\underline{P}_n^{SVj}] \cong \rho[\underline{\hat{P}}^f_{n-1}, \underline{P}_n^{SVj}]$$
$$+ H^j_x(\underline{\hat{P}}^f_{n-1}, \underline{P}_n^{SVj}) \cdot [\Delta P_{x,n-1,n} +$$
$$(P_{x,n-1} - \hat{P}^f_{x,n-1})] + H^j_y(\underline{\hat{P}}^f_{n-1}, \underline{P}_n^{SVj}) \cdot [\Delta P_{y,n-1,n} +$$
$$(P_{y,n-1} - \hat{P}^f_{y,n-1})] + H^j_z(\underline{\hat{P}}^f_{n-1}, \underline{P}_n^{SVj}) \cdot [\Delta P_{z,n-1,n} + (P_{z,n-1} - \hat{P}^f_{z,n-1})], \quad (11A)$$

where
- $\rho[\underline{\hat{P}}^f_{n-1}, \underline{P}_n^{SVj}]$ is the distance between the receiver at time moment $t_{n-1}$ and the j-th satellite at time moment $t_n$, using the very good estimate $\underline{\hat{P}}^f_{n-1}$ for the receiver's position vector $\underline{P}_{n-1}$;
- $\Delta P_{x,n-1}$, $\Delta P_{y,n-1}$, $\Delta P_{z,n-1}$ are the unknowns;
- $(\hat{P}^f_{x,n-1} - P_{x,n-1})$, $(\hat{P}^f_{y,n-1} - P_{y,n-1})$, and $(P^f_{z,n-1} - P_{z,n-1})$, are the error terms arising from our choice to perform the Taylor series expansion around the estimated position vector $\underline{\hat{P}}^f_{n-1}$ instead of the true position vector $\underline{P}_{n-1}$;
- $H^j_x(\underline{\hat{P}}^f_{n-1}, \underline{P}_n^{SVj})$ is the partial derivative of the distance $\rho[\underline{\hat{P}}^f_{n-1}, \underline{P}_n^{SVj}]$ with respect to the X-coordinate of the receiver's position;
- $H^j_y(\underline{\hat{P}}^f_{n-1}, \underline{P}_n^{SVj})$ is the partial derivative of the distance $\rho[\underline{\hat{P}}^f_{n-1}, \underline{P}_n^{SVj}]$ with respect to the Y-coordinate of the receiver's position; and
- $H^j_z(\underline{\hat{P}}^f_{n-1}, \underline{P}_n^{SVj})$ is the partial derivative of the distance $\rho[\underline{\hat{P}}^f_{n-1}, \underline{P}_n^{SVj}]$ with respect to the Z-coordinate of the receiver's position.

The other non-linear pseudorange $\rho[\underline{P}_{n-1}, \underline{P}_{n-1}^{SVj}]$ in equation (10) uses the true position vector $\underline{P}_{n-1}$ for the receiver, but in practice we only have the estimated vector $\underline{\hat{P}}^f_{n-1}$. In this case, we substitute the vector $(\underline{\hat{P}}^f_{n-1} + (\underline{P}_{n-1} - \underline{\hat{P}}^f_{n-1}))$ for the vector $\underline{P}_{n-1}$ in this pseudorange, and then linearize the pseudorange around the position vector $\underline{\hat{P}}^f_{n-1}$ by use of a Taylor's series expansion as follows:

$$\rho[\underline{P}_{n-1}, \underline{P}_{n-1}^{SVj}] = \rho[(\underline{\hat{P}}^f_{n-1} + (\underline{P}_{n-1} - \underline{\hat{P}}^f_{n-1})), \underline{P}_{n-1}^{SVj}]$$
$$\cong \rho[\underline{\hat{P}}^f_{n-1}, \underline{P}_{n-1}^{SVj}] + H^j_x(\underline{\hat{P}}^f_{n-1}, \underline{P}_{n-1}^{SVj}) \cdot (P_{x,n-1} - \hat{P}^f_{x,n-1}) +$$
$$H^j_y(\underline{\hat{P}}^f_{n-1}, \underline{P}_{n-1}^{SVj}) \cdot (P_{y,n-1} - \hat{P}^f_{y,n-1}) +$$
$$H^j_z(\underline{\hat{P}}^f_{n-1}, \underline{P}_{n-1}^{SVj}) \cdot (P_{z,n-1} - \hat{P}^f_{z,n-1}); \quad (11B)$$

where
- $\rho[\underline{\hat{P}}^f_{n-1}, \underline{P}_{n-1}^{SVj}]$ is the distance between the receiver at time moment $t_{n-1}$ and the j-th satellite at time moment $t_{n-1}$, using the very good estimate $\underline{\hat{P}}^f_{n-1}$ for the receiver's position vector $\underline{P}_{n-1}$;
- $(\hat{P}^f_{x,n-1} - P_{x,n-1})$, $(\hat{P}^f_{y,n-1} - P_{y,n-1})$, and $(\hat{P}^f_{z,n-1} - P_{z,n-1})$ are the error terms arising from our choice to perform the Taylor series expansion around the estimated position vector $\underline{\hat{P}}^f_{n-1}$ instead of the true position vector $\underline{P}_{n-1}$;

$H^j_x(\hat{\underline{P}}^f_{n-1}, \underline{P}_{n-1}^{SVj})$ is the partial derivative of the distance $\rho[\underline{\hat{P}}^f_{n-1}, \underline{P}_{n-1}^{SVj}]$ with respect to the X-coordinate of the receiver's position;

$H^j_y(\hat{\underline{P}}^f_{n-1}, \underline{P}_{n-1}^{SVj})$ is the partial derivative of the distance $\rho[\underline{\hat{P}}^f_{n-1}, \underline{P}_{n-1}^{SVj}]$ with respect to the Y-coordinate of the receiver's position;

$H^j_z(\hat{\underline{P}}^f_{n-1}, \underline{P}_{n-1}^{SVj})$ is the partial derivative of the distance $\rho[\underline{\hat{P}}^f_{n-1}, \underline{P}_{n-1}^{SVj}]$ with respect to the Z-coordinate of the receiver's position.

The partial derivatives used in equation (11A) may be written in formal form as:

$$H^j_x(\hat{\underline{P}}^f_{n-1}, \underline{P}^{SVj}_n) = \frac{\partial \rho(\hat{\underline{P}}^f_{n-1}, \underline{P}^{SVj}_n)}{\partial \hat{P}^f_{x,n-1}}$$

$$H^j_y(\hat{\underline{P}}^f_{n-1}, \underline{P}^{SVj}_n) = \frac{\partial \rho(\hat{\underline{P}}^f_{n-1}, \underline{P}^{SVj}_n)}{\partial \hat{P}^f_{y,n-1}}$$

$$H^j_z(\hat{\underline{P}}^f_{n-1}, \underline{P}^{SVj}_n) = \frac{\partial \rho(\hat{\underline{P}}^f_{n-1}, \underline{P}^{SVj}_n)}{\partial \hat{P}^f_{z,n-1}},$$

and the partial derivatives used in equation (11B) may be written in formal form as:

$$H^j_x(\hat{\underline{P}}^f_{n-1}, \underline{P}^{SVj}_{n-1}) = \frac{\partial \rho(\hat{\underline{P}}^f_{n-1}, \underline{P}^{SVj}_{n-1})}{\partial \hat{P}^f_{x,n-1}}$$

$$H^j_y(\hat{\underline{P}}^f_{n-1}, \underline{P}^{SVj}_{n-1}) = \frac{\partial \rho(\hat{\underline{P}}^f_{n-1}, \underline{P}^{SVj}_{n-1})}{\partial \hat{P}^f_{y,n-1}}$$

$$H^j_z(\hat{\underline{P}}^f_{n-1}, \underline{P}^{SVj}_{n-1}) = \frac{\partial \rho(\hat{\underline{P}}^f_{n-1}, \underline{P}^{SVj}_{n-1})}{\partial \hat{P}^f_{z,n-1}},$$

Substituting equations (11A) and (11B) into equation (10), and multiplying the resulting equation by $\lambda^j$ yields:

$\lambda^j \cdot \Delta \phi^j_n = \rho[\hat{\underline{P}}^f_{n-1}, \underline{P}^{SVj}_n]$ $+ H^j_x(\hat{\underline{P}}^f_{n-1}, \underline{P}^{SVj}_n) \cdot [\Delta P_{x,n-1,n} +$ $(P_{x,n-1} - \hat{P}^f_{x,n-1})] + H^j_y(\hat{\underline{P}}^f_{n-1}, \underline{P}^{SVj}_n) \cdot [\Delta P_{y,n-1,n} +$ $(P_{y,n-1} - \hat{P}^f_{y,n-1})] + H^j_z(\hat{\underline{P}}^f_{n-1}, \underline{P}^{SVj}_n) \cdot [\Delta P_{z,n-1,n} +$ $(P_{z,n-1} - \hat{P}^f_{z,n-1})] - \{\rho[\hat{\underline{P}}^f_{n-1}, \underline{P}^{SVj}_{n-1}]$ $+ H^j_x(\hat{\underline{P}}^f_{n-1}, \underline{P}^{SVj}_{n-1}) \cdot (P_{x,n-1} - \hat{P}^f_{x,n-1}) +$ $H^j_y(\hat{\underline{P}}^f_{n-1}, \underline{P}^{SVj}_{n-1}) \cdot (P_{y,n-1} -$ $\hat{P}^f_{y,n-1}) + H^j_z(\hat{\underline{P}}^f_{n-1}, \underline{P}^{SVj}_{n-1}) \cdot (P_{z,n-1} -$ $\hat{P}^f_{z,n-1})\} + c \cdot \Delta P_{\tau,n-1,n}$ $+ \lambda^j \cdot \{\beta_{n,\phi}{}^j - \beta_{n-1,\phi}{}^j + \zeta_{n,\phi}{}^j - \zeta_{n-1,\phi}{}^j\}$ (12)

The terms $\lambda^j \cdot \Delta\phi^j_n$, $\rho[\hat{\underline{P}}^f_{n-1}, \underline{P}^{SVj}_n]$, and $\rho[\hat{\underline{P}}^f_{n-1}, \underline{P}^{SVj}_{n-1}]$ are known values based on observed information and are grouped together as follows:

$Z^j_n = \lambda^j \cdot \Delta\phi^j_n - \rho[\hat{\underline{P}}^f_{n-1}, \underline{P}^{SVj}_n] + \rho[\hat{\underline{P}}^f_{n-1}, \underline{P}^{SVj}_{n-1}].$ The quantity $\lambda^j \cdot \{\beta_{n,\phi}{}^j - \beta_{n-1,\phi}{}^j + \zeta_{n,\phi}{}^j - \zeta_{n-1,\phi}{}^j\}$ represents the observation noises and may be grouped together as a single quantity: $\xi^j_n = \lambda^j \cdot \{\beta_{n,\phi}{}^j - \beta_{n-1,\phi}{}^j + \zeta_{n,\phi}{}^j - \zeta_{n-1,\phi}{}^j\}$. With this, equation (12) can be more simple written as:

$Z^j_n = H^j_x(\hat{\underline{P}}^f_{n-1}, \underline{P}^{SVj}_n) \cdot \Delta P_{x,n-1,n}$ $+ H^j_y(\hat{\underline{P}}^f_{n-1}, \underline{P}^{SVj}_n) \cdot \Delta P_{y,n-1,n}$ $+ H^j_z(\hat{\underline{P}}^f_{n-1}, \underline{P}^{SVj}_n) \cdot \Delta P_{z,n-1,n}$ $+ c \cdot \Delta \hat{P}_{\tau,n-1,n} + \xi^j_n + [H^j_x(\hat{\underline{P}}^f_{n-1}, \underline{P}^{SVj}_n)$ $- H^j_x(\hat{\underline{P}}^f_{n-1}, \underline{P}^{SVj}_{n-1})] \cdot (P_{x,n-1} - \hat{P}^f_{x,n-1})$ $+ [H^j_y(\hat{\underline{P}}^f_{n-1}, \underline{P}^{SVj}_n) - H^j_y(\hat{\underline{P}}^f_{n-1}, \underline{P}^{SVj}_{n-1})]$ $\cdot (P_{y,n-1} - \hat{P}^f_{y,n-1}) + [H^j_z(\hat{\underline{P}}^f_{n-1}, \underline{P}^{SVj}_n) -$ $H^j_z(\hat{\underline{P}}^f_{n-1}, \underline{P}^{SVj}_{n-1})] \cdot (P_{z,n-1} - \hat{P}^f_{z,n-1}),$ where we have grouped all of the errors due to using $\hat{\underline{P}}^f_{n-1}$ for the receiver's position vector into the last three terms. Each of these error terms comprises a difference between the derivatives H(*) at two different satellite positions multiplied by the error in the coordinate value caused by using $\hat{\underline{P}}^f_{n-1}$. As it turns out, there is very little difference between the derivative H(*) values at two successive satellite positions, and the error terms are very small in comparison to the other terms in the above equation. Accordingly, we will ignore these error terms. As a result, we have:

$Z^j_n = H^j_x(\hat{\underline{P}}^f_{n-1}, \underline{P}^{SVj}_n) \cdot \Delta P_{x,n-1,n} + H^j_y$ $(\hat{\underline{P}}^f_{n-1}, \underline{P}^{SVj}_n) \cdot \Delta P_{y,n-1,n} + H^j_z(\hat{\underline{P}}^f_{n-1}, \underline{P}^{SVj}_n) \cdot \Delta P_{z,n-1,n}$ $+ c \cdot \Delta \hat{P}_{\tau,n-1,n} + \xi^j_n.$ The equations corresponding to the m satellites being tracked may be grouped into the following linear system of equations:

$$\underline{Z}_n = H_{1,n} \cdot \underline{\Delta S}_n + \underline{\xi}_n \qquad (12A)$$

where:

$\underline{Z}_n$ is the m-dimensional column vector of observations $\underline{Z}_n = [Z^1_n, Z^2_n, \ldots, Z^m_n]^T$, $\underline{\xi}_n$ is the m-dimensional column vector representing the observation noises $\underline{\xi}_n = [\xi^1_n, \xi^2_n, \ldots, \xi^m_n]^T$, the unknowns have been grouped together in the increment solution vector: $\underline{\Delta S}_n = [\Delta P_{x,n-1,n}, \Delta P_{y,n-1,n}, \Delta P_{z,n-1,n}, (c \cdot \Delta P_{\tau,n-1,n})]^T$, and where the derivatives have been grouped together in the a matrix $H_{1,n}$:

$$H_{1,n} = \begin{bmatrix} H^1_x(\hat{\underline{P}}^f_{n-1}, \underline{P}^{SV1}_n) & H^1_y(\hat{\underline{P}}^f_{n-1}, \underline{P}^{SV1}_n) & H^1_z(\hat{\underline{P}}^f_{n-1}, \underline{P}^{SV1}_n) & 1 \\ H^2_x(\hat{\underline{P}}^f_{n-1}, \underline{P}^{SV2}_n) & H^2_y(\hat{\underline{P}}^f_{n-1}, \underline{P}^{SV2}_n) & H^2_z(\hat{\underline{P}}^f_{n-1}, \underline{P}^{SV2}_n) & 1 \\ \vdots & \vdots & \vdots & \vdots \\ H^m_x(\hat{\underline{P}}^f_{n-1}, \underline{P}^{SVm}_n) & H^m_y(\hat{\underline{P}}^f_{n-1}, \underline{P}^{SVm}_n) & H^m_z(\hat{\underline{P}}^f_{n-1}, \underline{P}^{SVm}_n) & 1 \end{bmatrix}$$

Matrix $H_{1,n}$ is similar to the Jacobian matrix (or complemented directional cosine matrix) that is conventionally used to in the snapshot solution process. However, a difference is that matrix $H_{1,n}$ uses the position of the receiver at time moment $t_{n-1}$ and the position of the satellite at the different time moment $t_n$ (when using iterations), whereas the Jacobian used in the snapshot solution uses the positions of the receiver and satellite at the same time moment $t_n$. Note that the fourth component of the unknown vector $\underline{\Delta S}_n$ is $(c \cdot \Delta P_{\tau,n-1,n})$ rather than $\Delta P_{\tau,n-1,n}$. The multiplication by the speed of light c makes the fourth component have the same dimension (meters) and the first three components, and makes the elements in the fourth column of matrix $H_{1,n}$ have magnitudes which are closer in value to the magnitudes of the other matrix elements of $H_{1,n}$.

Next, a set of estimations $\underline{\Delta \hat{S}}_n = [\Delta \hat{P}_{x,n-1,n}, \Delta \hat{P}_{y,n-1,n}, \Delta \hat{P}_{z,n-1,n}, (c \cdot \Delta \hat{P}_{\tau,n-1,n})]^T$ for the unknowns $\underline{\Delta S}_n$ which present a solution to equation (12A) are generated by using a least squares solution method to find a solution to the following matrix equation:

$$\underline{Z}_n = H_{1,n} \cdot \underline{\Delta \hat{S}}_n, \quad (12B)$$

which is the same as equation (12A) except for the omission of the error vector $\underline{\xi}_n$. (We note that in differential mode where the reference station can determine part of vector $\underline{\xi}_n$, that determined part may be subtracted from $\underline{Z}_n$ in equation (12B)). Equation (12B) is solved by generating a pseudo-inverse matrix $G_{1,n}$ for matrix $H_{1,n}$, and then using the pseudo-inverse matrix $G_{1,n}$ to generate values for the unknowns as follows:

$$\underline{\Delta \hat{S}}_n = G_{1,n} \cdot \underline{Z}_n, \quad (13)$$

The pseudo-inverse matrix $G_{1,n}$ is generated from matrix $H_{1,n}$ and an error matrix $R_n^{\Delta\Phi}$ as follows:

$$G_{1,n} = \mathfrak{R}_n^{\Delta\Phi} \cdot H^T_{1,n} \cdot (R_n^{\Delta\Phi})^{-1} \quad (14)$$

where the matrix $\mathfrak{R}_n^{\Delta\Phi}$ is defined as:

$$\mathfrak{R}_n^{\Delta\Phi} = [H^T_{1,n} \cdot (R_n^{\Delta\Phi})^{-1} \cdot H_{1,n}]^{-1}. \quad (15)$$

Matrix $R_n^{\Delta\Phi}$ is the covariance matrix of the noise vector $\underline{\xi}_n$, where the matrix element at the I-th row and J-th column of matrix $R_n^{\Delta\Phi}$ is the covariance $COV(\xi_I, \xi_J)$. Each component of noise vector $\underline{\xi}_n$ in is assumed to have a zero mean value, and the covariance of noise components $\xi_I$ and $\xi_J$ is equal to the expected value of the product of their deviations from the mean (e.g., the expected value of the product of their deviations from zero). Since there is oftentimes little correlation between noise components $\xi_I$ and $\xi_J$ for $I \neq J$, $R_n^{\Delta\Phi}$ may take the form of diagonal matrix with diagonal elements $R_n^{\Delta\Phi}{}_{I,I} = COV(\xi_I, \xi_I)$ for $I=1$ to $I=m$. The deviations of $\xi_1, \xi_2, \ldots, \xi_m$ from their means can be readily estimated or measured by those of ordinary skill in the art and a description thereof is not necessary for those of ordinary skill in the art to make and use the present invention. From these deviations, the computation of the covariance values is trivial. Matrix $\mathfrak{R}_n^{\Delta\Phi}$ represents the corresponding covariances of the receiver's position coordinates and the time offset caused by the measurement errors $\underline{\xi}_n$. (We note that in differential mode where the reference station has determined a part of $\underline{\xi}_n$, the above matrixes $R_n^{\Delta\Phi}$ and $\mathfrak{R}_n^{\Delta\Phi}$ are based upon the unknown part $\underline{\xi}_n$.)

Thus, while equation (13) did not directly account for the effects of the noise vector $\underline{\xi}_n$, their effects are accounted for in the generation of the pseudo-inverse matrix $G_{1,n}$ in equations (14) and (15).

Apparatuses According to the Present Invention

The proposed method may be embodied in the form of the device (apparatus) for generating the estimates of coordinates $\hat{P}^f_{x,n}, \hat{P}^f_{y,n}, \hat{P}^f_{z,n}$ and the time offset $\hat{P}^f_{\tau,n}$ of the roving receiver without large errors caused by short time shadowing/blocking of the part of observed navigational satellites as well as without large dynamic errors caused by the receiver movement. Specifically, any general computer processor of suitable processor capacity may be controlled by a set of instructions, stored in memory, which carry out the above-described steps. From the teachings of the present application, it would be well within the capability of one of ordinary skill in the art to program such a general computer processor with a set of control instructions, as described above.

Results of the Present Invention

Here we present the proof that the present invention is a substantial improvement in methods of navigational measurements, in particular in navigational measurements using SATPS.

To check the operational capacity of the proposed method, the simulation of the navigational signal processing device was carried out. Using the model, the mean error and the root mean square error of the determination of coordinates of a roving receiver were computed in both SAN and DGPS modes.

Figure 50:
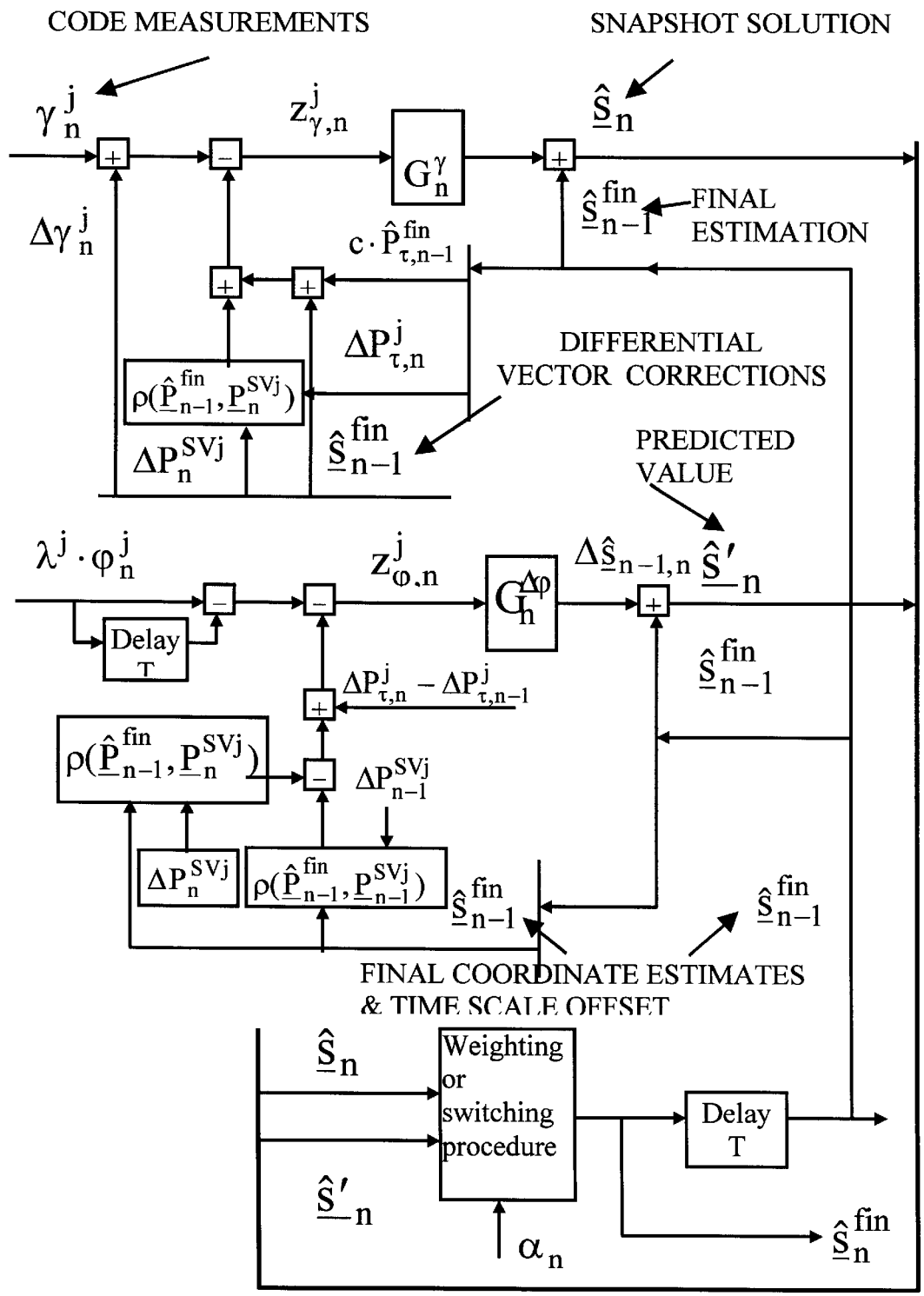
FIG. 50 presents a block scheme of an exemplary apparatus for determining the final coordinates and receiver time offset from the system time of roving satellite positioning system receiver without large errors, according to the present invention.

The present invention was simulated in accordance with the block diagram shown on FIG. 50.

Figure 15:
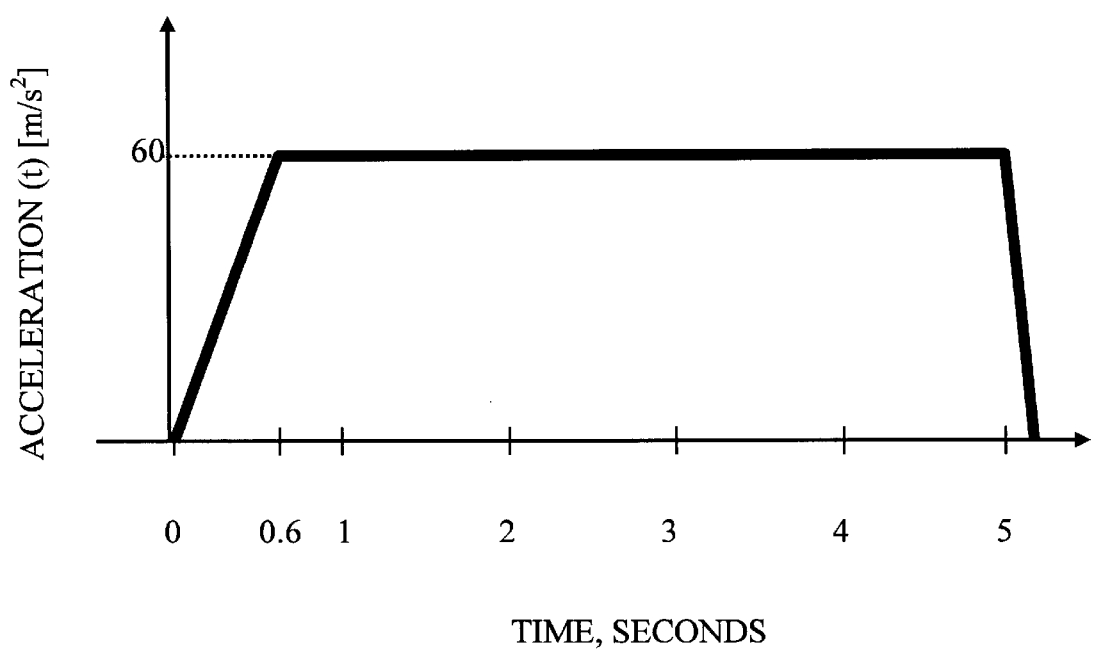
FIG. 15 presents the shape and the parameters of a test acceleration pulse for the roving receiver.
Figure 16:
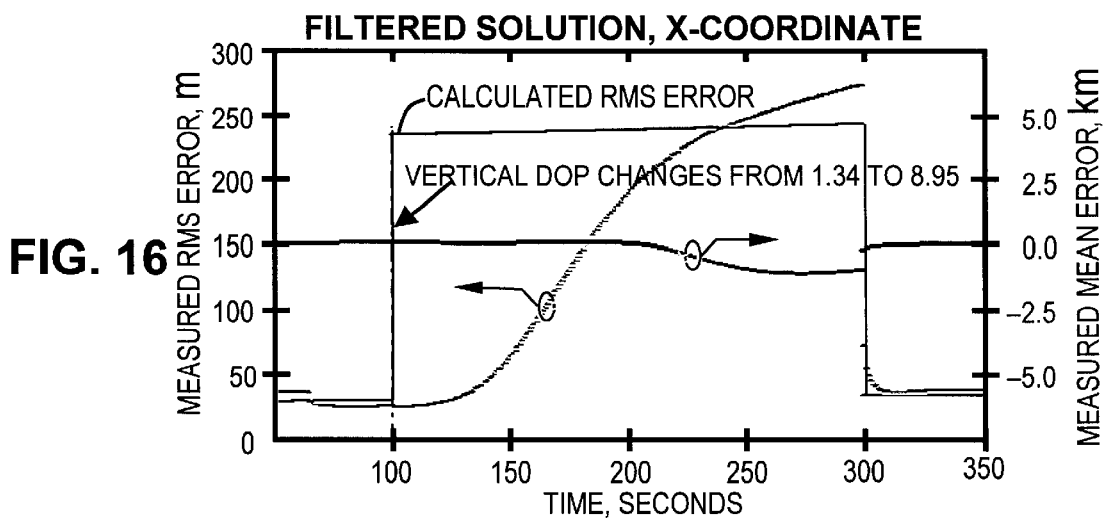
FIGS. 16–18 present the dynamic errors in the receiver's coordinate estimates as generated by Kalman filtering, during the occurrence of a jump in the geometric dilution of precision referred to above for FIGS. 9–11 (SAN mode), and also during the occurrence of the acceleration pulse specified in FIG. 15; the calculated and measured mean square errors of the coordinate estimates provided by the Kalman filtering are also presented here.
Figure 17:
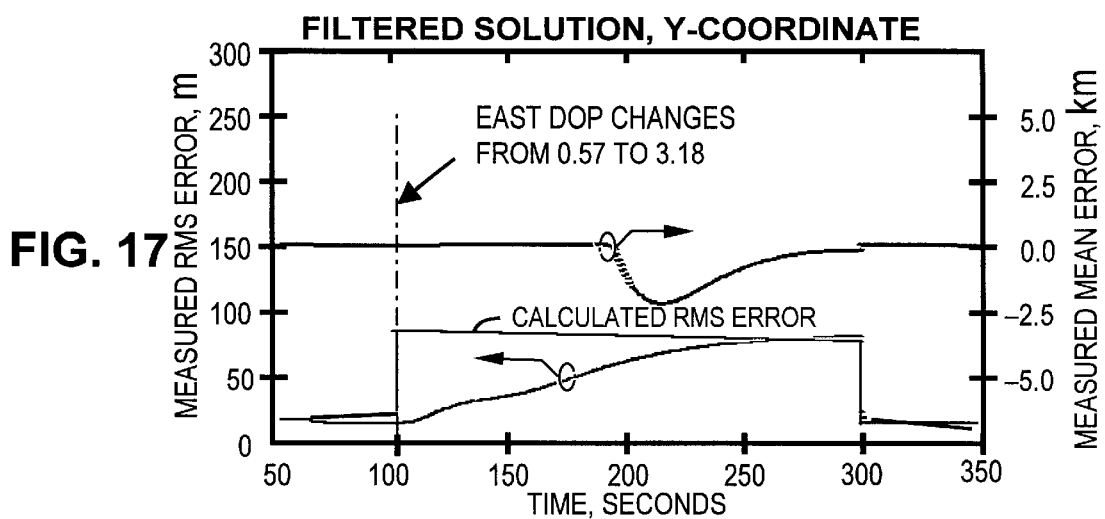
Figure 18:
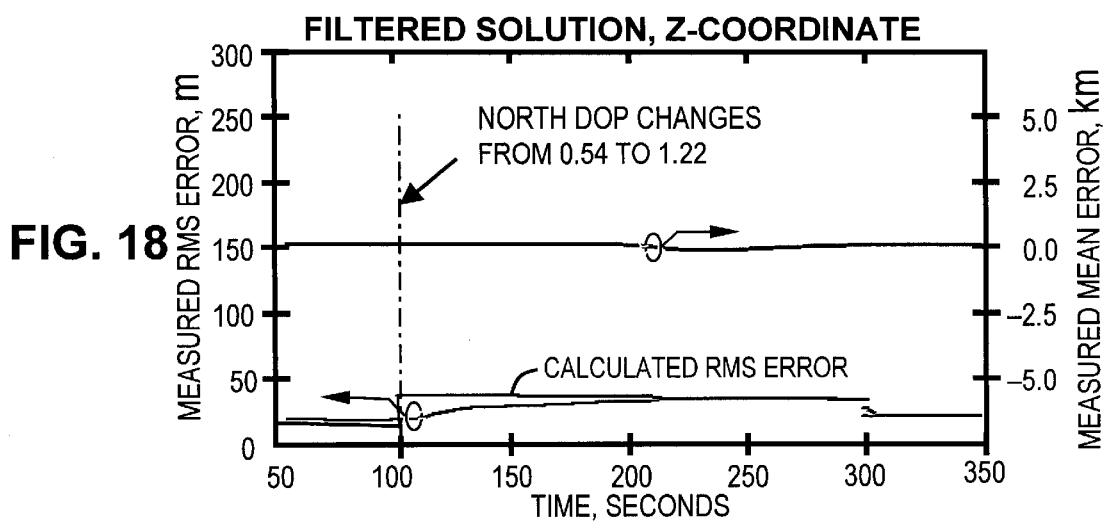
Figure 19:
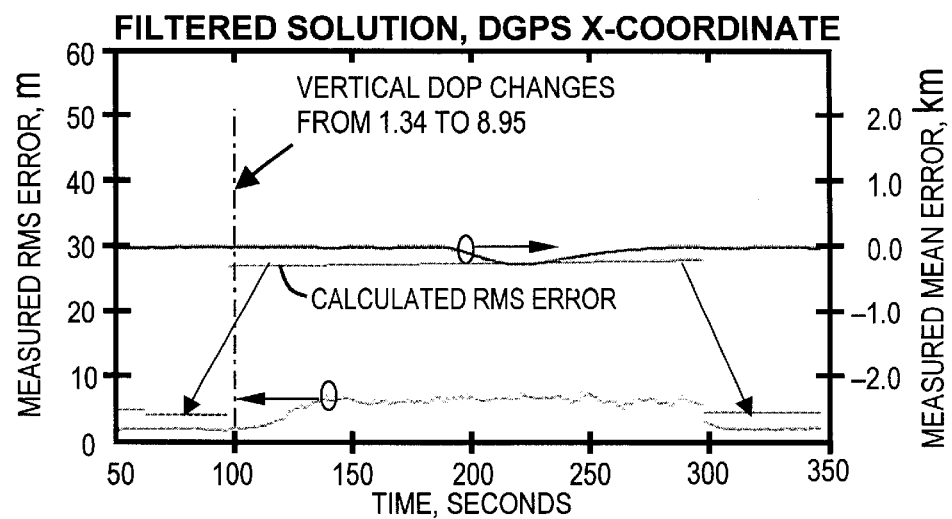
FIGS. 19–21 present the dynamic errors in the receiver's coordinate estimates as generated by Kalman filtering, during the occurrence of a jump in the geometric dilution of precision referred to above for FIGS. 12–14 (DGPS mode), and also during the occurrence of the acceleration pulse specified in FIG. 15; the calculated and measured mean square errors of the coordinate estimates provided by the Kalman filtering are also presented here.
Figure 20:
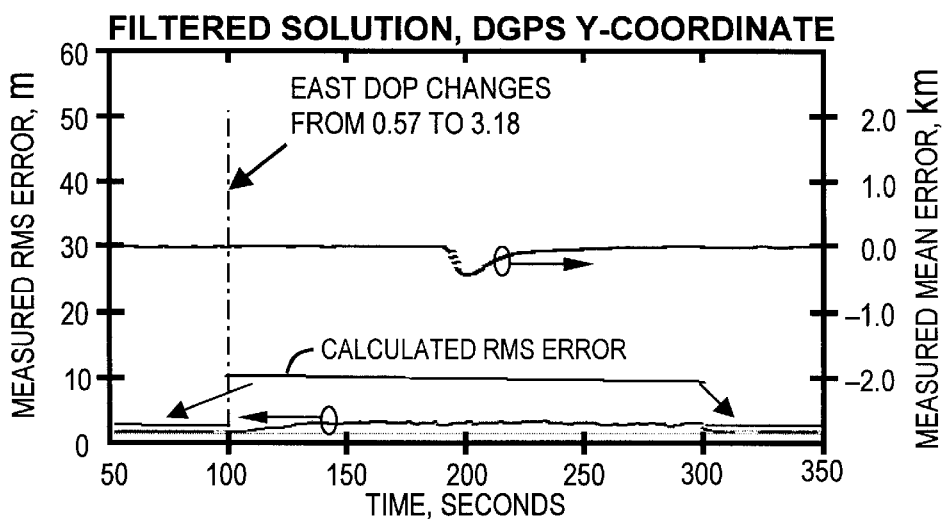
Figure 21:
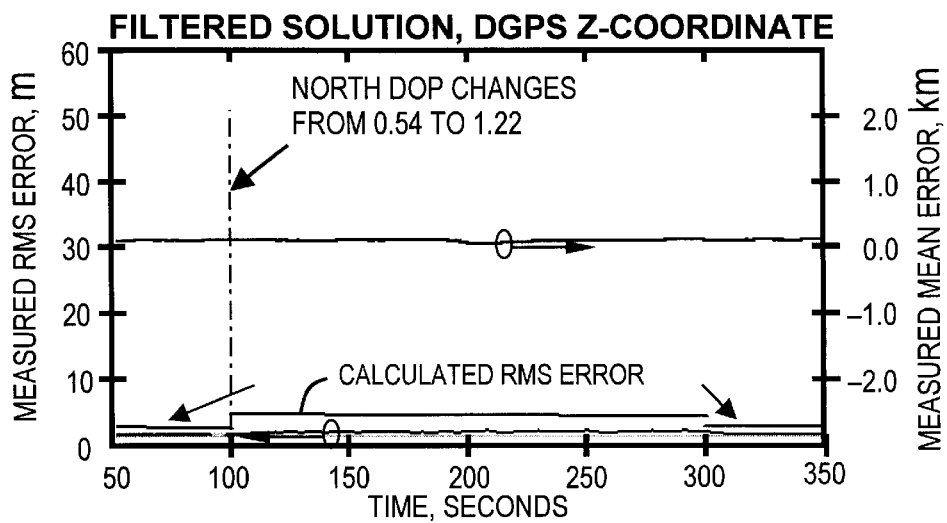
Figure 22:
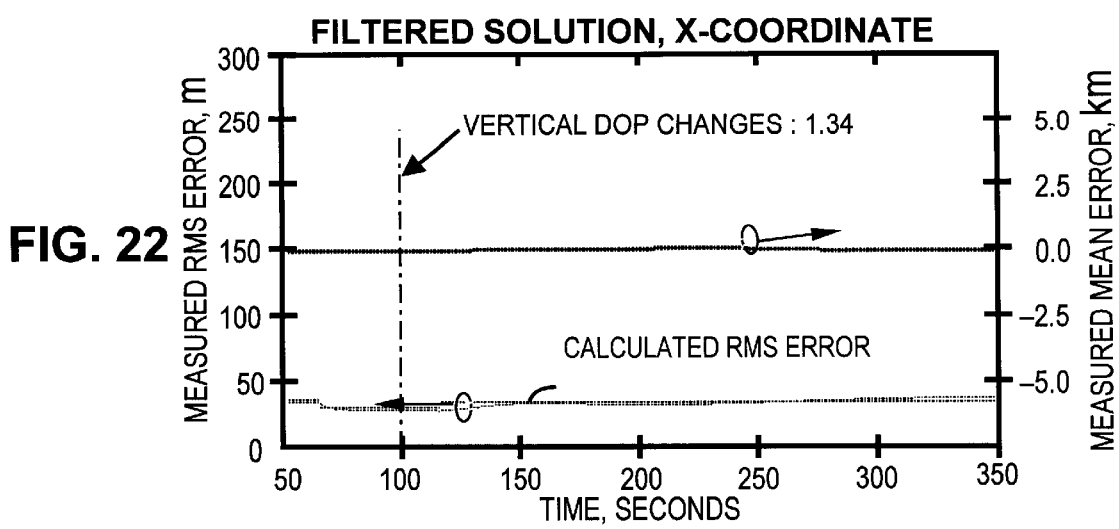
FIGS. 22–24 present the dynamic errors in the receiver's coordinate estimates as generated by Kalman filtering, during the occurrence of only the acceleration pulse (there is no jump in the geometric dilution of precision), when operating in SAN mode; the calculated and measured mean square errors of the coordinate estimates provided by the Kalman filtering are also presented here.
Figure 23:
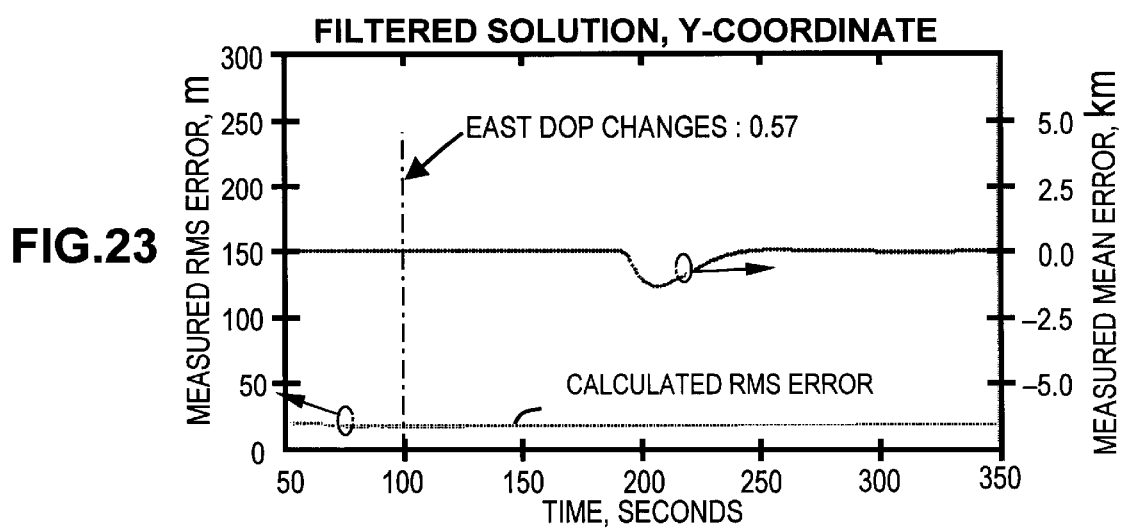
Figure 24:
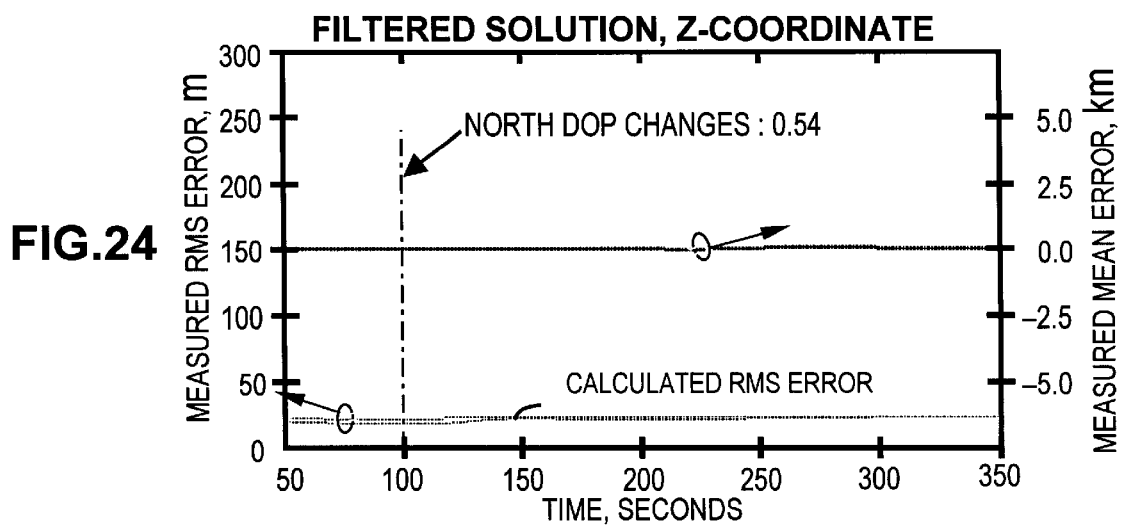
Figure 25:
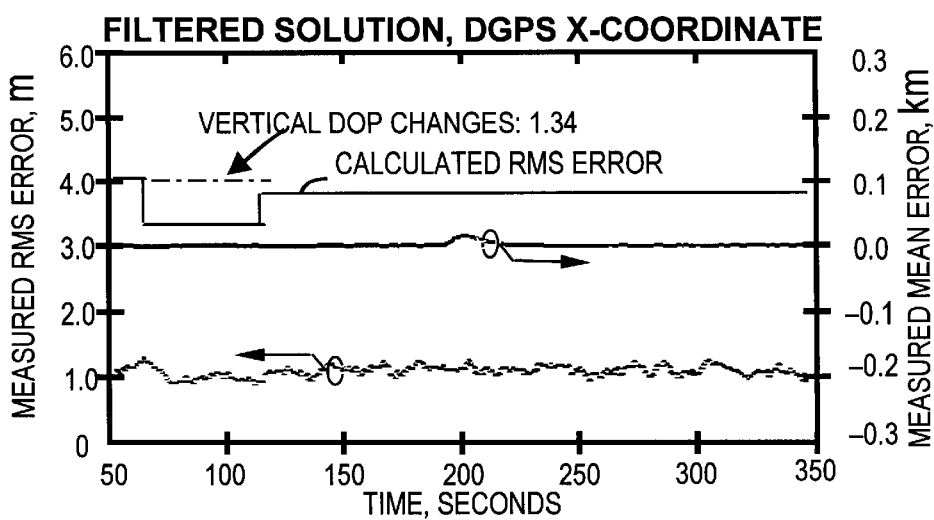
FIGS. 25–27 present the dynamic errors in the receiver's coordinate estimates as generated by Kalman filtering, during the occurrence of only the acceleration pulse (there is no jump of the dilution of precision), when operating in DGPS mode; the calculated and measured mean square errors of the coordinate estimates provided by the Kalman filtering are also presented here.
Figure 26:
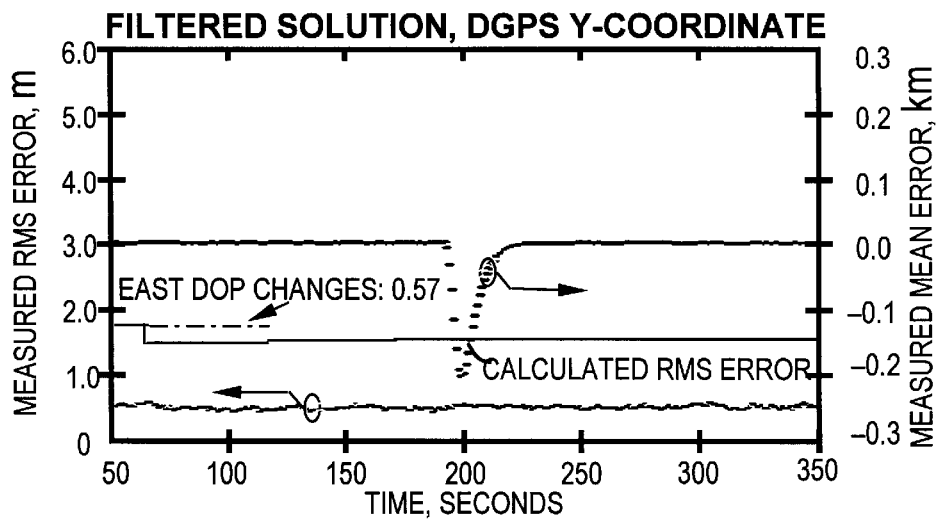
Figure 27:
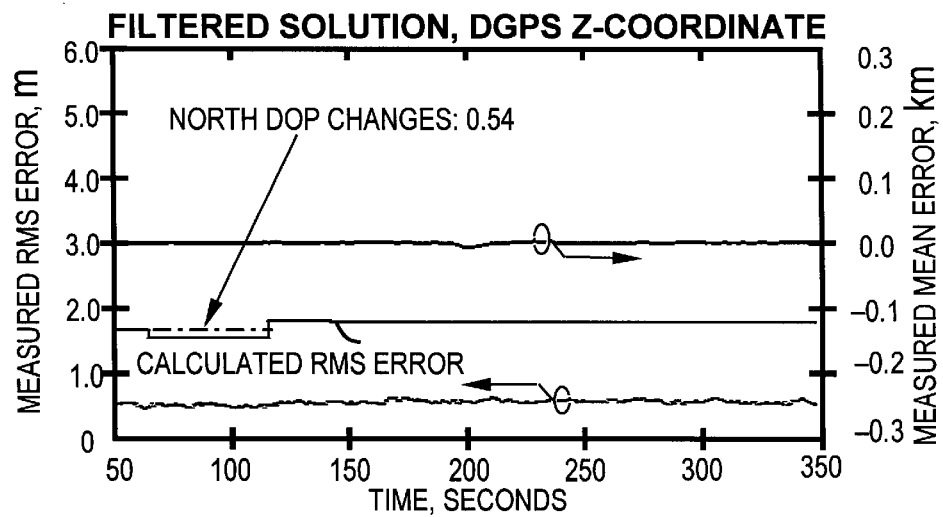
Figure 28:
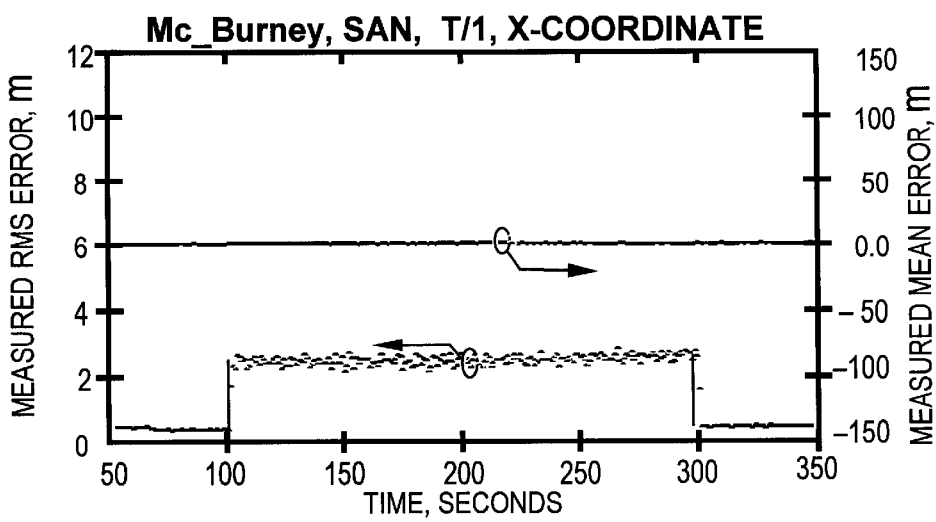
FIGS. 28–30 present the root mean square errors and dynamic errors of the estimates in the increments of the receiver's coordinates as generated by the McBurney method, in Stand Alone Navigation (SAN) mode and during an occurrence of a jump of the dilution of precision, referred to above; the graphs are shown for the case where the Doppler estimate of the velocity used by the McBurney method is performed on the time interval equal to the epoch duration.
Figure 29:
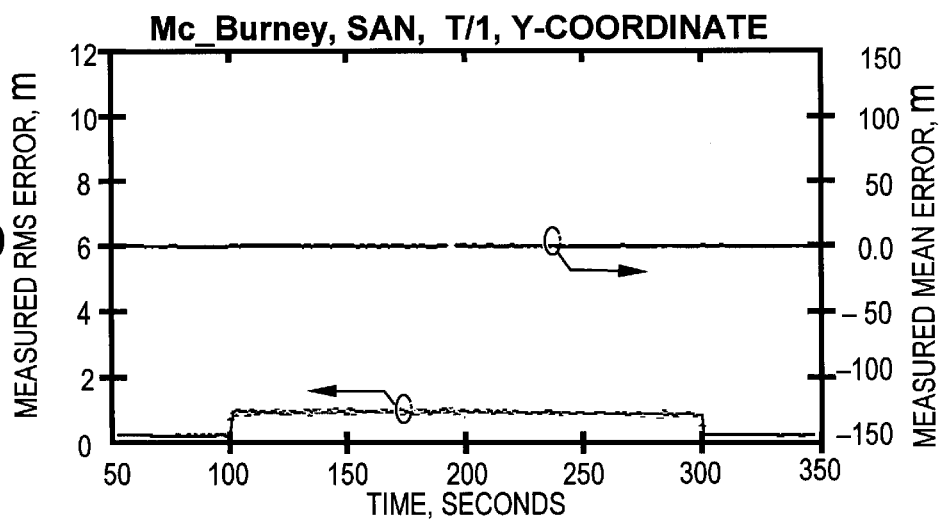
Figure 30:
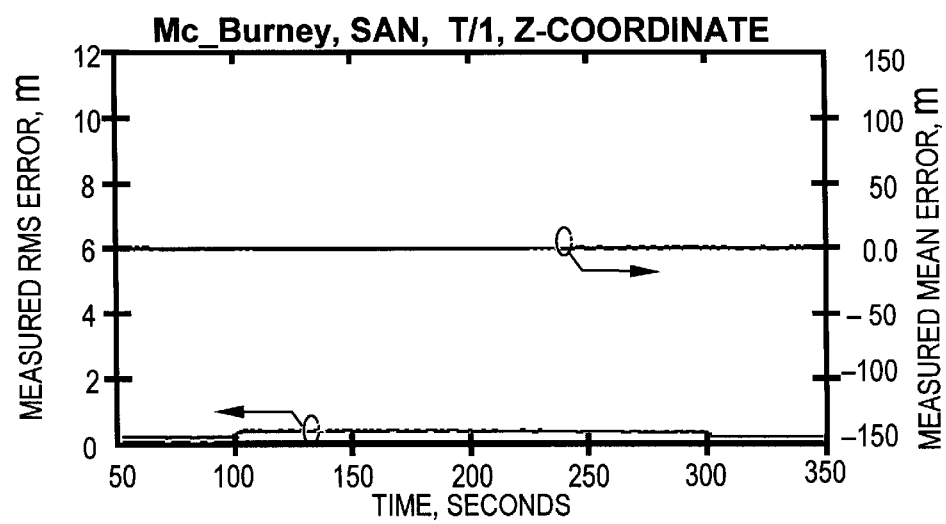
Figure 31:
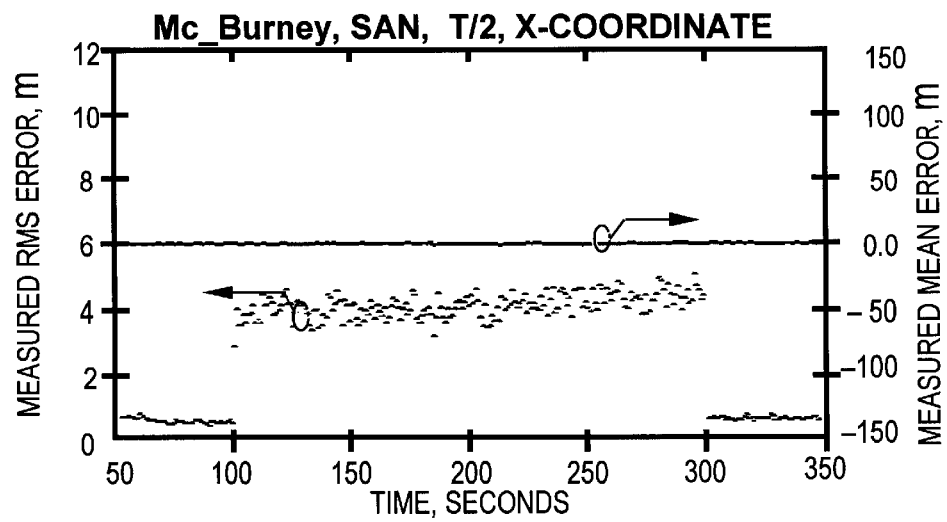
FIGS. 31–33 present the root mean square errors and dynamic errors of the estimates in the increments of the receiver's coordinates as generated by the McBurney method under the conditions stated for FIGS. 28–30 but where the Doppler estimate of the velocity used by the McBurney method is performed on the time interval equal to one half of the epoch duration.
Figure 32:
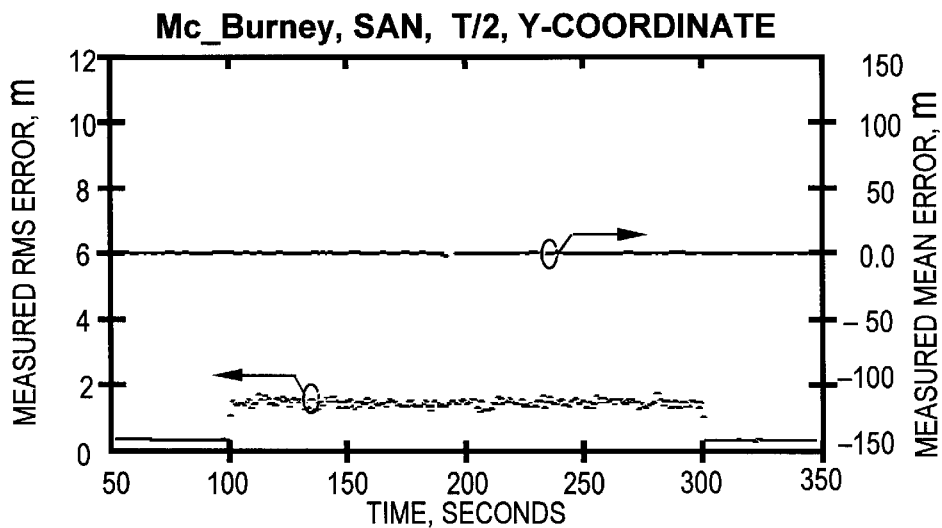
Figure 33:
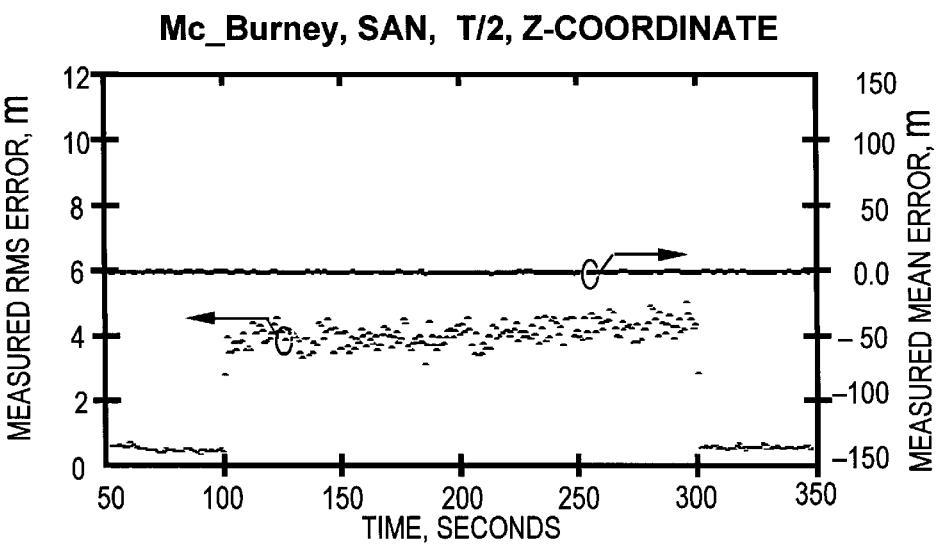
Figure 34:
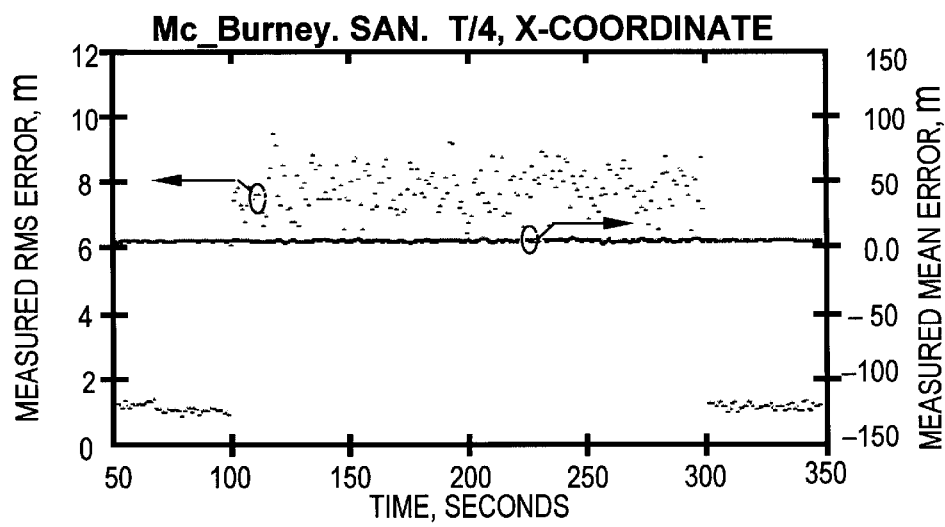
FIGS. 34–36 present the root mean square errors and dynamic errors of the estimates in the increments of the receiver's coordinates as generated by the McBurney method under the conditions stated for FIGS. 28–30 but where the Doppler estimate of the velocity used by the McBurney method is performed on the time interval equal to ¼ of the epoch duration.
Figure 35:
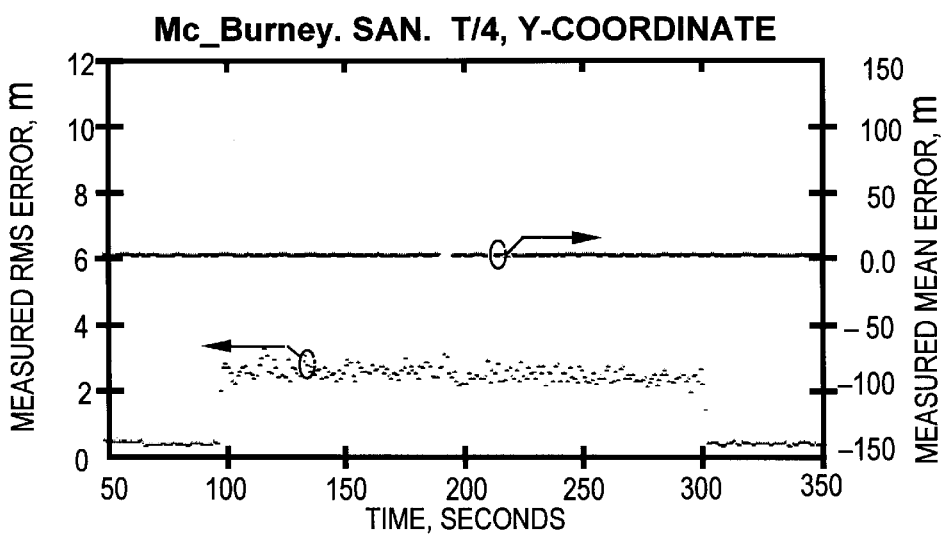
Figure 36:
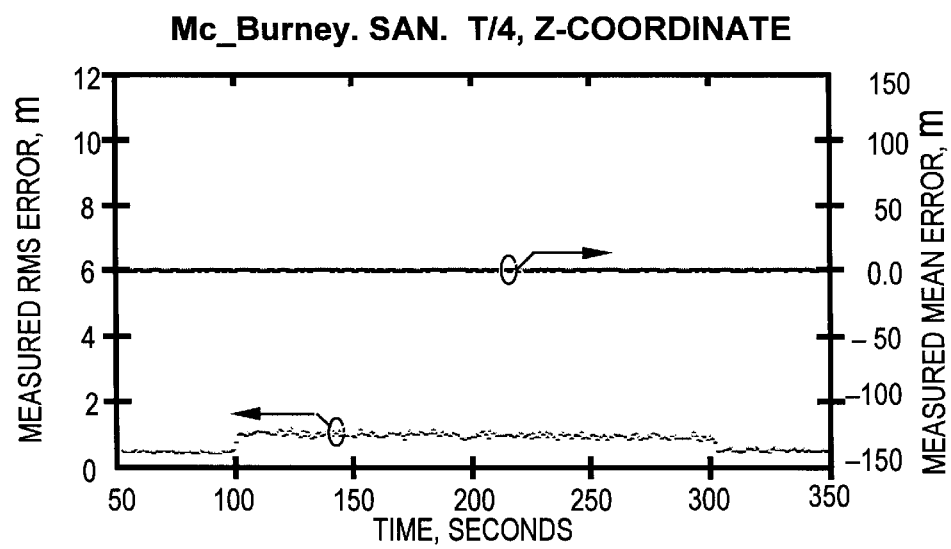
Figure 37:
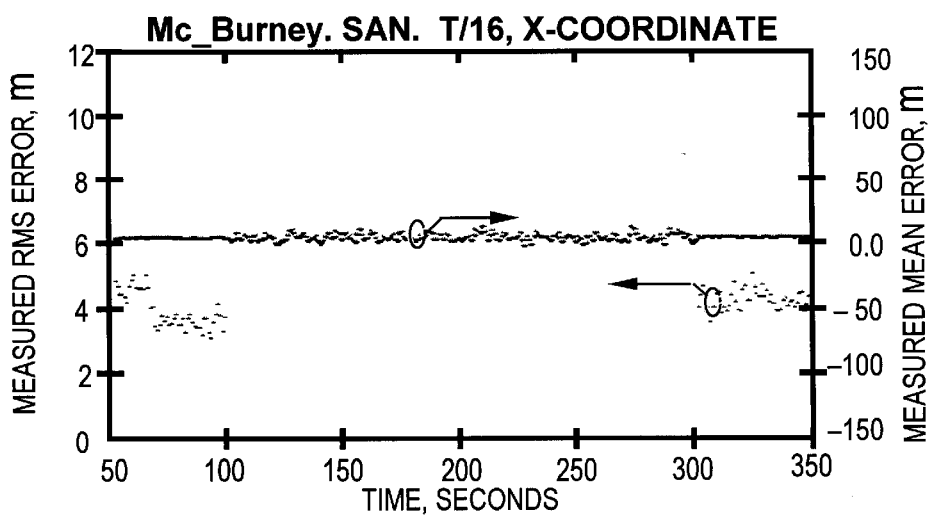
FIGS. 37–39 present the root mean square errors and dynamic errors of the estimates in the increments of the receiver's coordinates as generated by the McBurney method under the conditions stated for FIGS. 28–30 but where the Doppler estimate of the velocity used by the McBurney method is performed on the time interval equal to ¹⁄₁₆ of the epoch duration.
Figure 38:
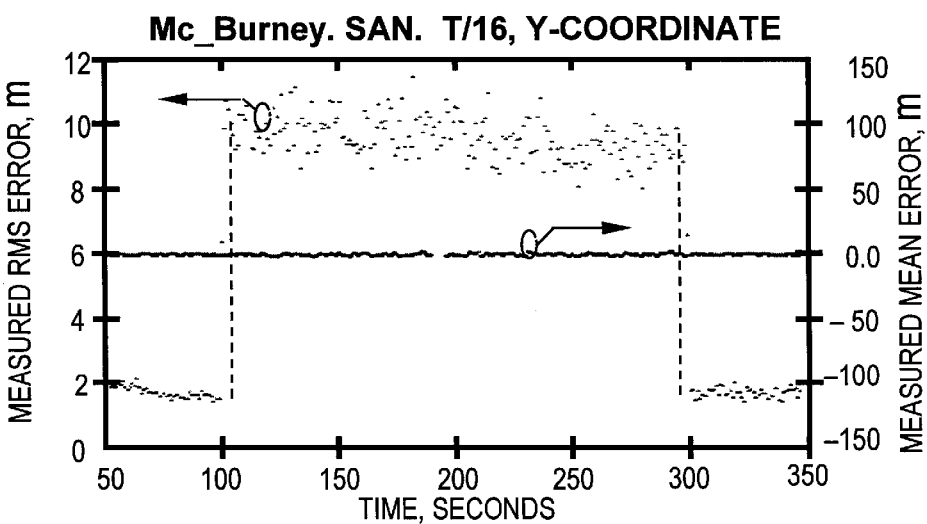
Figure 39:
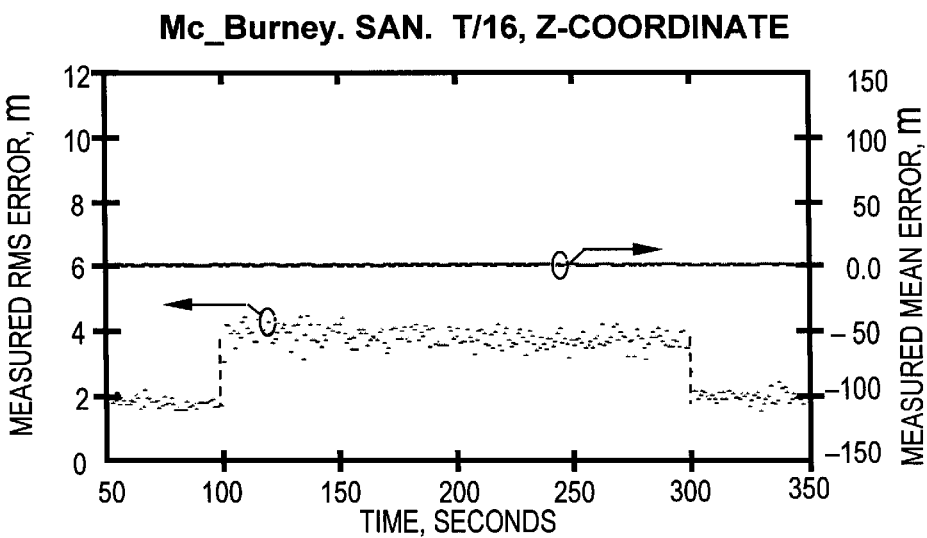
Figure 40:
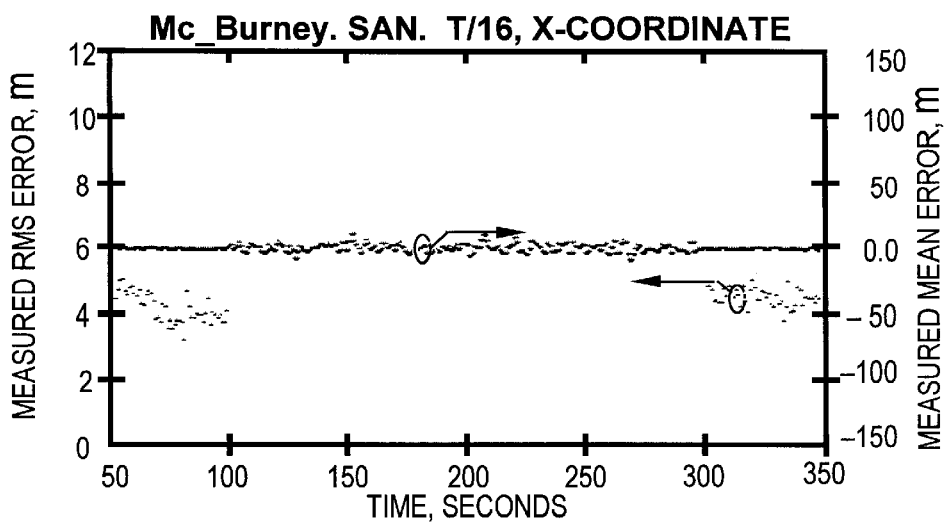
FIGS. 40–42 present the root mean square errors and dynamic errors of the estimates in the increments of the receiver's coordinates as generated by the McBurney method under the conditions stated for FIGS. 28–30 but where the Doppler estimate of the velocity used by the McBurney method is performed on the time interval equal to ¹⁄₁₈ of the epoch duration.
Figure 41:
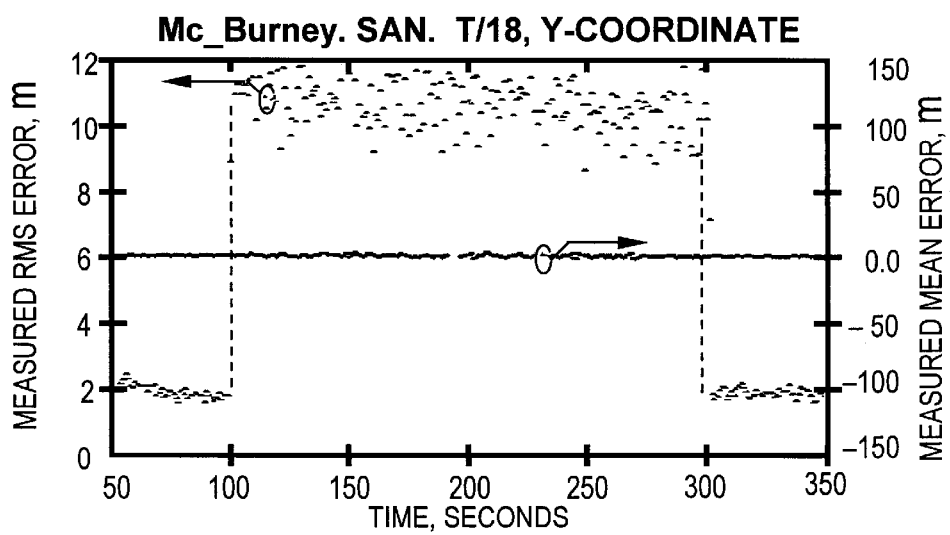
Figure 42:
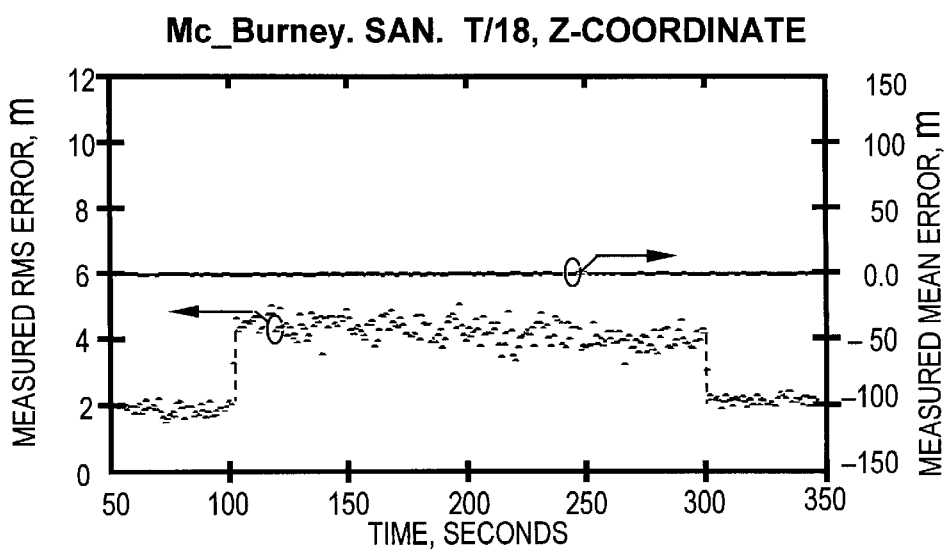
Figure 43:
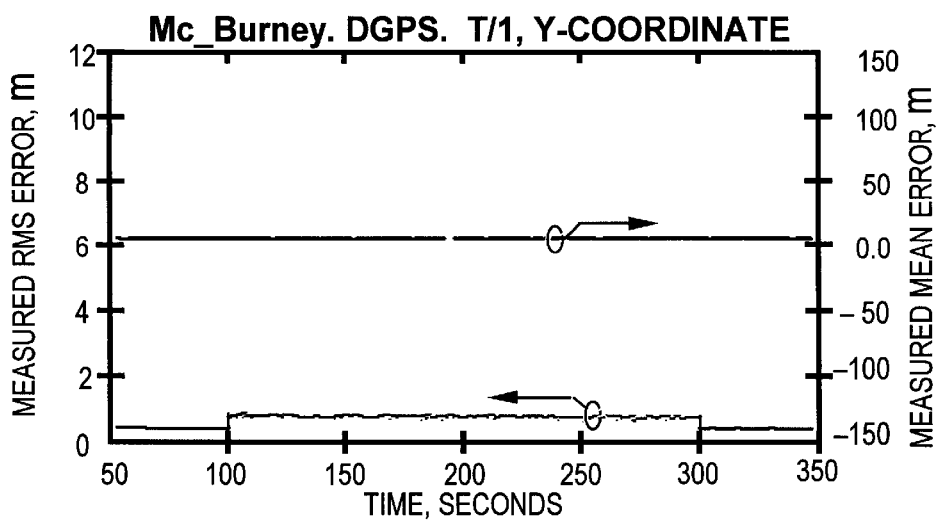
FIGS. 43–48 present the dynamic and the root mean square errors of the estimates of the receiver's coordinate increments, as generated by the McBurney method while in DGPS; the graphs show different intervals, ranging from one epoch to ¹⁄₁₂ epoch for determining the Doppler estimate of the velocity used by the McBurney.
Figure 44:
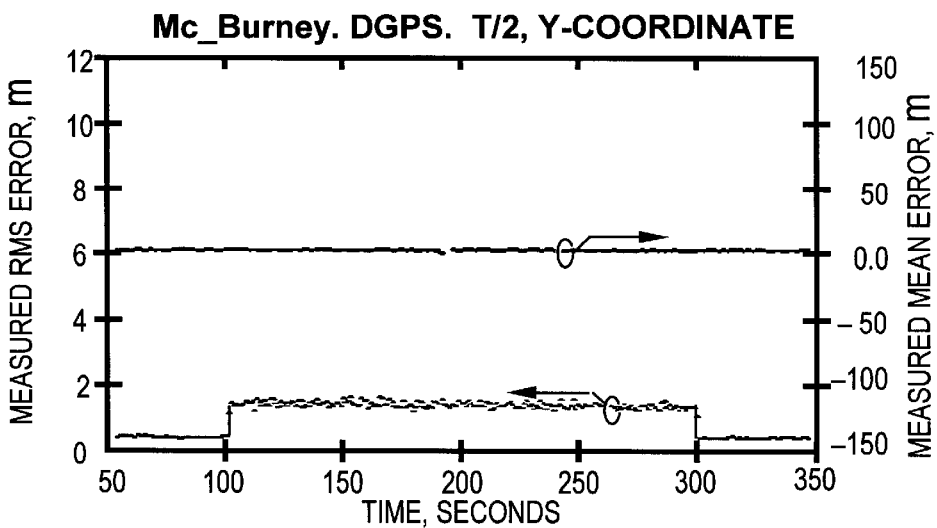
Figure 45:
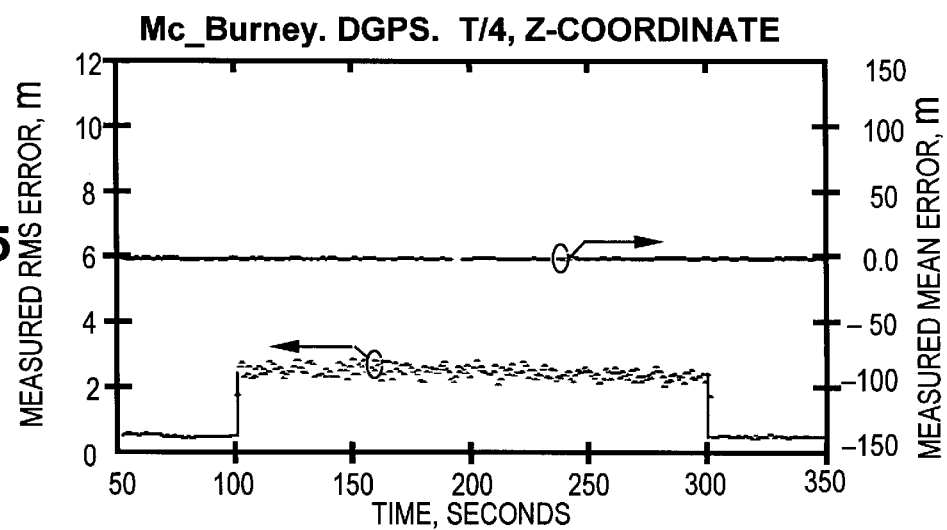
Figure 46:
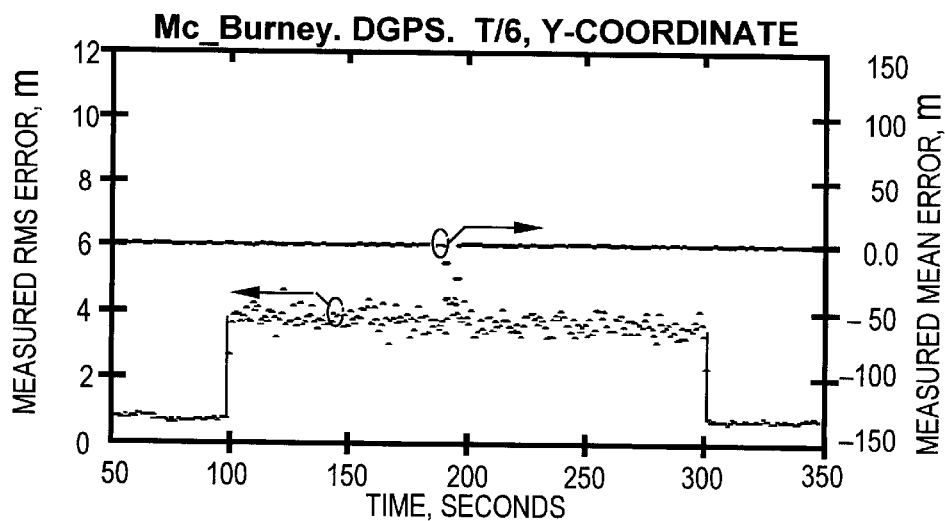
Figure 47:
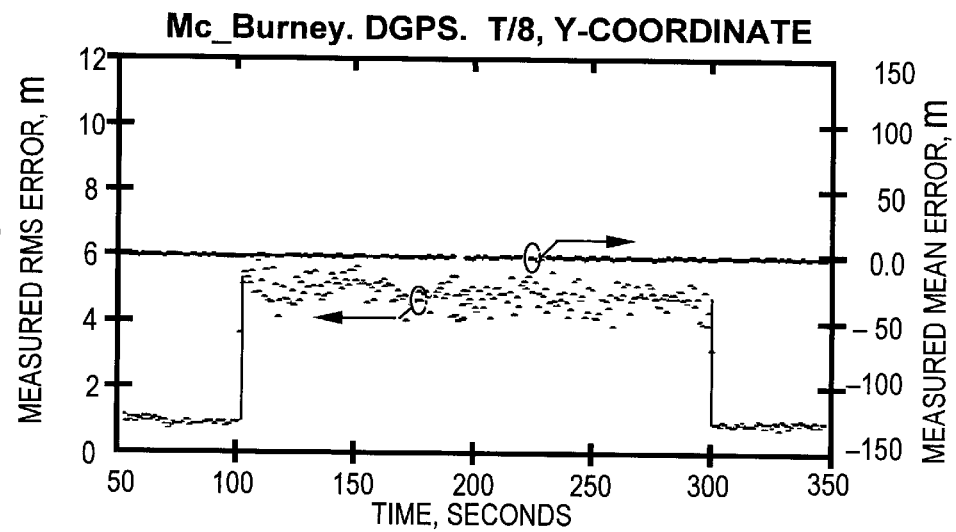
Figure 48:
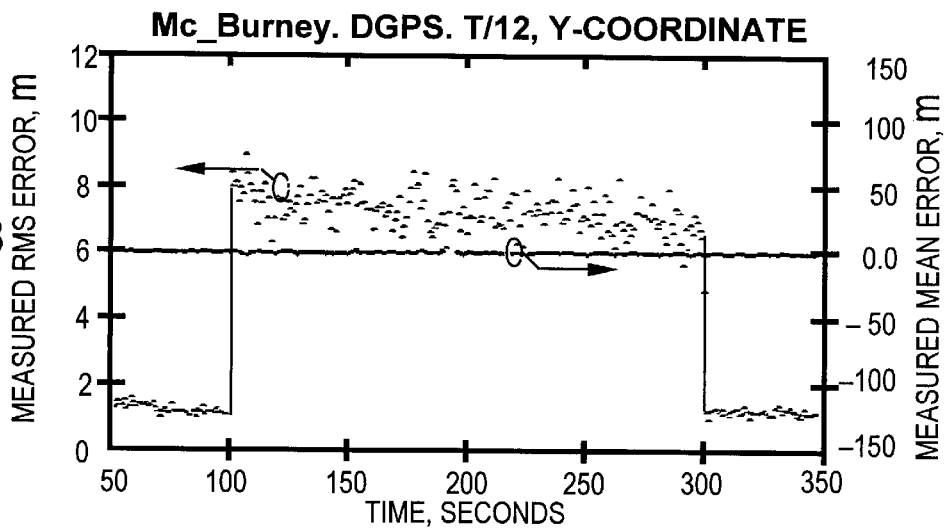

The scenario for simulating the results of the present invention is the following. For the time interval 0–99 s, the number of observed navigational satellites (GPS) is sufficiently large (11). At the time moment $t_{100}$=100 s, the number of observed satellites decreases to four, which brings about an increase in the geometric dilution of precision. At the time moment $t_{300}$=300 s, the number of observed satellites increases again, up to ten. At the receiver, the noises in the code measurements are modeled with an RMS error of 3 m. The error caused by Selective Availability in the satellite signals is generated according to the analytical model provided at pages 614–615 of Parkinson Vol. I, using an RMS value of 26 m. At the initial time moment $t_0$=0 s, the receiver is located at the zero meridian, at the equator, and at a height of 1000 m. At the time moment $t_{195}$=195 s, the roving receiver is subjected to the action of pulse of acceleration along the Y axis. The form and parameters of the acceleration pulse are shown in FIG. 15.

Results of measurements of mean and root mean square errors of the final estimates of the roving receiver's coordinates are presented in FIGS. 51–62.

Figure 51:
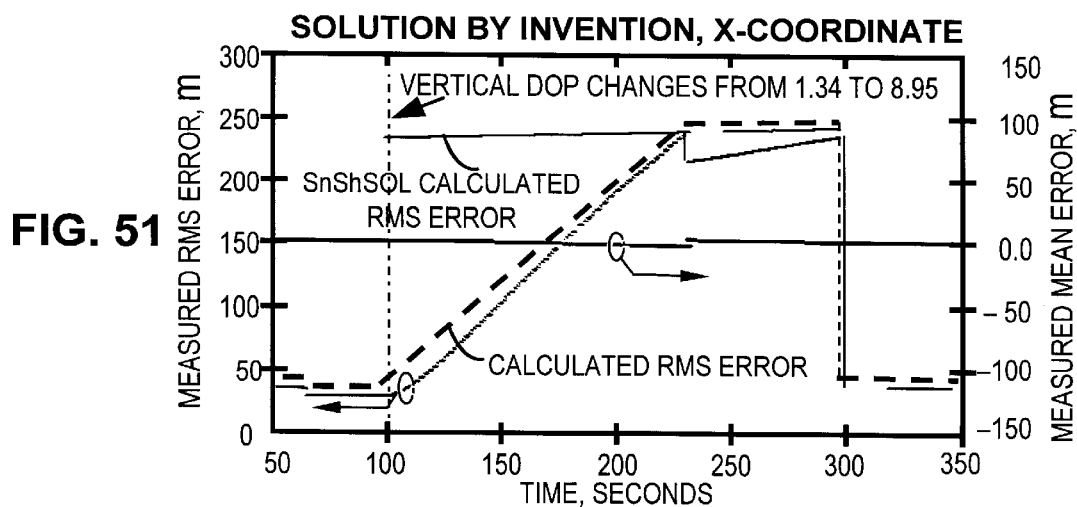
FIGS. 51–53 show mean and root mean square errors for the estimates of the receiver's coordinates generated according to the present invention when using a first preferred rule of generating a weight factor ($\alpha_n$) and when operating in SAN mode.
Figure 52:
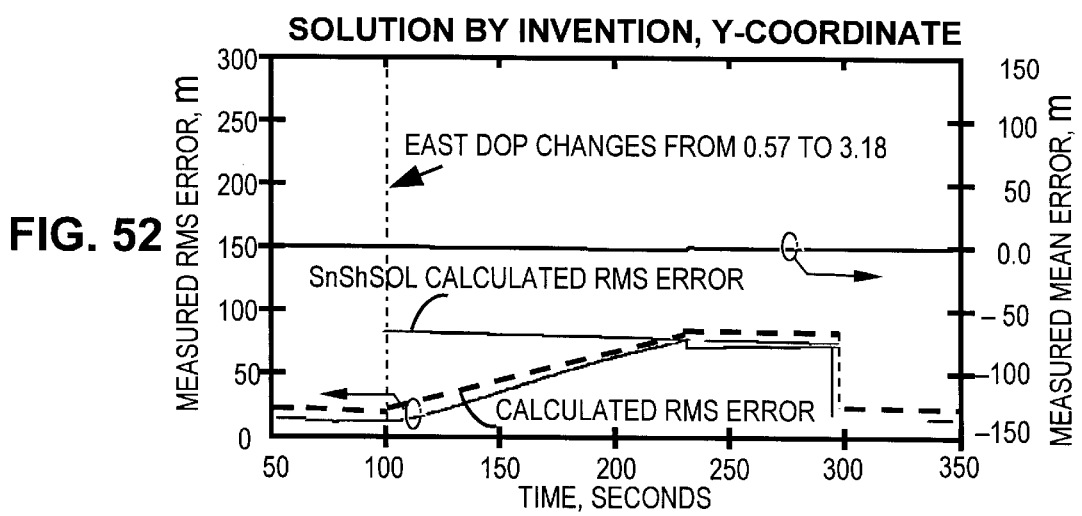
Figure 53:
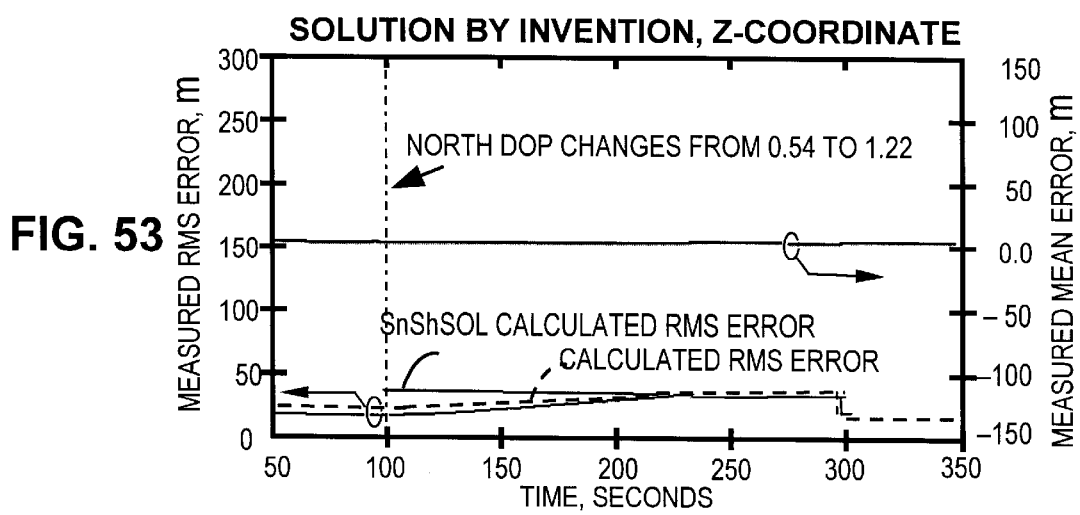

FIGS. 51–53 shows mean errors and root mean square errors in the final estimates for SAN mode when the preferred method (A) of generating the weight factor $\alpha_n$ is used.

FIGS. 54–56 shows mean errors and root mean square errors in the final estimates for DGPS mode when the preferred method (A) of generating the weight factor $\alpha_n$ is used.

Figure 57:
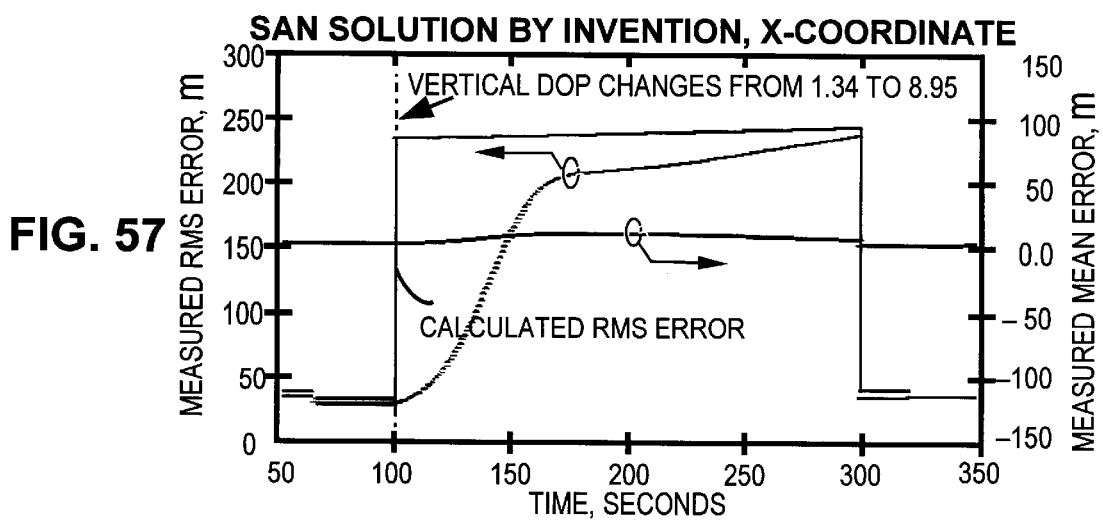
FIGS. 57–59 show mean and root mean square errors for the estimates of the receiver's coordinates generated according to the present invention when using a second preferred rule of generating a weight factor ($\alpha_n$, with en=4), and when operating in SAN mode.
Figure 58:
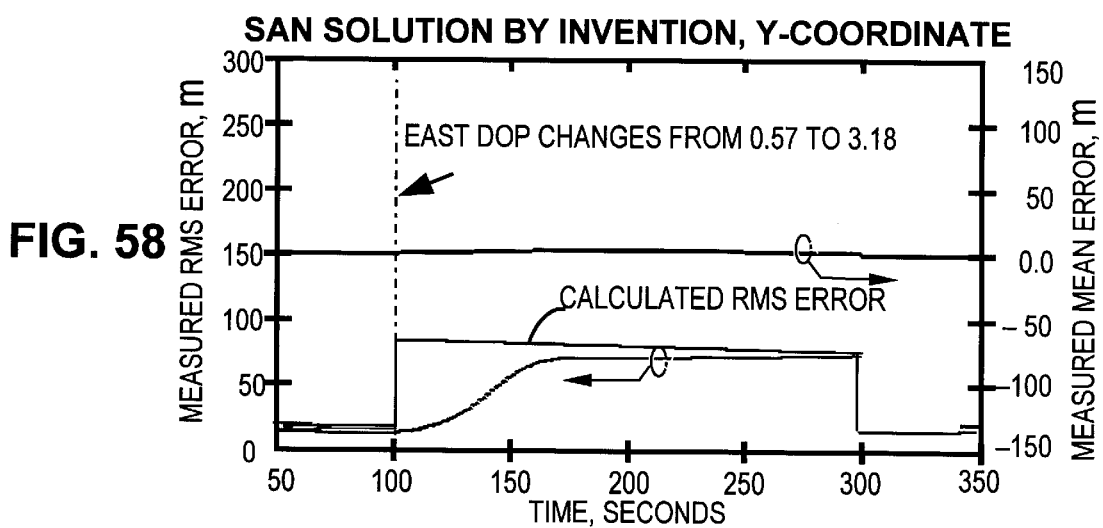
Figure 59:
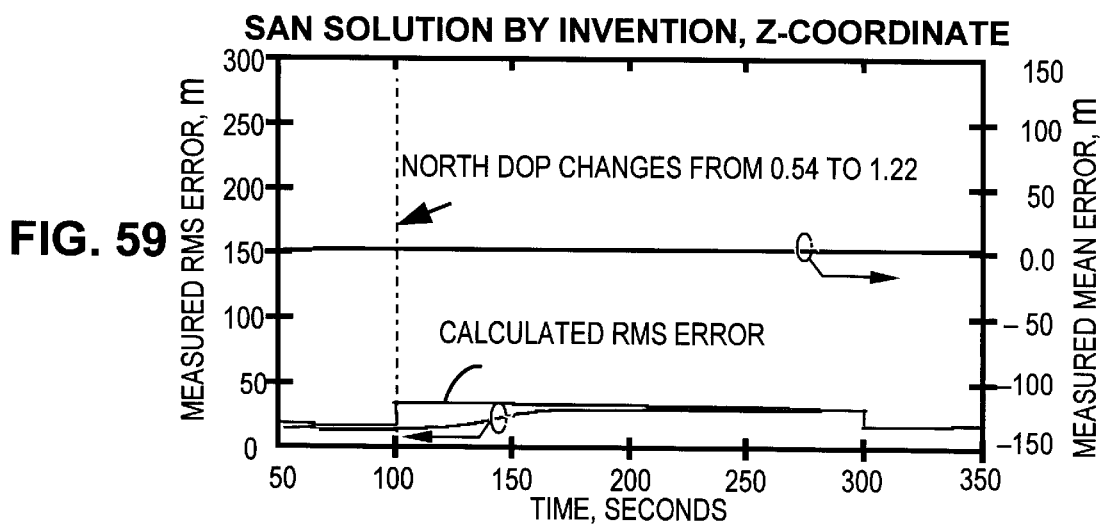

FIGS. 57–59 shows mean errors and root mean square errors in the final estimates for SAN mode when the preferred method (C) of generating the weight factor $\alpha_n$ is used (en=4).

Figure 60:
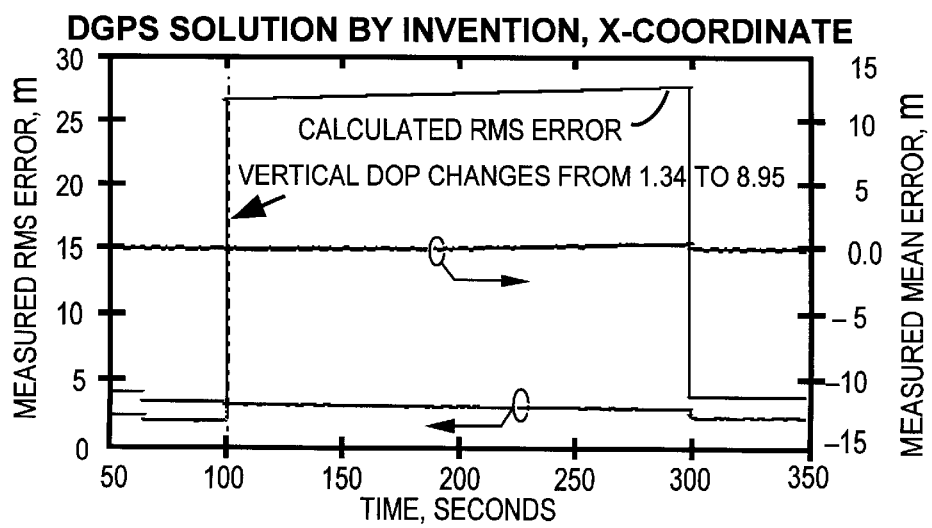
FIGS. 60–62 show mean and root mean square errors for the estimates of the receiver's coordinates generated according to the present invention when using a second preferred rule of generating a weight factor ($\alpha_n$, with en=4), and when operating in DGPS mode.
Figure 61:
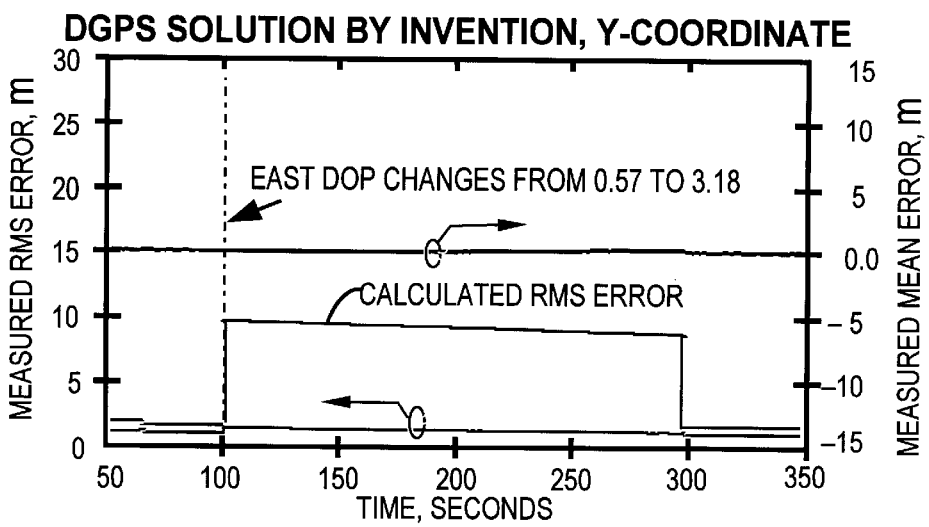
Figure 62:
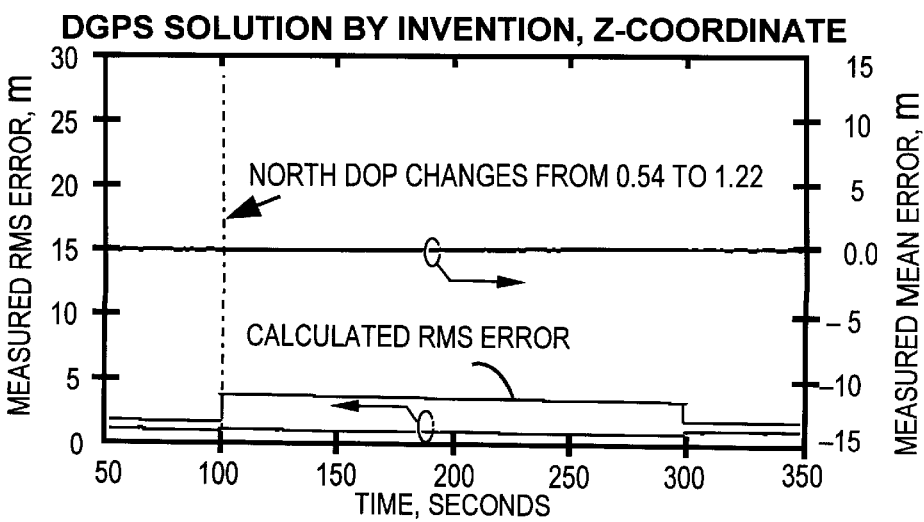

FIGS. 60–62 shows mean errors and root mean square errors in the final estimates for DGPS mode when the preferred method (C) of generating the weight factor an is used (en=4).

As one can see from the presented figures, a jump in the dilution of precision does not bring about the sharp increase in the root mean square error of the coordinate estimates which typically occurs in the snapshot estimates of the coordinates. In addition, an acceleration pulse does not bring about the appearance of dynamic errors, which typical appear in the estimates provided by Kalman filtering and the McBurney method.

While the present invention has been particularly described with respect to the illustrated embodiments, it will be appreciated that various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A method of generating a set of one or more refined estimates ($\hat{P}^f_{x,n}$, $\hat{P}^f_{y,n}$, $\hat{P}^f_{z,n}$, $\hat{P}^f_{\tau,n}$) for a selected set of one or more corresponding position-time components of a receiver of global positioning satellite signals for a moment of time $t_n$, each position-time component of the selected set being one of the receiver's position coordinates or the receiver's time offset, each satellite signal being transmitted by a corresponding satellite and enabling the receiver to measure a pseudorange between itself and the corresponding satellite, said method comprising the steps of:

(a) obtaining a set of one or more snapshot-solution values ($\tilde{P}_{x,n}$, $\tilde{P}_{y,n}$, $\tilde{P}_{z,n}$, $\tilde{P}_{\tau,n}$) for the selected set of one or more position-time components at the time moment $t_n$, a corresponding snapshot-solution value being obtained for each position-time component in the selected set;

(b) generating a set of one or more predicted values ($\hat{P}'_{x,n}$, $\hat{P}'_{y,n}$, $\hat{P}'_{z,n}$, $\hat{P}'_{\tau,n}$) for the selected set of one or more position-time components at the time moment $t_n$, a corresponding predicted value being generated for each position-time component in the selected set, said predicted values being generated from a measurement of a plurality of satellite carrier phases over a time interval from a previous time moment $t_{n-1}$ to the time moment $t_n$ and from a set of one or more values for the selected set of one or more position-time components at the previous time moment $t_{n-1}$;

(c) generating a first quality factor $Q_n$ which is representative of the accuracy of the set of one or more snapshot solution values;

(d) generating a second quality factor $Q_n'$ which is representative of the accuracy of the set of one or more predicted values;

(e) generating said set of one or more refined estimates ($\hat{P}^f_{x,n}$, $\hat{P}^f_{y,n}$, $\hat{P}^f_{z,n}$, $\hat{P}^f_{\tau,n}$) for the corresponding selected position-time components as a first multiplier ($\alpha_n$) of the set of the corresponding snapshot-solution values plus a second multiplier $(1-\alpha_n)$ of the set of the corresponding predicted values, with the sum of said first and second multipliers being equal to 1, wherein the first multiplier ($\alpha_n$) is greater than the second multiplier $(1-\alpha_n)$ when the first and second quality factors indicate that the set of snapshot-solution values are more accurate than the set of predicted values, and wherein the second multiplier $(1-\alpha_n)$ is greater that the first multiplier ($\alpha_n$) when the first and second quality factors indicate that the set of predicted values is more accurate than the set of snapshot-solution values.

2. The method of claim 1 wherein said set of refined estimates includes three refined estimates ($\hat{P}^f_{x,n}$, $\hat{P}^f_{y,n}$, $\hat{P}^f_{z,n}$) for three corresponding position coordinates and one refined estimate ($\hat{P}^f_{\tau,n}$) for the time offset.

3. The method of claim 1 wherein the first quality factor $Q_n$ generated in step (c) decreases in value as the accuracy of the set of one or more snapshot solution values increases.

4. The method of claim 1 wherein the first quality factor $Q_n$ generated in step (c) increases in value as the accuracy of the set of snapshot solution values increases.

5. The method of claim 3 wherein said step (c) of generating the first quality factor $Q_n$ comprises the steps of:

generating the diagonal elements of a covariance matrix $\mathfrak{R}^\gamma_n$ for the time moment $t_n$, said covariance matrix $\mathfrak{R}^\gamma_n$ being representative of the errors in the receiver's coordinates and time offset caused by measurement errors in the pseudoranges between the receiver and the satellites and having a form equivalent to:

$$\mathfrak{R}^\gamma_n = [H^T_{1,n} \cdot (R^\gamma_n)^{-1} \cdot H_{1,n}]^{-1},$$

where the matrix $H_{1,n}$ is the directional cosines matrix for the collection of satellites that are currently being received and tracked by the receiver and the matrix $R^\gamma_n$ is representative of the errors in the pseudoranges measured by the receiver, wherein the diagonal elements of matrix $\mathfrak{R}^\gamma_n$ are denoted as $\mathfrak{R}^\gamma_{n,11}$, $\mathfrak{R}^\gamma_{n,22}$, $\mathfrak{R}^\gamma_{n,33}$, and $\mathfrak{R}^\gamma_{n,44}$; and generating said first quality factor $Q_n$ from said diagonal elements such that it is proportional to at least one of the forms of:

$$Q_n [\mathfrak{R}^\gamma_{n,11} + \mathfrak{R}^\gamma_{n,22} + \mathfrak{R}^\gamma_{n,33} + \mathfrak{R}^\gamma_{n,44}]^k,$$
$$Q_n \exp[\mathfrak{R}^\gamma_{n,11} + \mathfrak{R}^\gamma_{n,22} + \mathfrak{R}^\gamma_{n,33} + \mathfrak{R}^\gamma_{n,44}],$$

and $$Q_n \log[\mathfrak{R}^\gamma_{n,11} + \mathfrak{R}^\gamma_{n,22} + \mathfrak{R}^\gamma_{n,33} + \mathfrak{R}^\gamma_{n,44}],$$

where k is a positive number greater than 0, the magnitude of said first quality factor $Q_n$ thereby being a monotonic increasing function of the diagonal elements of matrix $\mathfrak{R}^\gamma_n$.

6. The method of claim 4 wherein said step (c) of generating the first quality factor $Q_n$ comprises the steps of:

generating the diagonal elements of a covariance matrix $\mathfrak{R}^\gamma_n$ for the time moment $t_n$, said covariance matrix $\mathfrak{R}^\gamma_n$ being representative of the errors in the receiver's coordinates and time offset caused by measurement errors in the pseudoranges between the receiver and the satellites and having a form equivalent to:

$$\mathfrak{R}^\gamma_n = [H^T_{1,n} \cdot (R^\gamma_n)^{-1} \cdot H_{1,n}]^{-1},$$

where the matrix $H_{1,n}$ is the directional cosines matrix for the collection of satellites that are currently being received and tracked by the receiver and the matrix $R^\gamma_n$ is representative of the errors in the pseudoranges measured by the receiver, wherein the diagonal elements of matrix $\mathfrak{R}^\gamma_n$ are denoted as $\mathfrak{R}^\gamma_{n,11}$, $\mathfrak{R}^\gamma_{n,22}$, $\mathfrak{R}^\gamma_{n,33}$, and $\mathfrak{R}^\gamma_{n,44}$; and generating said first quality factor $Q_n$ from said diagonal elements such that it is proportional to at least one of the forms of:

$$Q_n [\mathfrak{R}^\gamma_{n,11} + \mathfrak{R}^\gamma_{n,22} + \mathfrak{R}^\gamma_{n,33} + \mathfrak{R}^\gamma_{n,44}]^k,$$
$$Q_n \exp[-(\mathfrak{R}^\gamma_{n,11} + \mathfrak{R}^\gamma_{n,22} + \mathfrak{R}^\gamma_{n,33} + \mathfrak{R}^\gamma_{n,44})],$$

and $$Q_n -\log[\mathfrak{R}^\gamma_{n,11} + \mathfrak{R}^\gamma_{n,22} + \mathfrak{R}^\gamma_{n,33} + \mathfrak{R}^\gamma_{n,44}],$$

where k is a negative number less than 0, the magnitude of said first quality factor $Q_n$ thereby being a monotonic decreasing function of the diagonal elements of matrix $\mathfrak{R}^\gamma_n$.

7. The method of claim 3 comprising the step of performing steps (a)–(d) at a preceding time moment $t_{n-1}$, and wherein the magnitude of said second quality factor $Q_n'$ generated in said step (d) at the time moment $t_n$ increases monotonically compared to its previous value at the preceding time moment $t_{n-1}$.

8. The method of claim 4 comprising the step of performing steps (a)–(d) at a preceding time moment $t_{n-1}$, and wherein the magnitude of said second quality factor $Q_n'$ generated in said step (d) at the time moment $t_n$ decreases monotonically compared to its previous value at the preceding time moment $t_{n-1}$.

9. The method of claim 3 wherein said step (e) further comprises the steps of setting the first multiplier ($\alpha_n$) to be equal to a value greater than the second multiplier ($1-\alpha_n$) when the first quality factors $Q_n$ is less than the second quality factor $Q_n'$, and setting the second multiplier ($1-\alpha_n$) to be equal to a value greater that the first multiplier ($\alpha_n$) when the first quality factor $Q_n$ is greater than the second quality factor $Q_n'$.

10. The method of claim 4 wherein said step (e) further comprises the steps of setting the first multiplier ($\alpha_n$) to be equal to a value greater than the second multiplier ($1-\alpha_n$) when the first quality factor $Q_n$ is greater than the second quality factor $Q_n'$, and setting the second multiplier ($1-\alpha_n$) equal to a value greater that the first multiplier ($\alpha_n$) when the first quality factor $Q_n$ is less than the second quality factor $Q_n'$.

11. The method of claim 5 wherein the matrix elements of matrix $R^Y_n$ comprise the a priori known matrix of pseudo-range measurement errors for the satellites.

12. The method of claim 6 wherein the matrix elements of matrix $R^Y_n$ comprise the a priori known matrix of pseudo-range measurement errors for the satellites.

13. The method of claim 5 wherein the inverse matrix $(R^Y_n)^{-1}$ used in step (c) of generating covariance matrix $\mathfrak{R}^Y_n$ comprises a diagonal matrix with one diagonal element corresponding to a satellite, and wherein each diagonal element is proportional to the elevation angle of its corresponding satellite.

14. The method of claim 6 wherein the inverse matrix $(R^Y_n)^{-1}$ used in step (c) of generating covariance matrix $\mathfrak{R}^Y_n$ comprises a diagonal matrix with one diagonal element corresponding to a satellite, and wherein each diagonal element is propotional to the elevation angle of its corresponding satellite.

15. The method of claim 5 wherein step (c) further comprises the step of assigning a scalar value for each satellite which is representative of the health of the satellite, and wherein the inverse matrix $(R^Y_n)^{-1}$ used in step (c) of generating covariance matrix $\mathfrak{R}^Y_n$ comprises a diagonal matrix with one diagonal element corresponding to a satellite, and wherein each diagonal element comprises the scalar value representing the health of its corresponding satellite.

16. The method of claim 6 wherein step (c) further comprises the step of assigning a scalar value for each satellite which is representative of the health of the satellite, and wherein the inverse matrix $(R^Y_n)^{-1}$ used in step (c) of generating covariance matrix $\mathfrak{R}^Y_n$ comprises a diagonal matrix with one diagonal element corresponding to a satellite, and wherein each diagonal element comprises the scalar value representing the health of its corresponding satellite.

17. The method of claim 5 wherein the matrix elements of matrix $(R^Y_n)^{-1}$ comprise the unit matrix.

18. The method of claim 6 wherein the matrix elements of matrix $(R^Y_n)^{-1}$ comprise the unit matrix.

19. The method of claim 7 wherein a temporary parameter $MQ_n'$ is set equal to the initial value of the first quality factor $Q_n$ at an initial time moment (n=0):

$$MQ_n'=Q_n(n=0),$$

wherein step (d) generated, at the preceding time moment $t_{n-1}$, the temporary parameter $MQ_n'$ for the current time $t_n$ in the form of: $MQ_n'=\text{MIN}\{Q_{n-1}, Q'_{n-1}\}$, where $\text{MIN}\{*\}$ is an operation which selects the lower value of the first and second quality factors;

wherein step (d) generates, at time moment $t_n$, the second quality factor $Q_n'$ for the current time $t_n$ in the form of: $Q_n'=k \cdot MQ_n'$, wherein k is greater than 1;

wherein step (d) generates, at time moment $t_n$, the temporary parameter $MQ_n'$ for the next time moment $t_{n+1}$ in the form of: $MQ_{n+1}=\text{MIN}\{Q_n, Q'_n\}$.

20. The method of claim 19 wherein the $\text{MIN}\{*\}$ operation comprises the steps of determining if $Q'_n$ is greater than $Q_n$, and if so, setting the parameter $MQ_{n+1}$ to the value of $Q_n$, and otherwise setting the parameter $MQ_{n+1}$ to the value of $Q'_n$.

21. The method of claim 7 wherein a temporary parameter $MQ_n'$ is set equal to the initial value of the first quality factor $Q_n$ at an initial time moment (n=0):

$$MQ_n'=Q_n(n=0),$$

wherein step (d) generated, at the preceding time moment $t_{n-1}$, the temporary parameter $MQ_n'$ for the current time $t_n$ in the form of: $MQ_n'=\text{MIN}\{Q_{n-1}, Q'_{n-1}\}$, where $\text{MIN}\{*\}$ is an operation which selects the lower value of the first and second quality factors;

wherein step (d) generates, at time moment $t_n$, the second quality factor $Q_n'$ for the current time $t_n$ in the form of: $Q_n'=kq[n-p] \cdot MQ'_n$, where:

kq[*] is a vector of m parameter values: kq[0], kq[1], ... kq[m], each of which is greater than 1, "n" is the current integer value representing the current time moment $t_n$, n being incremented at each reiteration of steps (a)–(e), "p" is an integer which is less than or equal to "n" when the quantity (n–p) is less than m, and which is equal to (n–m) when the quantity (n–p) is equal or greater than m, the value of p being set to zero at an initial time moment (n=0);

wherein step (d) generates, at time moment $t_n$, the temporary parameter $MQ_n'$ for the next time moment $t_{n+1}$ in the form of: $MQ_{n+1}=\text{MIN}\{Q_n, Q'_n\}$; and wherein step (d) comprises the step of setting p=n if $Q_n<Q_n'$, otherwise the value of p is left unchanged.

22. The method of claim 7 wherein a temporary parameter $MQ_n'$ is set equal to the initial value of the first quality factor $Q_n$ at an initial time moment (n=0):

$$MQ_n'=Q_n(n=0),$$

wherein step (d) generated, at the preceding time moment $t_{n-1}$, the temporary parameter $MQ_n'$ for the current time $t_n$ in the form of: $MQ_n'=\text{MIN}\{Q_{n-1}, Q'_{n-1}\}$, where $\text{MIN}\{*\}$ is an operation which selects the lower value of the first and second quality factors;

wherein step (d) generates, at time moment $t_n$, the second quality factor $Q_n'$ for the current time $t_n$ in the form of: $Q_n'=(MQ_n')^k$, wherein k is greater than 1;

wherein step (d) generates, at time moment $t_n$, the temporary parameter $MQ_n'$ for the next time moment $t_{n+1}$ in the form of: $MQ_{n+1}=\text{MIN}\{Q_n, Q'_n\}$.

23. The method of claim 22 wherein the $\text{MIN}\{*\}$ operation comprises the steps of determining if $Q'_n$ is greater than $Q_n$, and if so, setting the parameter $MQ_{n+1}$ to the value of $Q_n$, and otherwise setting the parameter $MQ_{n+1}$ to the value of $Q'_n$.

24. The method of claim 7 wherein a temporary parameter $MQ_n'$ is set equal to the initial value of the first quality factor $Q_n$ at an initial time moment (n=0):

$$MQ_n'=Q_n(n=0),$$

wherein step (d) generated, at the preceding time moment $t_{n-1}$, the temporary parameter $MQ_n'$ for the current time $t_n$ in the form of: $MQ_n'=\text{MIN}\{Q_{n-1}, Q'_{n-1}\}$, where MIN{*} is an operation which selects the lower value of the first and second quality factors;

wherein step (d) generates, at time moment $t_n$, the second quality factor $Q_n'$ for the current time $t_n$ in the form of: $Q_n'=(MQ'_n)^{kq[n-p]}$, where:

kq[*] is a vector of m parameter values: kq[0], kq[1], . . . kq[m], each of which is greater than 1, "n" is the current integer value representing the current time moment $t_n$, n being incremented at each reiteration of steps (a)–(e), "p" is an integer which is less than or equal to "n" when the quantity (n–p) is less than m, and which is equal to (n–m) when the quantity (n–p) is equal or greater than m, the value of p being set to zero at an initial time moment (n=0);

wherein step (d) generates, at time moment $t_n$, the temporary parameter $MQ_n'$ for the next time moment $t_{n+1}$ in the form of: $MQ_{n+1}=\text{MIN}\{Q_n, Q'_n\}$; and wherein step (d) comprises the step of setting p=n if $Q_n<Q_n'$, otherwise the value of p is left unchanged.

25. The method of claim 7 wherein the second quality factor $Q_n'$ is set equal to the initial value of the first quality factor $Q_n$ at an initial time moment (n=0):

$$Q_n'=Q_n(n=0);$$

wherein a set of four parameters $\Phi_1$, $\Phi_2$, $\Phi_3$, and $\Phi_4$ are set equal to the square roots of the corresponding diagonal elements of said covariance matrix $\mathfrak{R}^\gamma_n$ at the initial time moment (n=0):

$$\Phi_1=\sqrt{\mathfrak{R}^\gamma_{0,11}}, \Phi_2=\sqrt{\mathfrak{R}^\gamma_{0,22}}, \Phi_3=\sqrt{\mathfrak{R}^\gamma_{0,33}}, \Phi_4=\sqrt{\mathfrak{R}^\gamma_{0,44}};$$

wherein a set of four estimates $\Psi_{1,n}$, $\Psi_{2,n}$, $\Psi_{3,n}$, and $\Psi_{4,n}$ for the errors in the predicted position coordinates and time offset ($\hat{P}'_{x,n-1}$, $\hat{P}'_{y,n-1}$, $\hat{P}'_{z,n-1}$, $\hat{P}'_{\tau,n-1}$) are set equal to the square roots of the corresponding diagonal elements of said covariance matrix $\mathfrak{R}^\gamma_n$ at the initial time moment (n=0):

$$\Psi_{1,n}=\sqrt{\mathfrak{R}^\gamma_{0,11}}, \Psi_{2,n}=\sqrt{\mathfrak{R}^\gamma_{0,22}}, \Psi_{3,n}=\sqrt{\mathfrak{R}^\gamma_{0,33}}, \Psi_{4,n}=\sqrt{\mathfrak{R}^\gamma_{0,44}};$$

wherein step (d) generates, at time moment $t_n$, the four estimates in forms equivalent to:

$$\Psi_{1,n}=\Psi_{1,n-1}+Ki\cdot\Delta t\cdot(\sqrt{\mathfrak{R}^\gamma_{n,11}}-\Phi_1),$$

$$\Psi_{2,n}=\Psi_{2,n-1}+Ki\cdot\Delta t\cdot(\sqrt{\mathfrak{R}^\gamma_{n,22}}-\Phi_2),$$

$$\Psi_{3,n}=\Psi_{3,n-1}+Ki\cdot\Delta t\cdot(\sqrt{\mathfrak{R}^\gamma_{n,33}}-\Phi_3),$$

$$\Psi_{4,n}=\Psi_{4,n-1}+Ki\cdot\Delta t\cdot(\sqrt{\mathfrak{R}^\gamma_{n,44}}-\Phi_4),$$

where $\Psi_{1,n-1}$, $\Psi_{2,n-1}$, $\Psi_{3,n-1}$, $\Psi_{4,n-1}$ are the estimates of the errors at a prior time moment $t_{n-1}$, where $\Delta t$ is the time interval between time moments $t_n$ and $t_{n-1}$, and where Ki is a scalar constant;

wherein step (d) generates, at time moment $t_n$, the second quality factor $Q_n'$ as a monotonic increasing function of the estimates $\Psi_{1,n}$, $\Psi_{2,n}$, $\Psi_{3,n}$, and $\Psi_{4,n}$; and wherein step (d) resets, at time moment $t_n$, the parameters $\Phi_1$, $\Phi_2$, $\Phi_3$, $\Phi_4$ and the estimates $\Psi_{1,n}$, $\Psi_{2,n}$, $\Psi_{3,n}$, $\Psi_{4,n}$ to the square roots of the diagonal elements of said covariance matrix $\mathfrak{R}^\gamma_n$ at time moment $t_n$ as follows:

$$\Phi_1=\sqrt{\mathfrak{R}^\gamma_{0,11}}, \Phi_2=\sqrt{\mathfrak{R}^\gamma_{0,22}}, \Phi_3=\sqrt{\mathfrak{R}^\gamma_{0,33}}, \Phi_4=\sqrt{\mathfrak{R}^\gamma_{0,44}},$$

$$\Psi_{1,n}=\sqrt{\mathfrak{R}^\gamma_{0,11}}, \Psi_{2,n}=\sqrt{\mathfrak{R}^\gamma_{0,22}}, \Psi_{3,n}=\sqrt{\mathfrak{R}^\gamma_{0,33}}, \Psi_{4,n}=\sqrt{\mathfrak{R}^\gamma_{0,44}}$$

if the quality factors time moment $t_n$ indicate that the snapshot values at time $t_n$ are more accurate than the predicted values at time $t_n$.

26. The method of claim 25 wherein step (d) generates the second quality factor $Q_n'$ such that it is proportional to at least one of the forms of:

$$Q_n' [(\Psi_{1,n})^2+(\Psi_{2,n})^2+(\Psi_{3,n})^2+(\Psi_{4,n})^2]^k,$$

$$Q_n' \exp[(\Psi_{1,n})^2+(\Psi_{2,n})^2+(\Psi_{3,n})^2+(\Psi_{4,n})^2],$$

and $$Q_n' \log[(\Psi_{1,n})^2+(\Psi_{2,n})^2+(\Psi_{3,n})^2+(\Psi_{4,n})^2],$$

where k is a positive number greater than 0.

27. The method of claim 8 wherein a temporary parameter $MQ_n'$ is set equal to the initial value of the first quality factor $Q_n$ at an initial time moment (n=0):

$$MQ_n'=Q_n(n=0),$$

wherein step (d) generated, at the preceding time moment $t_{n-1}$, the temporary parameter $MQ_n'$ for the current time $t_n$ in the form of: $MQ_n'=\text{MAX}\{Q_{n-1}, Q'_{n-1}\}$, where MAX{*} is an operation which selects the higher value of the first and second quality factors;

wherein step (d) generates, at time moment $t_n$, the second quality factor $Q_n'$ for the current time $t_n$ in the form of: $Q_n'=k\cdot MQ_n'$, wherein k is less than 1;

wherein step (d) generates, at time moment $t_n$, the temporary parameter $MQ_n'$ for the next time moment $t_{n+1}$ in the form of: $MQ_{n+1}=\text{MAX}\{Q_n, Q'_n\}$.

28. The method of claim 27 wherein the MAX{*} operation comprises the steps of determining if $Q'_n$ is less than $Q_n$, and if so, setting the parameter $MQ_{n+1}$ to the value of $Q_n$, and otherwise setting the parameter $MQ_{n+1}$ to the value of $Q'_n$.

29. The method of claim 8 wherein a temporary parameter $MQ_n'$ is set equal to the initial value of the first quality factor $Q_n$ at an initial time moment (n=0):

$$MQ_n'=Q_n(n=0),$$

wherein step (d) generated, at the preceding time moment $t^{n-1}$, the temporary parameter $MQ_n'$ for the current time $t_n$ in the form of: $MQ_n'=\text{MAX}\{Q_{n-1}, Q'_{n-1}\}$, where MAX{*} is a operation which selects the higher value of the first and second quality factors;

wherein step (d) generates, at time moment $t_n$, the second quality factor $Q_n'$ for the current time $t_n$ in the form of: $Q_n'=kq[n-p]\cdot MQ'_n$, where:

kq[*] is a vector of m parameter values: kq[0], kq[1], . . . kq[m], each of which is less than 1, "n" is the current integer value representing the current time moment $t_n$, n being incremented at each reiteration of steps (a)–(e), "p" is an integer which is less than or equal to "n" when the quantity (n–p) is less than m, and which is equal to (n–m) when the quantity (n–p) is equal or greater than m, the value of p being set to zero at an initial time moment (n=0);

wherein step (d) generates, at time moment $t_n$, the temporary parameter $MQ_n'$ for the next time moment $t_{n+1}$ in the form of: $MQ_{n+1} = \text{MAX}\{Q_n, Q'_n\}$; and wherein step (d) comprises the step of setting p=n if $Q_n > Q_n'$, otherwise the value of p is left unchanged.

30. The method of claim 8 wherein a temporary parameter $MQ_n'$ is set equal to the initial value of the first quality factor $Q_n$ at an initial time moment (n=0):

$$MQ_n' = Q_n(n=0),$$

wherein step (d) generated, at the preceding time moment $t_{n-1}$, the temporary parameter $MQ_n'$ for the current time $t_n$ in the form of: $MQ_n' = \text{MAX}\{Q_{n-1}, Q'_{n-1}\}$, where MAX{*} is an operation which selects the higher value of the first and second quality factors;

wherein step (d) generates, at time moment $t_n$, the second quality factor $Q_n'$ for the current time $t_n$ in the form of: $Q_n' = (MQ_n')^k$, wherein k is less than 1;

wherein step (d) generates, at time moment $t_n$, the temporary parameter $MQ_n'$ for the next time moment $t_{n+1}$ in the form of: $MQ_{n+1} = \text{MAX}\{Q_n, Q'_n\}$.

31. The method of claim 30 wherein the MAX{*} operation comprises the steps of determining if $Q'_n$ is greater than $Q_n$, and if so, setting the parameter $MQ_{n+1}$ to the value of $Q'_n$, and otherwise setting the parameter $MQ_{n+1}$ to the value of $Q_n$.

32. The method of claim 8 wherein a temporary parameter $MQ_n'$ is set equal to the initial value of the first quality factor $Q_n$ at an initial time moment (n=0):

$$MQ_n' = Q_n(n=0),$$

wherein step (d) generated, at the preceding time moment $t_{n-1}$, the temporary parameter $MQ_n'$ for the current time $t_n$ in the form of: $MQ_n' = \text{MAX}\{Q_{n-1}, Q'_{n-1}\}$, where MAX{*} is a operation which selects the higher value of the first and second quality factors;

wherein step (d) generates, at time moment $t_n$, the second quality factor $Q_n'$ for the current time $t_n$ in the form of: $Q_n' = (MQ'_n)^{kq[n-p]}$, where:

kq[*] is a vector of m parameter values: kq[0], kq[1], . . . kq[m], each of which is less than 1, "n" is the current integer value representing the current time moment $t_n$, n being incremented at each reiteration of steps (a)–(e), "p" is an integer which is less than or equal to "n" when the quantity (n−p) is less than m, and which is equal to (n−m) when the quantity (n−p) is equal or greater than m, the value of p being set to zero at an initial time moment (n=0);

wherein step (d) generates, at time moment $t_n$, the temporary parameter $MQ_n'$ for the next time moment $t_{n+1}$ in the form of: $MQ_{n+1} = \text{MAX}\{Q_n, Q'_n\}$; and wherein step (d) comprises the step of setting p=n if $Q_n > Q_n'$, otherwise the value of p is left unchanged.

33. The method of claim 8 wherein the second quality factor $Q_n'$ is set equal to the initial value of the first quality factor $Q_n$ at an initial time moment (n=0):

$$Q_n' = Q_n(n=0);$$

wherein a set of four parameters $\Phi_1$, $\Phi_2$, $\Phi_3$, and $\Phi_4$ are set equal to the square roots of the corresponding diagonal elements of said covariance matrix $\mathfrak{R}^\gamma_n$ at the initial time moment (n=0):

$$\Phi_1 = \sqrt{\mathfrak{R}^\gamma_{0,11}},\ \Phi_2 = \sqrt{\mathfrak{R}^\gamma_{0,22}},\ \Phi_3 = \sqrt{\mathfrak{R}^\gamma_{0,33}},\ \Phi_4 = \sqrt{\mathfrak{R}^\gamma_{0,44}};$$

wherein a set of four estimates $\Psi_{1,n}$, $\Psi_{2,n}$, $\Psi_{3,n}$, and $\Psi_{4,n}$ for the errors in the predicted position coordinates and time offset ($\hat{P}'_{x,n-1}, \hat{P}'_{y,n-1}, \hat{P}'_{z,n-1}, \hat{P}'_{\tau,n-1}$) are set equal to the square roots of the corresponding diagonal elements of said covariance matrix $\mathfrak{R}^\gamma_n$ at the initial time moment (n=0):

$$\Psi_{1,n} = \sqrt{\mathfrak{R}^\gamma_{0,11}},\ \Psi_{2,n} = \sqrt{\mathfrak{R}^\gamma_{0,22}},\ \Psi_{3,n} = \sqrt{\mathfrak{R}^\gamma_{0,33}},\ \Psi_{4,n} = \sqrt{\mathfrak{R}^\gamma_{0,44}};$$

wherein step (d) generates, at time moment $t_n$, the four estimates in forms equivalent to:

$$\Psi_{1,n} = \Psi_{1,n-1} + Ki \cdot \Delta t \cdot (\sqrt{\mathfrak{R}^\gamma_{n,11}} - \Phi_1),$$

$$\Psi_{2,n} = \Psi_{2,n-1} + Ki \cdot \Delta t \cdot (\sqrt{\mathfrak{R}^\gamma_{n,22}} - \Phi_2),$$

$$\Psi_{3,n} = \Psi_{3,n-1} + Ki \cdot \Delta t \cdot (\sqrt{\mathfrak{R}^\gamma_{n,33}} - \Phi_3),$$

$$\Psi_{4,n} = \Psi_{4,n-1} + Ki \cdot \Delta t \cdot (\sqrt{\mathfrak{R}^\gamma_{n,44}} - \Phi_4),$$

where $\Psi_{1,n-1}$, $\Psi_{2,n-1}$, $\Psi_{3,n-1}$, $\Psi_{4,n-1}$ are the estimates of the errors at a prior time moment $t_{n-1}$, where $\Delta t$ is the time interval between time moments $t_n$ and $t_{n-1}$, and where Ki is a scalar constant;

wherein step (d) generates, at time moment $t_n$, the second quality factor $Q_n'$ as a monotonic increasing function of the estimates $\Psi_{1,n}$, $\Psi_{2,n}$, $\Psi_{3,n}$, and $\Psi_{4,n}$; and wherein step (d) resets, at time moment $t_n$, the parameters $\Phi_1$, $\Phi_2$, $\Phi_3$, $\Phi_4$ and the estimates $\Psi_{1,n}$, $\Psi_{2,n}$, $\Psi_{3,n}$, $\Psi_{4,n}$ to the square roots of the diagonal elements of said covariance matrix $\mathfrak{R}^\gamma_n$ at time moment $t_n$ as follows:

$$\Phi_1 = \sqrt{\mathfrak{R}^\gamma_{0,11}},\ \Phi_2 = \sqrt{\mathfrak{R}^\gamma_{0,22}},\ \Phi_3 = \sqrt{\mathfrak{R}^\gamma_{0,33}},\ \Phi_4 = \sqrt{\mathfrak{R}^\gamma_{0,44}};$$

$$\Psi_{1,n} = \sqrt{\mathfrak{R}^\gamma_{0,11}},\ \Psi_{2,n} = \sqrt{\mathfrak{R}^\gamma_{0,22}},\ \Psi_{3,n} = \sqrt{\mathfrak{R}^\gamma_{0,33}},\ \Psi_{4,n} = \sqrt{\mathfrak{R}^\gamma_{0,44}};$$

if the quality factors time moment $t_n$ indicate that the snapshot values at time $t_n$ are more accurate than the predicted values at time $t_n$.

34. The method of claim 33 wherein step (d) generates the second quality factor $Q_n'$ such that it is proportional to at least one of the forms of:

$$Q_n' [(\Psi_{1,n})^2 + (\Psi_{2,n})^2 + (\Psi_{3,n})^2 + (\Psi_{4,n})^2]^k,$$

$$Q_n' \exp\{-[(\Psi_{1,n})^2 + (\Psi_{2,n})^2 + (\Psi_{3,n})^2 + (\Psi_{4,n})^2]\},$$

and $$Q_n' -\log\{[(\Psi_{1,n})^2 + (\Psi_{2,n})^2 + (\Psi_{3,n})^2 + (\Psi_{4,n})^2]\},$$

where k is a negative number less than 0.

35. The method of claim 9 wherein said step (d) further comprises the step of generating the first multiplier $\alpha_n$ in a form equivalent to:

$$\alpha_n = 1 - 0.5 * \exp\{en * \log[2 * Q_n'/(Q_n' + Q_n)]\}$$

and said second multiplier in the form of $(1-\alpha_n)$ when the first and second quality factors indicate that the snapshot solution values are more accurate than the predicted values, wherein the term en is a number greater than zero, and the step of generating the first multiplier $\alpha_n$ in a form equivalent to:

$$\alpha_n = 0.5 * \exp\{en * \log[2 * Q_n'/(Q_n' + Q_n)]\}$$

and said second multiplier in the form of $(1-\alpha_n)$ when the first and second quality factors indicate that the predicted values are more accurate than the snapshot solution values.

36. The method of claim 10 wherein step (d) further comprises the step of generating the first multiplier $\alpha_n$ in a form equivalent to:

$$\alpha_n = 0.5 * \exp\{en * \log[2 * Q_n/(Q_n' + Q_n)]\}$$

and said second multiplier in the form of $(1-\alpha_n)$ when the first and second quality factors indicate that the snapshot solution values are more accurate than the predicted values, wherein the term en is a number greater than zero, and the step of generating the first multiplier $\alpha_n$ in the form of $$\alpha_n = 1 - 0.5 * \exp\{en * \log[2 * Q_n/(Q_n' + Q_n)]\}$$

and said second multiplier in the form of $(1-\alpha_n)$ when the first and second quality factors indicate that the predicted values are more accurate than the snapshot solution values.

37. The method of claim 1 wherein the following quantities were obtained for the previous time moment $t_{n-1}$: a previous instance of the first quality factor $Q_{n-1}$ for a set of snapshot-solution values $(\tilde{P}_{x,n-1}, \tilde{P}_{y,n-1}, \tilde{P}_{z,n-1}, \tilde{P}_{\tau,n-1})$ at the previous time moment $t_{-1}$, and a previous instance of the second quality factor $Q_{n-1}'$ for a set of predicted values $(\hat{P}'_{x,n-1}, \hat{P}'_{y,n-1}, \hat{P}'_{z,n-1}$ and $\hat{P}'_{\tau,n-1})$ at the previous time moment $t_{n-1}$; and wherein the second quality factor $Q_n'$ for the time moment $t_n$ is generated in step (d) as a scalar factor k multiplied by the value of the first quality factor $Q_{n-1}$ at the previous time moment $t_{n-1}$ when the set of snapshot-solution values at said previous time moment were more accurate than the set of predicted values at said previous time moment, and wherein the second quality factor $Q_n'$ for the time moment $t_n$ is generated as the scalar factor k multiplied by the value of the second quality factor $Q_{n-1}'$ at the previous time moment $t_{n-1}$ when the set of predicted values at said previous time moment were more accurate than the set of snapshot-solution values at said previous time moment.

38. The method of claim 37 wherein said scalar factor k is greater than 1.

39. The method of claim 37 wherein said scalar factor k is less than 1.

40. The method of claim 37 wherein the value of k is selected from a set of values kq[*] and wherein k is set equal to one of the members of said set kq[*] at each time moment;

wherein the value of k is initially set equal to a predetermined member of said set kq[*]; and wherein, for at least two successive time moments, the value of k at each said time moment is set equal to a different member of said set kq[*] when the first and second quality factors $Q_{n-1}$ and $Q_{n-1}'$ at the previous time moment $t_{n-1}$ indicate that the set of predicted values at said previous time moment were more accurate than the set of snapshot-solution values at said previous time moment; and wherein the value of k is set equal to said predetermined member of the said set kq[*] when the first and second quality factors $Q_{n-1}$ and $Q_{n-1}'$ at the previous time moment $t_{n-1}$ indicate that the set of snapshot-solution values at said previous time moment were more accurate than the set of predicted values at said previous time moment.

41. The method of claim 1 wherein the following quantities were obtained for the previous time moment $t_{n-1}$: a previous instance of the first quality factor $Q_{n-1}$ for a set of snapshot-solution values $(\tilde{P}_{x,n-1}, \tilde{P}_{y,n-1}, \tilde{P}_{z,n-1}, \tilde{P}_{\tau,n-1})$ for the position coordinates and time offset of the receiver at the previous time moment $t_{n-1}$, and a previous instance of the second quality factor $Q_{n-1}'$ for a set of predicted position coordinates and time offset $(\hat{P}'_{x,n-1}, \hat{P}'_{y,n-1}, \hat{P}'_{z,n-1}$ and $\hat{P}'_{\tau,n-1})$ for the previous time moment $t_{n-1}$; and wherein the second quality factor $Q_n'$ for the time moment $t_n$ is generated as the previous instance of the first quality factor $Q_{n-1}$ raised to the power of a scalar factor k:

$$Q_n' = (Q_{n-1})^k$$

when the first and second quality factors $Q_{n-1}$ and $Q_{n-1}'$ at the previous time moment $t_{n-1}$ indicate that the set of snapshot-solution values at said previous time moment were more accurate than the set of predicted values at said previous time moment; and wherein the second quality factor $Q_n'$ for the time moment $t_n$ is generated as the previous instance of the second quality factor $Q_{n-1}'$ raised to the power of a scalar factor k:

$$Q_n' = (Q_{n-1}')^k$$

when the first and second quality factors $Q_{n-1}$ and $Q_{n-1}'$ at the previous time moment $t_{n-1}$ indicate that the set of predicted values at said previous time moment were more accurate than the set of snapshot-solution values at said previous time moment.

42. The method of claim 41 wherein the value of k is selected from a set of values kq[*] and wherein k is set equal to one of the members of said set kq[*] at each time moment;

wherein the value of k is initially set equal to a predetermined member of said set kq[*]; and wherein, for at least two successive time moments, the value of k at each said time moment is set equal to a different member of said set kq{*} when the first and second quality factors $Q_{n-1}$ and $Q_{n-1}'$ at the previous time moment $t_{n-1}$ indicate that the set of predicted values at said previous time moment were more accurate than the set of snapshot-solution values at said previous time moment; and wherein the value of k is set equal to said predetermined member of the said set kq[*] when the first and second quality factors $Q_{n-1}$ and $Q_{n-1}'$ at the previous time moment $t_{n-1}$ indicate that the set of snapshot-solution values at said previous time moment were more accurate than the set of predicted values at said previous time moment.

* * * * *

UNITED STATES PATENT AND TRADEMARK OFFICE
CERTIFICATE OF CORRECTION

PATENT NO. : 6,337,657 B1
DATED : January 8, 2002
INVENTOR(S) : Zhodzishsky et al.

It is certified that error appears in the above-identified patent and that said Letters Patent is hereby corrected as shown below:

Column 35,
Line 54, delete "are" and insert therefor -- is --.
Line 55, delete "that" and insert therefor -- than --.

Column 36,
Line 9, delete "$\Re^\gamma_n = [H^T_{1,n} \cdot (R^\gamma_n)^{-1} \cdot H_{1,n}]^{-1}$," and insert therefor -- $\Re^\gamma_n = [\mathbf{H}^T_{1,n} \cdot (\mathbf{R}^\gamma_n)^{-1} \cdot \mathbf{H}_{1,n}]^{-1}$, --.

Line 21, delete "$Q_n [\Re^\gamma_{n,11} + \Re^\gamma_{n,22} + \Re^\gamma_{n,33} + \Re^\gamma_{n,44}]^k$," and insert therefor
-- $Q_n \propto [\Re^\gamma_{n,11} + \Re^\gamma_{n,22} + \Re^\gamma_{n,33} + \Re^\gamma_{n,44}]^k$, --.

Line 22, delete "$Q_n \exp[\Re^\gamma_{n,11} + \Re^\gamma_{n,22} + \Re^\gamma_{n,33} + \Re^\gamma_{n,44}]$," and insert therefor
-- $Q_n \propto \exp[\Re^\gamma_{n,11} + \Re^\gamma_{n,22} + \Re^\gamma_{n,33} + \Re^\gamma_{n,44}]$, --.

Line 26, delete "$Q_n \log[\Re^\gamma_{n,11} + \Re^\gamma_{n,22} + \Re^\gamma_{n,33} + \Re^\gamma_{n,44}]$," and insert therefor
-- $Q_n \propto \log[\Re^\gamma_{n,11} + \Re^\gamma_{n,22} + \Re^\gamma_{n,33} + \Re^\gamma_{n,44}]$, --.

Line 39, delete "$\Re^\gamma_n = [H^T_{1,n} \cdot (R^\gamma_n)^{-1} \cdot H_{1,n}]^{-1}$," and insert therefor -- $\Re^\gamma_n = [\mathbf{H}^T_{1,n} \cdot (\mathbf{R}^\gamma_n)^{-1} \cdot \mathbf{H}_{1,n}]^{-1}$, --.

Line 51, delete "$Q_n [\Re^\gamma_{n,11} + \Re^\gamma_{n,22} + \Re^\gamma_{n,33} + \Re^\gamma_{n,44}]^k$," and insert therefor
-- $Q_n \propto [\Re^\gamma_{n,11} + \Re^\gamma_{n,22} + \Re^\gamma_{n,33} + \Re^\gamma_{n,44}]^k$, --.

Line 52, delete "$Q_n \exp[-(\Re^\gamma_{n,11} + \Re^\gamma_{n,22} + \Re^\gamma_{n,33} + \Re^\gamma_{n,44})]$," and insert therefor
-- $Q_n \propto \exp[-(\Re^\gamma_{n,11} + \Re^\gamma_{n,22} + \Re^\gamma_{n,33} + \Re^\gamma_{n,44})]$, --.

Line 55, delete "$Q_n -\log[\Re^\gamma_{n,11} + \Re^\gamma_{n,22} + \Re^\gamma_{n,33} + \Re^\gamma_{n,44}]$," and insert therefor
-- $Q_n \propto -\log[\Re^\gamma_{n,11} + \Re^\gamma_{n,22} + \Re^\gamma_{n,33} + \Re^\gamma_{n,44}]$, --.

Column 37,
Line 8, delete "factors" and insert therefor -- factor --.
Lines 10 and 18, delete "that" and insert therefor -- than --.
Lines 29, 35, 44 and 53, delete "one" and insert therefor -- each --.
Line 37, delete "propotional" and insert therefor -- proportional --.

Column 38,
Line 36, after "equal" insert -- to --.
Line 57, after "1;" and insert -- and --.

UNITED STATES PATENT AND TRADEMARK OFFICE
CERTIFICATE OF CORRECTION

PATENT NO.    : 6,337,657 B1                                           Page 2 of 3
DATED         : January 8, 2002
INVENTOR(S)   : Zhodzishsky et al.

It is certified that error appears in the above-identified patent and that said Letters Patent is hereby corrected as shown below:

Column 39,
Line 18, after "equal" insert -- to --.
Line 59, after "$\Psi_{3,n-1}$," insert -- and --.

Column 40,
Line 7, after "factors" insert -- at --.

Line 14, delete "$Q_n' \; [(\Psi_{1,n})^2+(\Psi_{2,n})^2+(\Psi_{3,n})^2+(\Psi_{4,n})^2]^k,$" and insert therefor
-- $Q_n' \propto [(\Psi_{1,n})^2+(\Psi_{2,n})^2+(\Psi_{3,n})^2+(\Psi_{4,n})^2]^k,$ --.

Line 16, delete "$Q_n' \; \exp[(\Psi_{1,n})^2+(\Psi_{2,n})^2+(\Psi_{3,n})^2+(\Psi_{4,n})^2],$" and insert therefor
-- $Q_n' \propto \exp[(\Psi_{1,n})^2+(\Psi_{2,n})^2+(\Psi_{3,n})^2+(\Psi_{4,n})^2],$ --.

Line 20, delete "$Q_n' \; \log[(\Psi_{1,n})^2+(\Psi_{2,n})^2+(\Psi_{3,n})^2+(\Psi_{4,n})^2],$" and insert therefor
-- $Q_n' \propto \log[(\Psi_{1,n})^2+(\Psi_{2,n})^2+(\Psi_{3,n})^2+(\Psi_{4,n})^2],$ --.

Line 52, delete "$t^{n-1}$" and insert therefor -- $t_{n-1}$ --.
Line 54, delete "a" and insert therefor -- an --.
Line 66, after "equal" insert -- to --.

Column 41,
Line 19, after "1;" insert -- and --.
Line 37, delete "a" and insert therefor -- an --.
Line 49, after "equal" insert -- to --.

Column 42,
Line 34, delete "$\Phi_1=\sqrt{\mathcal{R}^\gamma_{0,11}}, \Phi_2=\sqrt{\mathcal{R}^\gamma 0,22}, \Phi_3=\sqrt{\mathcal{R}^\gamma_{0,33}}, \Phi_4=\sqrt{\mathcal{R}^\gamma_{0,44}};$" and insert therefor
-- $\Phi_1=\sqrt{\mathcal{R}^\gamma_{0,11}}, \Phi_2=\sqrt{\mathcal{R}^\gamma_{0,22}}, \Phi_3=\sqrt{\mathcal{R}^\gamma_{0,33}}, \Phi_4=\sqrt{\mathcal{R}^\gamma_{0,44}},$ --.

Line 35, delete "$\Psi_{1,n}=\sqrt{\mathcal{R}^\gamma 0,11}, \Psi_{2,n}=\sqrt{\mathcal{R}^\gamma_{0,22}}, \Psi_{3,n}=\sqrt{\mathcal{R}^\gamma_{0,33}}, \Psi_{4,n}=\sqrt{\mathcal{R}^\gamma_{0,44}};$" and insert therefor
-- $\Psi_{1,n}=\sqrt{\mathcal{R}^\gamma_{0,11}}, \Psi_{2,n}=\sqrt{\mathcal{R}^\gamma_{0,22}}, \Psi_{3,n}=\sqrt{\mathcal{R}^\gamma_{0,33}}, \Psi_{4,n}=\sqrt{\mathcal{R}^\gamma_{0,44}}$ --.

UNITED STATES PATENT AND TRADEMARK OFFICE
CERTIFICATE OF CORRECTION

PATENT NO. : 6,337,657 B1
DATED : January 8, 2002
INVENTOR(S) : Zhodzishsky et al.

It is certified that error appears in the above-identified patent and that said Letters Patent is hereby corrected as shown below:

Column 42 (cont'd),
Line 37, after "factors" insert -- at --.

Line 44, delete "$Q_n' [(\Psi_{1,n})^2+(\Psi_{2,n})^2+(\Psi_{3,n})^2+(\Psi_{4,n})^2]^k,$" and insert therefor
-- $Q_n' \propto [(\Psi_{1,n})^2+(\Psi_{2,n})^2+(\Psi_{3,n})^2+(\Psi_{4,n})^2]^k,$ --.

Line 46, delete "$Q_n' \exp\{-[(\Psi_{1,n})^2+(\Psi_{2,n})^2+(\Psi_{3,n})^2+(\Psi_{4,n})^2]\},$" and insert therefor
-- $Q_n' \propto \exp\{-[(\Psi_{1,n})^2+(\Psi_{2,n})^2+(\Psi_{3,n})^2+(\Psi_{4,n})^2]\},$ --.

Line 49, delete "$Q_n' -\log\{[(\Psi_{1,n})^2+(\Psi_{2,n})^2+(\Psi_{3,n})^2+(\Psi_{4,n})^2]\},$" and insert therefor
-- $Q_n' \propto -\log\{[(\Psi_{1,n})^2+(\Psi_{2,n})^2+(\Psi_{3,n})^2+(\Psi_{4,n})^2]\},$ --.

Column 43,
Line 22, delete "$t_{-1},$" and insert therefor -- $t_{n-1},$ --.
Line 57, after "of" delete "the".

Column 44,
Line 51, after "of" delete "the".

Signed and Sealed this

Nineteenth Day of April, 2005

JON W. DUDAS
*Director of the United States Patent and Trademark Office*